United States Patent
Takamatsu et al.

(10) Patent No.: US 10,710,520 B2
(45) Date of Patent: Jul. 14, 2020

(54) VEHICULAR CIRCUIT BODY

(71) Applicant: YAZAKI CORPORATION, Tokyo (JP)

(72) Inventors: Masahiro Takamatsu, Shizuoka (JP); Kousuke Kinoshita, Shizuoka (JP); Atsushi Nakata, Shizuoka (JP); Yasuyuki Saito, Shizuoka (JP); Kazuyuki Oiwa, Shizuoka (JP); Terumitsu Sugimoto, Shizuoka (JP); Taku Furuta, Shizuoka (JP); Noriaki Sasaki, Shizuoka (JP); Yukinari Naganishi, Shizuoka (JP); Sadaharu Okuda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/231,416

(22) Filed: Dec. 22, 2018

(65) Prior Publication Data
US 2019/0118744 A1  Apr. 25, 2019

Related U.S. Application Data

(63) Continuation of application No. PCT/JP2017/023313, filed on Jun. 23, 2017.

(30) Foreign Application Priority Data

Jun. 24, 2016  (JP) ................. 2016-125287
Jun. 24, 2016  (JP) ................. 2016-125896
Jun. 30, 2016  (JP) ................. 2016-131165

(51) Int. Cl.
*B60R 16/02*   (2006.01)
*H01R 13/64*   (2006.01)
(Continued)

(52) U.S. Cl.
CPC .......... *B60R 16/0215* (2013.01); *B60R 16/02* (2013.01); *B60R 16/0238* (2013.01); *H01B 7/0045* (2013.01); *H01R 13/64* (2013.01)

(58) Field of Classification Search
CPC . B60R 16/0215; B60R 16/0239; B60R 16/03; B60K 37/00; H01B 7/0045
See application file for complete search history.

(56) References Cited

U.S. PATENT DOCUMENTS 3,715,627 A * 2/1973 D'Ausilio ............ H01R 25/162
                                                    361/643
5,324,203 A * 6/1994 Sano ...................... B60K 37/00
                                                     439/34
(Continued)

FOREIGN PATENT DOCUMENTS

DE          41 02 659 A1   8/1992
DE   10 2012 200 979 A1   7/2013
(Continued)

OTHER PUBLICATIONS

International Search Report and Written Opinion of the International Search Report for PCT/JP2017/023266 dated Sep. 19, 2017.
(Continued)

*Primary Examiner* — Steven T Sawyer
(74) *Attorney, Agent, or Firm* — Kenealy Vaidya LLP

(57) ABSTRACT

A vehicular circuit body provided in a vehicle includes: a trunk line that extends in at least a front-and-rear direction of the vehicle; and a plurality of control boxes that are provided in the trunk line, wherein each of the plurality of control boxes is able to connect with a branch line that is directly or indirectly connected to an accessory, and the trunk line includes a power source line and a communication line.

6 Claims, 52 Drawing Sheets

(51) Int. Cl.
*B60R 16/023* (2006.01)
*H01B 7/00* (2006.01)

(56) References Cited

U.S. PATENT DOCUMENTS

| | | | |
|---|---|---|---|
| 5,623,169 A * | 4/1997 | Sugimoto | B60R 16/0207 307/10.1 |
| 5,675,189 A | 10/1997 | Anma et al. | |
| 5,818,673 A * | 10/1998 | Matsumaru | H02J 1/06 361/63 |
| 5,990,573 A | 11/1999 | Granitz et al. | |
| 6,127,741 A | 10/2000 | Matsuda et al. | |
| 6,182,807 B1 * | 2/2001 | Saito | B60G 17/0185 191/2 |
| 6,291,770 B1 * | 9/2001 | Casperson | B60R 16/0207 174/139 |
| 6,650,345 B1 | 11/2003 | Saito et al. | |
| 6,791,207 B2 | 9/2004 | Yoshida et al. | |
| 6,935,790 B2 | 8/2005 | Ozaki | |
| 6,945,704 B2 | 9/2005 | Yamaguchi | |
| 7,039,511 B1 | 5/2006 | Kreuz et al. | |
| 7,286,044 B2 | 10/2007 | Yanagida et al. | |
| 7,423,519 B2 | 9/2008 | Yanagida et al. | |
| 7,551,999 B2 | 6/2009 | Uraki | |
| 7,852,206 B2 | 12/2010 | Yanagida et al. | |
| 8,248,971 B2 | 8/2012 | Goto et al. | |
| 8,304,928 B2 | 11/2012 | Nagasawa et al. | |
| 8,929,732 B2 | 1/2015 | Yuki et al. | |
| 9,505,358 B2 | 11/2016 | Ichikawa et al. | |
| 9,825,394 B2 | 11/2017 | Naganishi et al. | |
| 10,266,130 B2 | 4/2019 | Saito et al. | |
| 2003/0215235 A1 | 11/2003 | Norizuki et al. | |
| 2004/0077207 A1 | 4/2004 | Ice | |
| 2004/0227402 A1 * | 11/2004 | Fehr | B60R 16/0315 307/10.1 |
| 2006/0031590 A1 * | 2/2006 | Monette | H04W 84/005 709/249 |
| 2006/0197378 A1 | 9/2006 | Nagasawa et al. | |
| 2009/0015976 A1 | 1/2009 | Hara et al. | |
| 2010/0131816 A1 | 5/2010 | Yamamoto et al. | |
| 2010/0215043 A1 | 8/2010 | Hisada | |
| 2011/0088944 A1 | 4/2011 | Ogue et al. | |
| 2012/0290692 A1 | 11/2012 | Reich et al. | |
| 2012/0305308 A1 | 12/2012 | Toyama et al. | |
| 2015/0308998 A1 | 10/2015 | Suzuki et al. | |
| 2015/0309163 A1 * | 10/2015 | Van Der Velde | G01S 17/936 250/214.1 |
| 2015/0349471 A1 | 12/2015 | Maki et al. | |
| 2015/0360627 A1 | 12/2015 | Sasaki et al. | |
| 2016/0059708 A1 | 3/2016 | Iwasaki et al. | |
| 2017/0057434 A1 | 3/2017 | Nohara et al. | |

FOREIGN PATENT DOCUMENTS

| | | |
|---|---|---|
| DE | 10 2015 216 311 A1 | 3/2016 |
| EP | 0 507 225 A1 | 10/1992 |
| JP | 64-7712 U | 1/1989 |
| JP | 2-25343 U | 2/1990 |
| JP | 5-71058 U | 9/1993 |
| JP | 6-171438 A | 6/1994 |
| JP | 7-335367 A | 12/1995 |
| JP | 8-2290 A | 1/1996 |
| JP | 8-273718 A | 10/1996 |
| JP | 9-134307 A | 5/1997 |
| JP | 9-275632 A | 10/1997 |
| JP | 10-84619 A | 3/1998 |
| JP | 11-154566 A | 6/1999 |
| JP | 2000-78179 A | 3/2000 |
| JP | 2003-32853 A | 1/2003 |
| JP | 2003-175781 | 6/2003 |
| JP | 2003-218904 A | 7/2003 |
| JP | 2003-332981 A | 11/2003 |
| JP | 2004-306697 A | 11/2004 |
| JP | 2005-78962 A | 3/2005 |
| JP | 2006-6069 A | 1/2006 |
| JP | 2006-191727 A | 7/2006 |
| JP | 2006-220857 A | 8/2006 |
| JP | 2007-201932 A | 8/2007 |
| JP | 2007-305379 A | 11/2007 |
| JP | 2008-284981 A | 11/2008 |
| JP | 2008-306592 A | 12/2008 |
| JP | 2009-94731 A | 4/2009 |
| JP | 2009-286288 A | 12/2009 |
| JP | 2010-12868 A | 1/2010 |
| JP | 2010-120545 A | 6/2010 |
| JP | 2011-20523 A | 2/2011 |
| JP | 2011-165354 A | 8/2011 |
| JP | 2014-191997 A | 10/2014 |
| JP | 2015-113101 A | 6/2015 |
| JP | 2015-196447 A | 11/2015 |
| JP | 2015-227089 A | 12/2015 |
| JP | 2016-4686 A | 1/2016 |
| JP | 2016-19176 A | 2/2016 |
| JP | 2016-43882 A | 4/2016 |
| JP | 2016-110811 A | 6/2016 |
| WO | 00/38953 A1 | 7/2000 |
| WO | 00/52836 A1 | 9/2000 |
| WO | 2004/089696 A1 | 10/2004 |
| WO | 2004/103771 A2 | 12/2004 |
| WO | 2007/056696 A2 | 5/2007 |
| WO | 2015/186837 A1 | 12/2015 |

OTHER PUBLICATIONS

International Search Report and Written Opinion of the International Search Report for PCT/JP2017/023307 dated Sep. 19, 2017.
International Search Report and Written Opinion of the International Search Report for PCT/JP2017/023267 dated Sep. 19, 2017.
International Search Report and Written Opinion of the International Search Report for PCT/JP2017/023269 dated Sep. 19, 2017.
International Search Report and Written Opinion of the International Search Report for PCT/JP2017/023303 dated Sep. 19, 2017.
International Search Report and Written Opinion of the International Search Report for PCT/JP2017/023305 dated Sep. 19, 2017.
International Search Report and Written Opinion of the International Search Report for PCT/JP2017/023306 dated Sep. 19, 2017.
International Search Report and Written Opinion of the International Search Report for PCT/JP2017/023309 dated Sep. 19, 2017.
International Search Report and Written Opinion of the International Search Report for PCT/JP2017/023312 dated Sep. 19, 2017.
International Search Report and Written Opinion of the International Search Report for PCT/JP2017/023313 dated Sep. 19, 2017.
International Search Report and Written Opinion of the International Search Report for PCT/JP2017/023314 dated Sep. 19, 2017.
International Search Report and Written Opinion of the International Search Report for PCT/JP2017/023315 dated Sep. 19, 2017.
International Search Report and Written Opinion of the International Search Report for PCT/JP2017/023316 dated Sep. 19, 2017.

* cited by examiner

VEHICULAR CIRCUIT BODY

CROSS-REFERENCE TO RELATED APPLICATIONS

This is a continuation of International Application No. PCT/JP17/023313 filed on Jun. 23, 2017, and claims priority from Japanese Patent Applications No. 2016-125287 filed on Jun. 24, 2016, No. 2016-125896 filed on Jun. 24, 2016 and No. 2016-131165 filed on Jun. 30, 2016, the entire contents of which are incorporated herein by reference.

TECHNICAL FIELD

The present invention relates to a vehicular circuit body routed in a vehicle.

BACKGROUND ART

In a vehicle, for example, source power is required to be appropriately supplied to a large number of various electric components from an alternator (generator) or a battery which is a main power source. A system used to supply such source power is also required to have a function of switching between ON and OFF of the supply of power as necessary, or a function of cutting off a current for each system in a case where an excessive current flows through an electric component.

In a general vehicle, a wire harness which is an aggregate of a plurality of electric wires is routed on the vehicle, and a main power source is connected to electric components at each location via the wire harness so that power is supplied thereto. Generally, a junction block is used to distribute source power to a plurality of systems, a relay box is used to control ON and OFF of the supply of power for each system, or a fuse box is used to protect each electric wire or a load of the wire harness.

The vehicle is provided with a plurality of control units for controlling the electric components, and the control units and the electric components are communicably connected to each other via the wire harness.

For example, a wire harness disclosed in Patent Document 1 includes a network transmission path and a circuit for providing power, GND and other signals. The wire harness includes a wire harness trunk line, a sub-wire harness, an optional sub-wire harness, and a network hub device.

Patent Document 1: JP-A-2005-78962

SUMMARY OF INVENTION

In recent years, vehicle systems including such a power source system or communication system have become advanced due to an increase in the number of mounted electric components, complexity of control, or the like. An automatic driving technology is rapidly evolving, and safety requirements for various functions are also increasing in order to cope with this automatic driving.

Along with this, a structure of a wire harness routed on a vehicle body tends to be complicated. Therefore, for example, as in Patent Document 1, the wire harness having a complex shape as a whole is formed by combining the wire harness trunk line, the sub-wire harness, and the optional sub-wire harness, and thus connection to various electric components disposed at various locations on a vehicle body can be performed.

Since a diameter of each electric wire forming the wire harness or the number of electric wires increases due to an increase in the number of electric components mounted on a vehicle, there is a tendency that a size of the entire wire harness increases or a weight thereof increases. The types and the number of components of wire harness to be manufactured increase due to a difference between vehicle models mounted with a wire harness or increases in types of optional electric components mounted on a vehicle, and thus it is difficult to standardize components forming the wire harness, and component cost or manufacturing cost increases.

In a work process of manufacturing a wire harness, in order to finish the wire harness in a predetermined routing shape, a bundle of a plurality of electric wires forming the wire harness is pulled around over a long distance along a path which is designated in advance, and thus a lot of work time is required. Since almost all of electric wires are collected at a trunk line portion of the wire harness, the number of bundled electric wires increases, and thus a weight thereof increases.

For example, in a case where a new electric component which is not expected at initial design is mounted on a vehicle, a new electric wire is required to be added to a wire harness in order to secure a path along which a special signal is transmitted between the electric component and another electric component or to supply source power thereto. However, a wire harness has a complex structure or shape, and it is very difficult to add other electric wires to the existing wire harness in the future. Therefore, a new wire harness having differing type or component number is required to be designed so as to be manufactured as a separate product.

The present invention has been made in consideration of the above-described circumstances, and an object thereof is to provide a vehicular circuit body in which a structure for electrical connection between various electric components and a power source on a vehicle and between the electric components, particularly, a configuration of a trunk line portion is simplified and a new electric wire can be easily added.

In order to achieve the above-described object, a vehicular circuit body according to the present invention is characterized in terms of the following (1) to (7).

(1) A vehicular circuit body provided in a vehicle, including:
a trunk line that extends in at least a front-and-rear direction of the vehicle; and
a plurality of control boxes that are provided in the trunk line,
wherein each of the plurality of control boxes is able to connect with a branch line that is directly or indirectly connected to an accessory, and
wherein the trunk line includes a power source line having a predetermined current capacity and a communication line having a predetermined communication capacity.

(2) The vehicular circuit body according to (1),
wherein the trunk line includes power source lines of two systems.

(3) The vehicular circuit body according to (1),
wherein the branch line includes a power source line and a communication line,
wherein each of the plurality of control boxes includes a branch line connection portion to which the branch line is connected, and a branch line control unit that distributes power from the trunk line to the branch line by controlling the branch line connection portion according to a control program, and
wherein the control program can be externally changed according to the accessory connected to the branch line.

(4) The vehicular circuit body according to (1), wherein the communication line of the trunk line is routed so that the plurality of control boxes are connected in a ring form.

(5) The vehicular circuit body according to (1),
wherein the branch line includes a power source line and a communication line,
wherein each of the plurality of control boxes includes a plurality of branch line connection portions to and from which the communication line of the branch line is attachable and detachable, and wherein each of the plurality of branch line connection portions is provided with a lock function portion that is physically or electrically brought into a lock state in a case where the branch line is not connected thereto.

(6) The vehicular circuit body according to (1),
wherein the branch line includes a power source line and a communication line,
wherein the vehicle is divided into a plurality of regions,
wherein at least two control boxes are disposed in the regions which are different from each other, each of which includes a gateway conversing communication methods for the communication line of the branch line and the communication line of the trunk line, and
wherein a plurality of the gateways are able to communicate with each other via the communication line of the trunk line.

(7) The vehicular circuit body according to (1), wherein the branch line includes at least one of a power source line and a communication line,
wherein the communication line of the trunk line has a transmission path for an optical signal, and
wherein the communication line of the branch line has a transmission path for an electric signal.

With the configuration of (1), it is possible to provide a vehicular circuit body in which a configuration of the trunk line portion is simplified and a new electric wire can be easily added.

With the configuration of (2), since the power source lines of two systems are formed between the control boxes, one power source line is used for backup so as to reduce a probability that the supply of power may be stopped, or power can be stably supplied by increasing a voltage of one system as necessary.

With the configuration of (3), appropriate power can be supplied to the accessory via the branch line from the trunk line by changing the control program regardless of the kind of accessory connected to the branch line.

With the configuration of (4), even if a failure occurs in any communication line connecting the plurality of control boxes to each other, communication can be continuously performed by using a route in a direction opposite to a location where the failure occurs. Therefore, it is possible to improve the reliability of communication on the trunk line of the vehicular circuit body.

With the configuration of (5), even if branch line connection portions of the number larger than the number of connected branch lines at the present time are provided in the control box so that branch lines can be additionally connected in the future, it is possible to prevent a branch line which should not be connected from being connected to a branch line connection portion to which no branch line is connected. Therefore, for example, it is possible to prevent a program rewriting device from being connected to a branch line connection portion to which no branch line is connected for the purpose of rewriting a program of a control unit of a control box with malice.

With the configuration of (6), since the gateway conversing communication methods for the communication line of the trunk line and the communication line of the branch line is provided in each region of the vehicle, an accessory provided in a region is connected to a control box provided in the region via the branch line, and thus transmission and reception of signals can be performed between the accessory and the trunk line.

With the configuration of (7), since the trunk line connecting the control boxes to each other has the transmission path for an optical signal, it is possible to increase a transmission capacity between the control boxes. Since an optical signal is used, it is hardly influenced by electromagnetic noise generated in the power source line of the trunk line or external apparatuses, and thus it is possible to increase reliability of communication.

It is possible to provide a vehicular circuit body in which a configuration of a trunk line portion is simplified and a new electric wire can be easily added.

As mentioned above, the present invention has been described briefly. Details of the present invention will become more apparent by reading through modes for carrying out the invention (hereinafter, referred to as "embodiments") described below with reference to the accompanying drawings.

BRIEF DESCRIPTION OF DRAWINGS

FIGS. 14A, 14B and 14C are plan views illustrating three configuration examples of circuit boards built in a control box or the like.

FIGS. 25A, 25B and 25C are block diagrams illustrating specific examples of connection states of a trunk line, a control box, a battery, and the like.

FIGS. 38A, 38B and 38C illustrate communication connection states between apparatuses in different situations, in which FIG. 38A is a perspective view, and FIGS. 38B and 38C are block diagrams.

DESCRIPTION OF EMBODIMENTS

Figure 1:
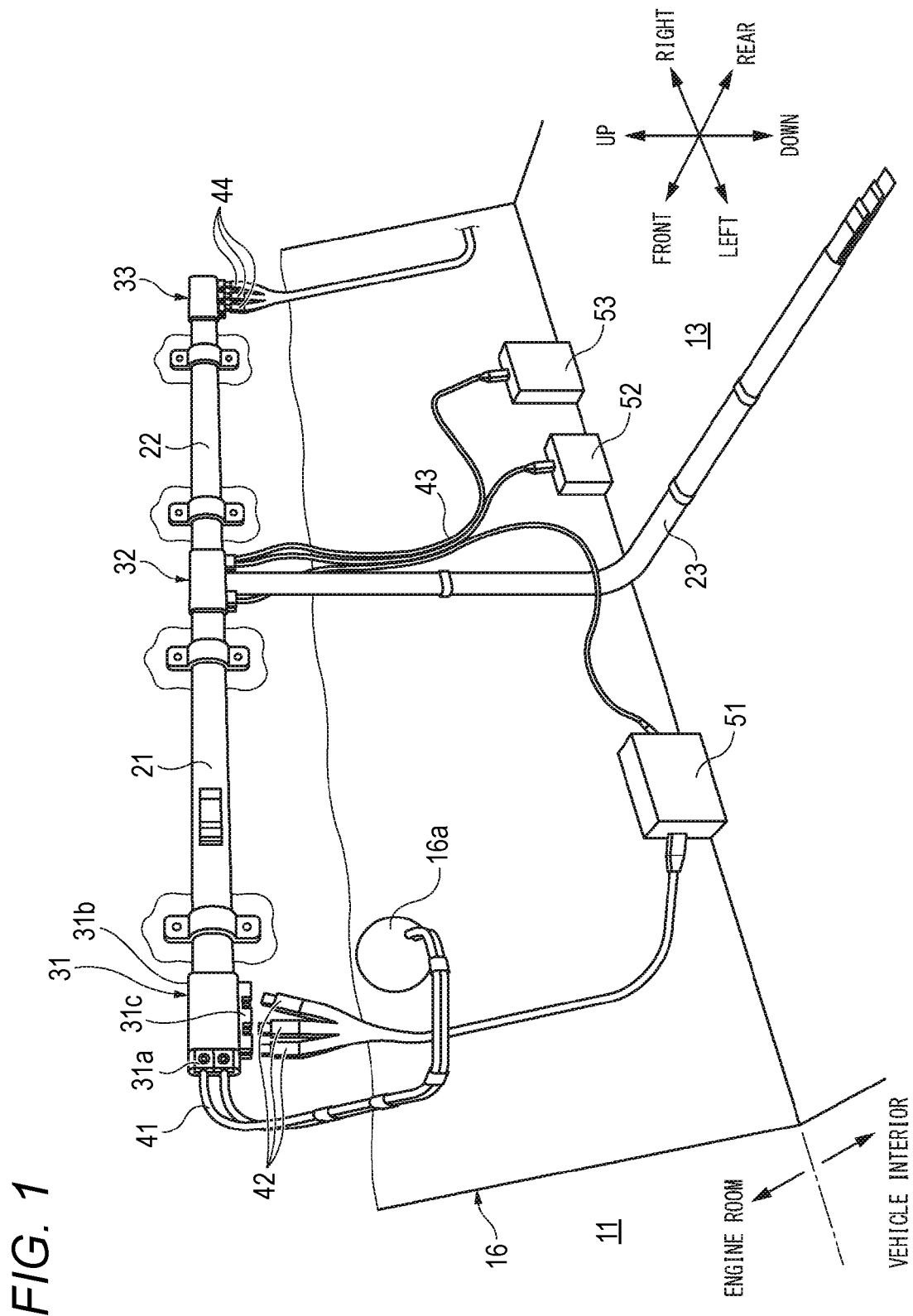
FIG. 1 is a perspective view illustrating a configuration example of principal portions of an on-vehicle device including a vehicular circuit body in an embodiment of the present invention.

Specific embodiments regarding the present invention will be described with reference to the respective drawings.

\<Disclosure of the Present Invention and Latent Claims\>
[Power Source-1]

In a vehicle, for example, it is necessary to cope with an automatic driving technology, and thus it is necessary to improve reliability of a power source system of a wire harness. For example, even during vehicle crash due to traffic accident, it is preferable that the supply of power to an important on-vehicle apparatus is not stopped, and a problem can be solved by only the vehicle itself. In a vehicular circuit body such as a wire harness, there is the need for reducing component cost or manufacturing cost by simplifying the configuration, or reducing the number of components by using a component in common to various kinds of vehicles. Therefore, the vehicular circuit body is configured as described in the following (1) to (7).

(1) A vehicular circuit body provided in a vehicle, includes:

a trunk line that extends in at least a front-and-rear direction of the vehicle; and a plurality of control boxes that are provided in the trunk line, in which the trunk line includes power source lines of two systems and a communication line.

With this configuration, since the power source lines of two systems are formed between the control boxes, one power source line is used for backup so as to reduce a probability that the supply of power may be stopped, or power can be stably supplied by increasing a voltage of one system as necessary.

(2) In the vehicular circuit body according to the above (1), the power source lines of two systems transmit power of the same voltage.

With this configuration, the power source lines of two systems can be used together, or one power source line can be used for backup, depending on situations.

(3) In the vehicular circuit body according to the above (1), the power source lines of two systems transmit power of different voltages.

With this configuration, in a case where a load having large power consumption is connected, a large power source current flows, and thus a voltage drop in a supply line path increases. Thus, it is possible to prevent an increase in a power loss by selecting a higher power source voltage.

(4) In the vehicular circuit body according to the above (1) to (3), the plurality of control boxes include a first control box, and a second control box located further toward a downstream side than the first control box with respect to a power source, and in which the first control box transmits power to the second control box by using only one of the power source lines of two systems.

With this configuration, one of the power source lines of two systems is secured as a standby power source system, and in a case where abnormality occurs in a power source line in use, switching to the standby power source system can be performed.

(5) In the vehicular circuit body according to any one of the above (1) to (4), the vehicle circuit body further includes a branch line that is connected to an accessory provided in the vehicle.

With this configuration, it is possible to collectively supply power to the trunk line from a power source, and to distribute the power from the trunk line to each accessory.

(6) In the vehicular circuit body according to the above (5), one end of the branch line is connected to the control box.

With this configuration, it is possible to distribute power to be supplied to an accessory, from the control box.

(7) In the vehicular circuit body according to the above (1) to (6), the power source lines of two systems are provided to extend in parallel.

With this configuration, the power source lines of two systems can be disposed together by connecting the control boxes to each other via a single trunk line.

[Power Source-2]

In vehicles, different numbers or different kinds of electric components (accessories) for each vehicle are connected due to a difference in a vehicle, a difference in a grade, a difference in a destination, and a difference in an optional apparatus. If the number or the kind of electric component is changed, a configuration of a wire harness may be changed. A new kind of electric component which is not expected during design of a vehicle may be added to a vehicle in the future. In this case, preferably, the added electric component can be used by just being connected to an existing wire harness or the like which has already been mounted in the vehicle. It is preferable that a connection position of each electric component can be changed as necessary. It is preferable that the wire harness or the like can be configured by components in common even if the kind of vehicle, or the number or the kind of electric component to be connected is changed.

Therefore, the vehicular circuit body is configured as described in the following (1) and (2).

(1) A vehicular circuit body provided in a vehicle, includes:

a trunk line that extends in at least a front-and-rear direction of the vehicle;

a plurality of control boxes that are provided in the trunk line; and a branch line that connects the control box to an accessory.

Each of the trunk line and the branch line includes a power source line and a communication line.

Each of the plurality of control boxes includes a branch line connection portion connected to a branch line, and a branch line control unit that distributes power from the trunk line to the branch line by controlling the branch line connection portion according to a control program.

The control program can be externally changed according to an accessory connected to the branch line.

With this configuration, appropriate power can be supplied to an accessory via the branch line from the trunk line by changing the control program regardless of the kind of accessory connected to the branch line.

(2) In the vehicular circuit body according to the above (1), the branch line connection portion includes a plurality of connectors connected to ends of the branch lines, and the plurality of connectors have the same shape.

With this configuration, a connector to be connected to a branch line is not required to differ depending on an accessory, and thus it is possible to easily increase the number of accessories or to easily change accessories.

[Communication-1]

In a vehicle, for example, it is necessary to cope with an automatic driving technology, and thus it is necessary to improve reliability of, for example, a communication system of a wire harness. For example, even during vehicle crash due to traffic accident, it is preferable that a communication system used to control an important on-vehicle apparatus can be maintained in a communicable state, and abnormality does not occur in a vehicle control state. In a vehicular circuit body such as a wire harness used as a communication path, there is the need for reducing component cost or manufacturing cost by simplifying the configuration, or reducing the number of components by using a component in common to various kinds of vehicles.

Therefore, the vehicular circuit body is configured as described in the following (1).

(1) A vehicular circuit body provided in a vehicle, includes:

a trunk line that extends in at least a front-and-rear direction of the vehicle; and a plurality of control boxes that are provided in the trunk line.

The trunk line includes a power source line and a communication line.

The communication line is routed so that the plurality of control boxes are connected in a ring form.

With this configuration, even if a failure occurs in any communication line connecting the plurality of control boxes to each other, communication can be continuously performed by using a route in a direction opposite to a location where the failure occurs. Therefore, it is possible to improve the reliability of communication on the trunk line of the vehicular circuit body.

[Communication-2]

Various electric components may be connected to a wire harness of a vehicle. It is preferable to use a component in common or be able to freely change a connection position of a connector or the like of an electric component. Thus, it may be expected that a communication standard generally used is employed, or a plurality of connectors or the like having a normal shape are prepared on a wire harness of a vehicle. However, for example, from the viewpoint of security, there is a case where some connectors are required not to be freely used by a user of a vehicle or a third party unless special permission is given. However, in a case where a communication method based on a standard is employed, or a connector based on a standard is employed, a user or the like may freely use a connector in an unoccupied state, and thus a problem such as security occurs.

Therefore, the vehicular circuit body is configured as described in the following (1) to (5).

(1) A vehicular circuit body provided in a vehicle, includes:

a plurality of control boxes;

a trunk line that connects the plurality of control boxes to each other; and a branch line that directly or indirectly connects a control box to an accessory.

Each of the trunk line and the branch line includes a power source line and a communication line.

Each of the control boxes includes a plurality of branch line connection portions to and from which the communication line of the branch line is attachable and detachable.

The plurality of branch line connection portions are provided with a lock function portion that is physically or electrically brought into a lock state in a case where the branch line is not connected thereto.

With this configuration, even if branch line connection portions of the number larger than the number of connected branch lines at the present time are provided in the control box so that branch lines can be additionally connected in the future, it is possible to prevent a branch line which should not be connected from being connected to a branch line connection portion to which no branch line is connected. Therefore, for example, it is possible to prevent a program rewriting device from being connected to a branch line connection portion to which no branch line is connected for the purpose of rewriting a program of a control unit of a control box with malice.

(2) In the vehicular circuit body according to the above (1), each of the plurality of branch line connection portions includes a connector to and from which an end of the communication line is attachable and detachable, and in which the lock function portion includes a cover member that collectively covers openings of a plurality of the connectors, and a key part that prevents the cover member from being detached from the connectors in a lock state.

With this configuration, in a case where a branch line is not required to be connected to any branch line connection portion at the present time, all connectors of the branch line connection portion are collectively covered by the cover member, and the cover member cannot be detached by the key part. Thus, a branch line can be prevented from being connected to a connector wrongly or with malice.

(3) In the vehicular circuit body according to the above (1), each of the plurality of branch line connection portions includes a connector to and from which an end of the communication line is attachable and detachable. The lock function portion includes a cover member that covers at least a part of an opening of any one of the connectors, and a key part that prevents the cover member from being detached from the connector in a lock state.

With this configuration, the cover member can be attached only to a necessary connector among the plurality of connectors and not be detached. Therefore, in a case where branch lines are not connected to some connectors among the plurality of connectors, the cover member is attached to the connectors, and thus branch lines can be prevented from being connected to the connectors wrongly or with malice.

(4) In the vehicular circuit body according to the above (1), each of the plurality of branch line connection portions includes a connector to and from which an end of the communication line is attachable and detachable, and in which the lock function portion is a seal member which covers an opening of at least one of the connectors, and the seal member includes unsealing display means for identifying unsealing.

With this configuration, since the seal member has the unsealing display means, it is possible to prevent a person with malice from connecting a branch line to a connector. In a case where a branch line is illegally connected to a connector, it is easy for a dealer or the like to find out the face.

(5) In the vehicular circuit body according to the above (1), each of the plurality of branch line connection portions transmits a signal to a connected target object, and determines whether or not transmission and reception of signals to and from the target object are permitted on the basis of a response to the signal from the target object.

With this configuration, even if a branch line which should not be connected to the branch line connection portion is connected thereto, communication cannot be performed with a target object connected to the branch line, and thus it is possible to prevent ill effects from being exerted on a function of a control box or each accessory connected to the branch line through illegal communication.

[Communication-3]

Regarding communication on a vehicle, an interface based on a plurality of standards such as CAN, CXPI, and Ethernet (registered trademark) may be used. The connected electric components may employ different communication standards for each kind of vehicle, for each grade of a vehicle, or for each area on a vehicle body. Since a device such as a special communication cable, connector, or communication interface is separately prepared in order to connect communication apparatuses based on different standards to each other, a configuration of a wire harness may be complicated and connection work may be troublesome.

Therefore, the vehicular circuit body is configured as described in the following (1) and (2).

(1) A vehicular circuit body provided in a vehicle, includes:

a trunk line that extends in at least a front-and-rear direction of the vehicle;

a plurality of control boxes that are provided in the trunk line; and a branch line that directly or indirectly connects a control box to an accessory.

Each of the trunk line and the branch line includes a power source line and a communication line.

The vehicle is divided into a plurality of regions.

At least two control boxes are disposed in regions which are different from each other, each of which includes a gateway conversing communication methods for the communication line of the branch line and the communication line of the trunk line.

A plurality of the gateways can perform communication with each other via the communication line of the trunk line.

With this configuration, since the gateway conversing communication methods for the communication line of the trunk line and the communication line of the branch line is provided in each region of the vehicle, an accessory provided in a region is connected to a control box provided in the region via the branch line, and thus transmission and reception of signals can be performed between the accessory and the trunk line.

(2) In the vehicular circuit body according to the above (1), the gateway changes a communication method to correspond to a communication method used in the accessory which is connected to the gateway via the branch line.

With this configuration, various kinds of accessories can be connected to control boxes provided in the same regions as regions in which the accessories are provided, regardless of a communication method.

[Communication-4]

On a vehicle, for example, it is desirable to connect a plurality of apparatuses transmitting a large volume of data such as video signals captured by various cameras to each other. In such an environment, optical communication may be employed so that a large capacity of communication can be performed at a high speed. However, if the entire on-vehicle system is connected by using an optical communication network, the system is inevitably very expensive.

Therefore, the vehicular circuit body is configured as described in the following (1) and (2).

(1) A vehicular circuit body provided in a vehicle, includes:

a trunk line that extends in at least a front-and-rear direction of the vehicle;

a plurality of control boxes that are provided in the trunk line; and a branch line that directly or indirectly connects a control box to an accessory.

The trunk line includes a power source line and a communication line.

The branch line includes at least one of a power source line and a communication line.

The communication line of the trunk line has a transmission path for an optical signal, and the communication line of the branch line has a transmission path for an electric signal.

With this configuration, since the trunk line connecting the control boxes to each other has the transmission path for an optical signal, it is possible to increase a transmission capacity between the control boxes. Since an optical signal is used, it is hardly influenced by electromagnetic noise generated in the power source line of the trunk line or external apparatuses, and thus it is possible to increase reliability of communication.

(2) In the vehicular circuit body according to the above (1), at least one communication line of the trunk line directly connects two of the plurality of control boxes to each other.

With this configuration, two control boxes are directly connected to each other via a transmission path for an optical signal, and thus transmission and reception of signals can be performed at a high speed.

DESCRIPTION OF EMBODIMENTS

Specific embodiments related to the vehicular circuit body according to the present invention will be described with reference to drawings.

<Configuration Example of Principal Portions>

FIG. 1 illustrates a configuration example of principal portions of an on-vehicle device including a vehicular circuit body in an embodiment of the present invention.

A vehicular circuit body illustrated in FIG. 1 is used as a transmission line required to supply power from a main power source such as an on-vehicle battery to accessories at respective vehicle body locations, that is, various electric components or to exchange signals between the electric components. In other words, a function of the vehicular circuit body of the third embodiment is the same as a general wire harness, but a structure thereof is greatly different from that of the general wire harness.

The on-vehicle device shown in FIG. 1 illustrates a configuration of a vehicle interior side in the vicinity of a dash panel 16 which partitions a vehicle body into an engine room 11 and a vehicle interior (occupant compartment) 13. As illustrated in FIG. 1, a reinforcement (not shown) which is a reinforcement member is provided on an instrument panel portion slightly located on a rear side of the dash panel 16 so as to extend in the leftward-and-rightward direction of the vehicle body. Principal constituent elements of the vehicular circuit body are disposed in the vicinity of the reinforcement. The vehicular circuit body at a location extending in the leftward-and-rightward direction of the vehicle body may be fixed to the reinforcement, may be fixed to the dash panel 16, or may be fixed to a dedicated fixing tool.

The vehicular circuit body illustrated in FIG. 1 includes a plurality of backbone trunk line portions 21, 22 and 23, and a plurality of backbone control boxes 31, 32 and 33. Each of the backbone trunk line portions 21, 22 and 23 includes lines such as a power source line, an earth line, and a communication line. The power source line and the earth line of each backbone trunk line portion have a configuration in which a strip-shaped metal material (for example, copper or aluminum) having a flat sectional shape is employed, and such metal materials are stacked in a thickness direction in a state of being electrically insulated from each other. Consequently, a large current is allowed to pass therethrough, and bending processing in the thickness direction is relatively facilitated.

The backbone trunk line portions 21 and 22 are linearly disposed in the leftward-and-rightward direction so as to be substantially parallel to the reinforcement over the reinforcement at a location along a surface of the dash panel 16. The backbone trunk line portion 23 is disposed substantially at the center of the vehicle body in the leftward-and-rightward direction, and linearly extends in the upward-and-downward direction at the location along the surface of the dash panel 16. The backbone trunk line portion 23 is bent in the thickness direction by about 90 degrees in the vicinity of a boundary between the dash panel 16 and a vehicle interior floor, and is disposed to extend in the front-and-rear direction of the vehicle body along the vehicle interior floor.

The backbone control box 32 is disposed substantially at the center of the vehicle body in the leftward-and-rightward direction, the backbone control box 31 is disposed in the vicinity of a left end in the leftward-and-rightward direction, and the backbone control box 33 is disposed in the vicinity of a right end in the leftward-and-rightward direction.

A left end of the backbone trunk line portion 21 is connected to a right end of the backbone control box 31, and a right end of the backbone trunk line portion 21 is connected to a left end of the backbone control box 32. A left end of the backbone trunk line portion 22 is connected to a right end of the backbone control box 32, and a right end of the backbone trunk line portion 22 is connected to a left end of the backbone control box 33. A tip end of the backbone trunk line portion 23 is connected to a lower end of the backbone control box 32.

In other words, the backbone trunk line portions 21 to 23 and the backbone control boxes 31 to 33 are formed in a shape similar to a T shape as illustrated in FIG. 1. Internal circuits of the backbone trunk line portions 21 to 23 are in a state of being capable of being electrically connected to each other via the backbone control box 32.

<Details of Backbone Control Boxes>

The backbone control box 31 disposed on the left of the vehicle body is provided with a main power source connection portion 31a, a trunk line connection portion 31b, and a branch line connection portion 31c. As illustrated in FIG. 1, the main power source connection portion 31a of the backbone control box 31 is connected to a main power source cable 41, the trunk line connection portion 31b is connected to the left end of the backbone trunk line portion 21, and the branch line connection portion 31c is connected to a plurality of branch line sub-harnesses 42.

Although not illustrated in FIG. 1, power source lines of two systems, an earth line, and a communication line are provided inside the backbone trunk line portion 21. The main power source connection portion 31a is provided with two connection terminals which are connected to a power source line and an earth line of the main power source cable 41.

For example, of the power source lines of two systems included in the backbone trunk line portion 21, one power source line is used as a path for supplying power from the main power source. The other power source line is used as a path for supplying source power for backup, for example, when abnormality occurs.

A circuit board for connecting power source systems, earth systems, and communication systems of respective circuits to each other among the main power source cable 41, the backbone trunk line portion 21, and the branch line sub-harnesses 42 is provided inside the backbone control box 31.

Regarding the main power source cable 41, terminals connected to tip ends of the power source line and the earth line are connected to the terminals of the main power source connection portion 31a, and are fixed by using bolts and nuts, and thus the circuits can be connected to each other.

Regarding the branch line sub-harnesses 42, connectors provided at respective tip ends thereof are attachable to and detachable from the branch line connection portion 31c, and thus the circuits can be connected to each other as necessary. Each of the branch line sub-harnesses 42 is configured to include all of a power source line, an earth line, and a communication line, or a part thereof. In the backbone control box 31 illustrated in FIG. 1, the branch line connection portion 31c is provided with six connectors, and can thus connect to six branch line sub-harnesses 42 at most.

As illustrated in FIG. 1, the backbone trunk line portions 21 to 23 and the backbone control boxes 31 to 33 are combined, and various branch line sub-harnesses 42 to 44 are connected to the backbone control boxes 31 to 33, and thus it is possible to route various transmission lines with a simple structure similar to a backbone.

For example, options or various electric components additionally mounted on a vehicle can be handled just by adding or changing the branch line sub-harnesses 42 to 44 connected to any one of the backbone control boxes 31 to 33, and thus it is not necessary to change the structure of the trunk line of the vehicular circuit body. In the present embodiment, a case is assumed in which the branch line sub-harnesses 42 to 44 are connected to the backbone control boxes 31 to 33, but other branch line sub-harnesses (not illustrated) may be connected to locations of proper relay points on the backbone trunk line portions 21 to 23, for example.

In an actual on-vehicle device, for example, as illustrated in FIG. 1, an electronic control unit (ECU) 51 provided in a vehicle may be connected to the backbone control box 31 or other electric components via the branch line sub-harnesses 42. The backbone control box 32 may be connected to electronic control units 51, 52 and 53 or other electric components via the branch line sub-harnesses 43. The backbone control box 33 may be connected to various electric components via the branch line sub-harnesses 44. The respective electronic control units 51, 52 and 53 can control various electric components on the vehicle via communication lines of the branch line sub-harnesses 42, 43 and 44, the backbone control boxes 31 to 33, and the like.

On the other hand, the vehicular circuit body illustrated in FIG. 1 is required to perform electrical connection not only between electric components in the vehicle interior 13 but also between the main power source and electric components in the engine room 11. The dash panel 16 is disposed at a boundary between the engine room 11 and a vehicle interior 13, and a location where an electrical connection member penetrates through the dash panel 16 is required to be perfectly sealed. In other words, the dash panel is required to have functions of insulating vibration from the engine room, reducing vibration or noise from a suspension, and blocking heat, noise, and smell in order to maintain the vehicle interior to be comfortable. Sufficient consideration is also required for the penetration location of the electrical connection member in order to prevent the functions from being impaired.

However, for example, if a component which has a large sectional area and is hardly bent in directions other than a specific direction, such as the backbone trunk line portions 21 to 23, is configured to penetrate through the dash panel 16, it is considerably hard to seal the penetration location, and thus it is also difficult to perform routing work of a vehicular circuit body.

In the vehicular circuit body illustrated in FIG. 1, the backbone trunk line portions 21 to 23 and the backbone control boxes 31 to 33 which are principal constituent elements are all disposed in a space on the vehicle interior 13 side, and thus the problem of the penetration location in the dash panel 16 can be easily solved.

Actually, as illustrated in FIG. 1, the main power source cable 41 connected to the left end of the backbone control box 31 is routed to pass through a penetration hole 16a of the dash panel 16, and a circuit of the main power source in the engine room 11 is connected to a power source circuit of the backbone control box 31 via the main power source cable 41. Consequently, power from the main power source can be supplied to the backbone control box 31. Since an easily bendable material can be used for the main power source cable 41, a sectional shape thereof can be made a circular shape, and a sectional area thereof can be made small, sealing of the penetration hole 16a can be facilitated, and thus it is also possible to prevent workability from degrading when routing work is performed.

In a case where various electric components in the engine room 11 are connected to the vehicular circuit body of the vehicle interior 13, for example, a part of the branch line sub-harnesses 42 connected to the backbone control box 31 is provided to pass through the dash panel 16, or a part of the branch line sub-harnesses 44 connected to the backbone control box 33 is provided to pass through the dash panel 16, and thus a desired electrical connection path can be realized. In this case, since the branch line sub-harnesses 42 and 44 have small sectional areas and are easily bent, a location where the branch line sub-harnesses pass through the dash panel 16 can be easily sealed.

Since the main power source is located in the engine room 11 side, a power source line or an earth line may be omitted in a branch line sub-harness provided at a penetration location of the dash panel 16, and only a communication line may be provided therein. Such a special branch line sub-harness may be configured as a communication trunk line separately from the branch line sub-harnesses 42 to 44 branched from the backbone trunk line.

The on-vehicle device of the present embodiment has the above-described fundamental configuration as illustrated in FIG. 1, but various changes or additions can be made in a configuration or an operation as will be described below for further improvement.

<Characteristic Technique Regarding Supply of Power>
<Configuration Example of System>

Figure 2:
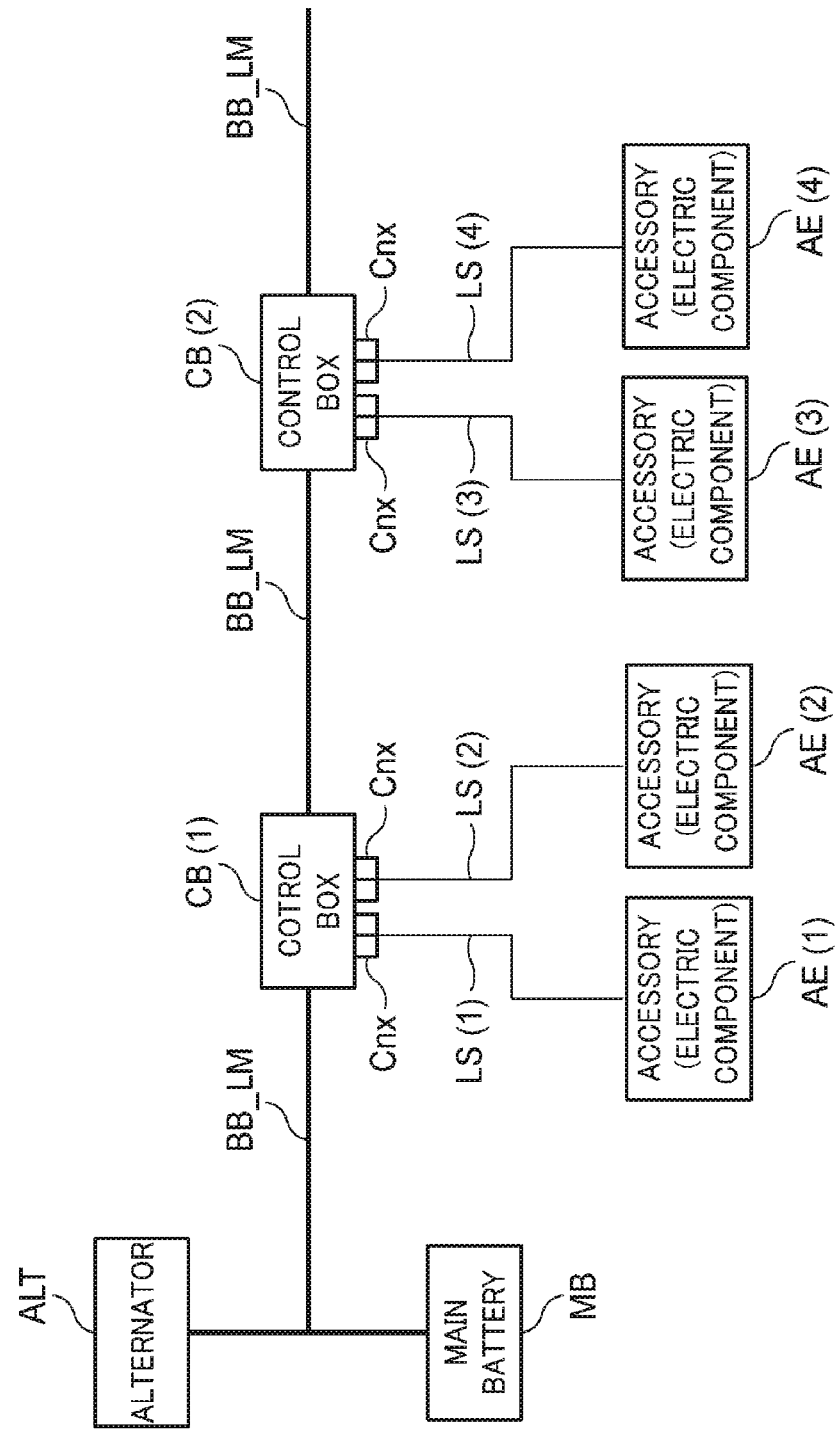
FIG. 2 is a block diagram illustrating a configuration example of an on-vehicle system.

A system illustrated in FIG. 2 includes a backbone trunk line BB_LM in order to secure principal paths for the supply of power and communication. A plurality of control boxes CB(1) and CB(2) are connected in the middle of the backbone trunk line BB_LM. A main battery MB and an alternator ALT which are main power sources of a vehicle side are connected to an upstream side of the backbone trunk line BB_LM.

Each of the control boxes CB(1) and CB(2) is provided with connection portions Cnx for connection to various accessories AE. The respective accessories AE correspond to electric components such as various loads or an electronic control unit (ECU) mounted on the vehicle.

In the configuration illustrated in FIG. 2, the accessory AE(1) is connected to a single connector in the connection portions Cnx of the control box CB(1) via a branch line sub-harness LS(1). The accessory AE(2) is connected to a single connector in the connection portions Cnx of the control box CB(1) via a branch line sub-harness LS(2). Similarly, each of the accessories AE(3) and AE(4) is connected to a single connector in the connection portions Cnx of the control box CB(2) via corresponding branch line sub-harnesses LS(3) and LS(4).

The connection portions Cnx of each control box CB is provided with a plurality of connectors (not illustrated in FIG. 2), and the plurality of connectors have the same shape, size and configuration. Therefore, in a case where each branch line sub-harness LS is connected to the connector of the connection portion Cnx, any one of the plurality of connectors may be selected.

Therefore, source power supplied to the backbone trunk line BB_LM from the main power source or the like branches at the location of the control box CB(1) or CB(2), and is supplied to each accessory AE via the branch line sub-harness LS connected to the branching location.

<Configuration Examples of Trunk Line>

Figure 3A:
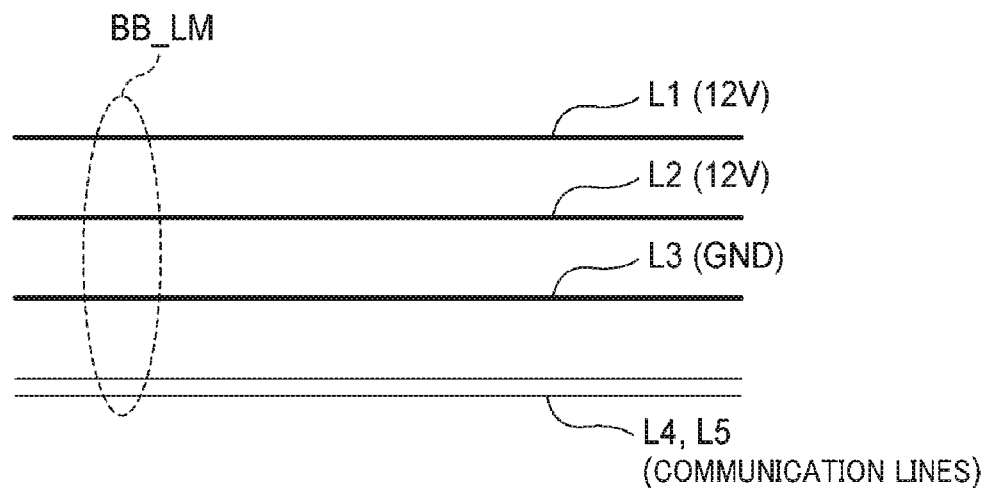
FIGS. 3A and 3B are electrical circuit diagrams illustrating configuration examples of backbone trunk lines.
Figure 3B:
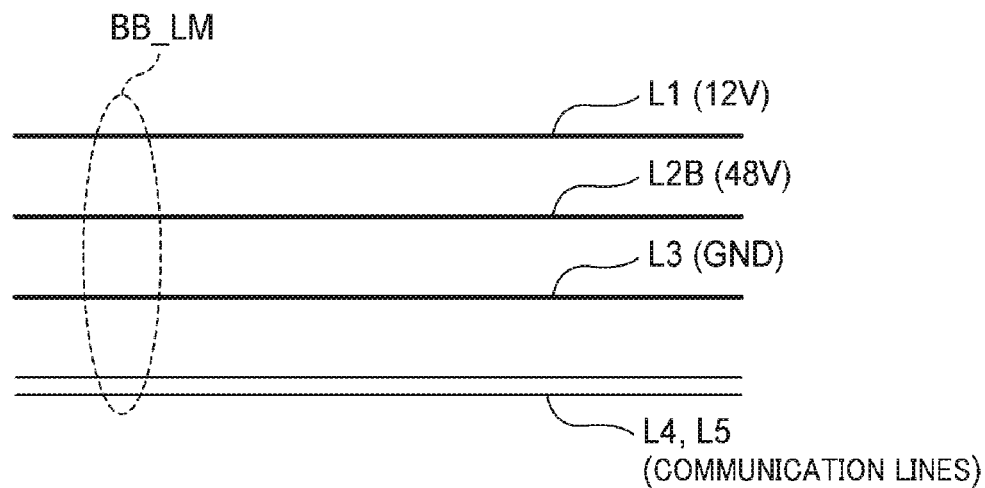

FIGS. 3A and 3B illustrate configuration examples of the backbone trunk line BB_LM. In the example illustrated in FIG. 3A, the backbone trunk line BB_LM includes power source lines L1 and L2 of independent two systems, an earth line L3, and communication lines L4 and L5 formed of two electric wires. The power source lines L1 and L2, the earth line L3, and the communication lines L4 and L5 are disposed as lines which are parallel to each other so as to extend in parallel. In an environment in which each accessory AE can be connected to the ground of the power source along other paths such as the vehicle body ground, the earth line L3 may be omitted from the constituent elements of the backbone trunk line BB_LM.

In the example illustrated in FIG. 3A, both of the power source lines L1 and L2 of two systems are configured to handle a common DC power source voltage of 12 V. The control box CB has a function of selecting one of the power source lines L1 and L2 of two systems and supplying power to a downstream side. Therefore, for example, in a case where only one of the power source lines L1 and L2 is disconnected in the middle of the backbone trunk line BB_LM, each control box CB can continuously supply power by using the remaining normal path.

In the example illustrated in FIG. 3B, the backbone trunk line BB_LM includes power source lines L1 and L2B of independent two systems, an earth line L3, and communication lines L4 and L5 formed of two electric wires. Of the power source lines L1 and L2B of two systems, one power source line L1 is configured to handle a DC power source voltage of 12 V. The other power source line L2B is configured to handle a DC power source voltage of 48 V.

Therefore, in the configuration illustrated in FIG. 3B, the control box CB may select one of the two kinds of power source voltages and supply the selected voltage to the accessory AE under control thereof. Thus, an appropriate power source voltage may be automatically selected depending on, for example, characteristics or situations of a load. For example, in a case where the load has large power consumption, a large power source current flows and a voltage drop in a supply line path increases, and thus, it is possible to prevent an increase in a power loss by selecting a higher power source voltage. As in the example illustrated in FIG. 3B, in a case where only one of the power source lines L1 and L2B is disconnected, each control box CB can continuously supply power by using the remaining normal path.

In a case where two kinds of power source voltages are used, a voltage may be stepped up from 12 V to 48 V on the main power source side so as to be supplied to the backbone trunk line BB_LM, and power of 12 V supplied from the backbone trunk line BB_LM may be stepped up to be generated as power of 48 V in either of the control boxes CB.

<Circuit Configuration Example of Power Source System>

Figure 4:
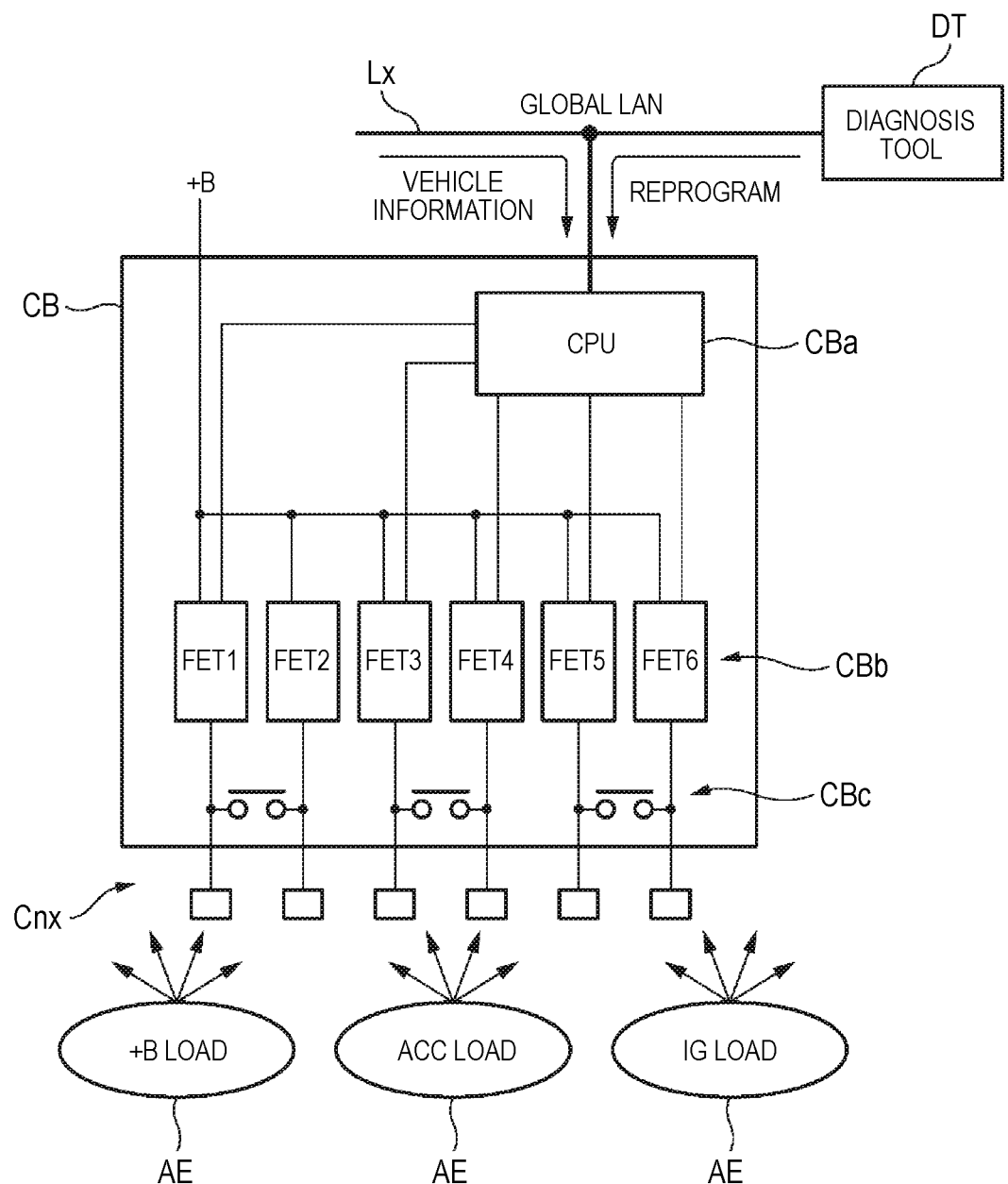
FIG. 4 is a block diagram illustrating a configuration example of an electrical circuit inside a control box.

FIG. 4 illustrates a specific configuration example regarding a power source system in the control box CB. In this configuration, a microcomputer (CPU) CBa, a switch circuit CBb, and a bridge circuit CBc are provided in the control box CB.

The microcomputer CBa is configured by a field-programmable gate array (FPGA), and thus a configuration and an operation thereof can be reconfigured according to an external program rewriting instruction (reprogram). A configuration of the FPGA in the present specification is only an example.

The microcomputer CBa is connected to a predetermined diagnosis tool DT via a communication line Lx. Actually, there is a case where the diagnosis tool DT is connected only when adjustment or maintenance is performed in a vehicle factory, and a case where the diagnosis tool DT is normally mounted on a vehicle in order to automatically solve a problem through diagnosis performed at all times.

As the communication line Lx, the communication lines L4 and L5 of the backbone trunk line BB_LM may be used without being changed, or a dedicated communication line may be separately prepared. If a predetermined manager gives an instruction by using the diagnosis tool DT, or a predetermined recovery program is executed, the diagnosis tool DT can rewrite a program regarding a configuration and an operation of the microcomputer CBa.

The switch circuit CBb includes a plurality of switching elements which distribute power of a DC power source voltage (+B) supplied from the power source line L1 or L2 of the backbone trunk line BB_LM to a plurality of output systems, and perform switching between ON and OFF of conduction for the respective output systems. In the example illustrated in FIG. 4, six power field effect transistors (FETs) are used as switching elements. Each of the switching elements is configured to be turned on and off according to an output from the microcomputer CBa. Regarding an operation of the switching element, in addition to simple turning-on and turning-off, for example, an output power adjustment function may be provided by performing pulse width control (PWM) using turning-on and turning-off.

The bridge circuit CBc includes a plurality of switching elements for connecting the plurality of output systems located on the output side of the switch circuit CBb to each other as bridges. Each of the switching elements is also configured to be turned on and off according to an output from the microcomputer CBa.

<Configuration Example of Power Control Function>

Figure 5:
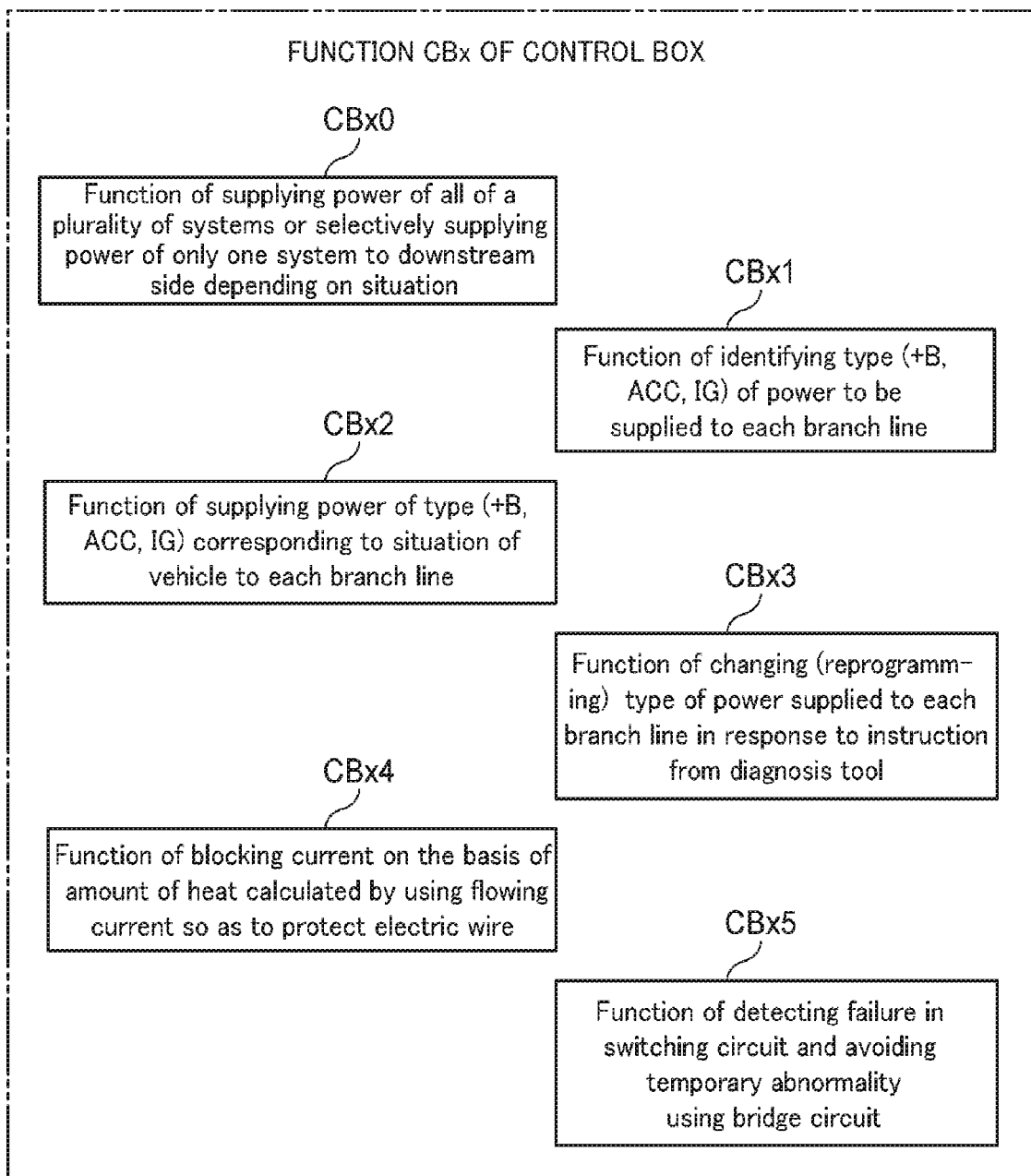
FIG. 5 is a block diagram illustrating a configuration example of functions of the control box.

FIG. 5 illustrates a specific example of a power control function CBx of the control box CB. In the example, the control box CB has six kinds of functions CBx0, CBx1, CBx2, CBx3, CBx4 and CBx5 illustrated in FIG. 5 as representative power control functions. These functions are realized through processes performed by the microcomputer CBa.

Function CBx0: The microcomputer CBa detects various situations, and supplies power of all of the plurality of systems supplied from the backbone trunk line BB_LM or selectively supplies power of only one thereof to a downstream side, that is, the accessories AE sides, depending on a detected situation. For example, in a case where the backbone trunk line BB_LM has the configuration illustrated in FIG. 3A, if disconnection of one of the power source lines L1 and L2 is detected, only power supplied from a normal path of the power source lines L1 and L2 is supplied to an output path. For example, in a case where the backbone trunk line BB_LM has the configuration illustrated in FIG. 3B, power of higher voltage (48 V) supplied from the power source line L2B is preferentially selected and is output based on a specification, or preferentially selected and is output to an output system connected to the accessory AE having an actually large load current.

Function CBx1: The microcomputer CBa identifies the type of power to be supplied to each branch line. Regarding the type of power, specifically, there are "+B" power which is supplied at all times, "ACC" power whose supply is in conjunction with turning-on and turning-off of an accessory switch, and "IG" power whose supply is in conjunction with turning-on and turning-off of an ignition switch. The microcomputer CBa identifies the kind of the accessory AE connected thereto and under the control thereof, and selectively supplies power of a more appropriate type among "+B, ACC, and IG" to a corresponding branch line. Power of a type determined in advance on the basis of constant data of a program may be supplied to each branch line, and information such as an ID may be acquired from the actually connected accessory AE so that the type of power may be identified.

Function CBx2: The microcomputer CBa monitors turning-on and turning-off states of an accessory switch and an ignition switch provided in a vehicle side, and controls ON and OFF of power of each output system for each type. In other words, power is supplied to a branch line of an output system to which "ACC: accessory" is allocated as the type of power by turning on the switch circuit CBb only when the accessory switch is turned on, and power is not supplied when the accessory switch is turned off. Power is supplied to a branch line of an output system to which "IG: ignition" is allocated as the type of power by turning on the switch circuit CBb only when the ignition switch is turned on, and power is not supplied when the ignition switch is turned off Function CBx3: The microcomputer CBa changes (reprograms) the types "+B, ACC, and IG" of source power supplied to each branch line in response to an instruction from the diagnosis tool DT. For example, the type of power output from an element "FET4" of the switch circuit CBb is allocated to "IG" in a normal state. When a certain necessity for change occurs, the type of power output from the element "FET4" is changed to "ACC" by executing the reprogram of the microcomputer CBa. This change influences control conditions for a control signal which is given to the element "FET4" by the microcomputer CBa. In other words, in a case where "IG" is allocated as the type of power, a control signal for the element "FET4" is changed according to a state of the ignition switch. In a case where "ACC" is allocated as the type of power, a control signal for the element "FET4" is changed according to a state of the accessory switch.

Function CBx4: The microcomputer CBa protects a corresponding electric wire for each branch line connected to an output side. Specifically, an actually conduction current in each output system is measured, an amount of heat is calculated on the basis of the conduction current, and a corresponding system of the switch circuit CBb is interrupted before a temperature increases to a predetermined level or more.

Function CBx5: The microcomputer CBa detects a failure in each switch circuit CBb, and automatically avoids the failure so as to maintain the function in a case where the failure is detected. Specifically, adjacent output systems are connected to each other by using the bridge circuit CBc, and the supply of power to an output side is continuously performed by temporarily using a path which does not pass through an element where the failure has occurred.

Instead of the above "+B, ACC, and IG", "+BA", "IGP", and "IGR" may be employed as a new classification of the type of power. "+BA" indicates power of a system which is turned on when a user comes close to a vehicle. "IGP" indicates power of a system which is turned on when ignition is brought into an ON state, and then an engine is in a full state. "IGR" indicates power of a system which is turned on when wheels rotate. Even in a case where such newly classified type of power is employed, the respective functions CBx1 and CBx2 illustrated in FIG. 5 can be realized in the same manner by acquiring information required for control.

<Characteristic Techniques Regarding Communication>
<Technique for Uninterrupted Communication>

Figure 6:
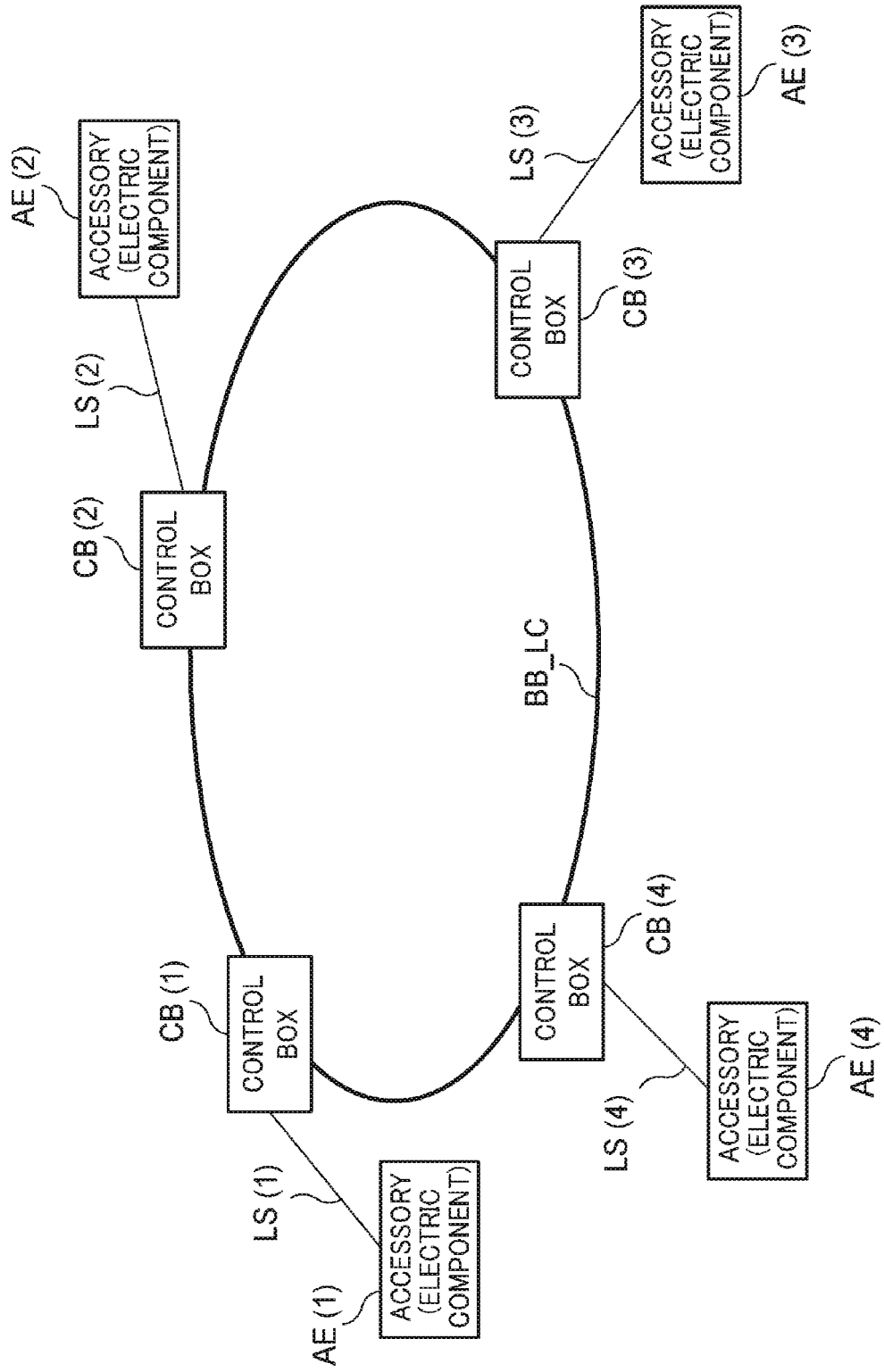
FIG. 6 is a block diagram illustrating a configuration example of a communication system in an on-vehicle system.

FIG. 6 illustrates a configuration example of a communication system mounted on a vehicle. A configuration illustrated in FIG. 6 employs a communication trunk line BB_LC formed in a ring form. Although not illustrated in FIG. 6, the communication trunk line BB_LC is integrally formed with a wire harness for power supply or a backbone trunk line including a specially provided power source line.

In the configuration illustrated in FIG. 6, a plurality of control boxes CB(1) to CB(4) are connected in the middle of the communication trunk line BB_LC in a distribution manner. Accessories AE(1) to AE(4) are respectively connected to and under the control of the control boxes CB(1) to CB(4) via branch line sub-harnesses LS(1) to LS(4). The accessories AE correspond to electric components such as various loads or an electronic control unit (ECU) disposed on a vehicle.

Each of the plurality of control boxes CB(1) to CB(4) has a function of supplying power diverging from a trunk line to the accessory AE via the branch line sub-harness LS, or branching a communication path passing through the communication trunk line BB_LC. Each branch line sub-harness LS includes a power source line and a communication line. The branch line sub-harness LS may include an earth line.

In a system having the configuration illustrated in FIG. 6, a case is assumed in which communication is performed between the accessory AE(1) and the accessory AE(2). In this case, in the communication trunk line BB_LC in a ring form, a path between the control box CB(1) and the control box CB(2) is used, and thus communication can be performed along the shortest path.

Further, a part of the communication trunk line BB_LC may be disconnected. However, even if the communication trunk line BB_LC is disconnected on the path between the control box CB(1) and the control box CB(2), the entire path has a ring form, and thus another path may be used. In other words, a communication path reaching the control box CB(2) from the control box CB(1) via the control box CB(4) and the control box CB(3) can be used, and thus a communication path between the accessory AE(1) and the accessory AE(2) is not interrupted.

The communication trunk line BB_LC in a ring form as illustrated in FIG. 6 may also be applied to a communication system having a linear path, such as the backbone trunk line BB_LM illustrated in FIG. 2, without being changed. For example, two trunk lines such as a communication trunk line BB_LC for a forward route and a communication trunk line BB_LC for a backward route are disposed on the linear backbone trunk line BB_LM in parallel to each other as a set, and ends of the communication trunk lines BB_LC for a forward route and a backward route are connected to each other, and thus a communication path in a ring form, that is, in a closed loop can be configured.

<Security Technique for Connection Portion>
<Protection Using Physical Means>

Figure 8A:
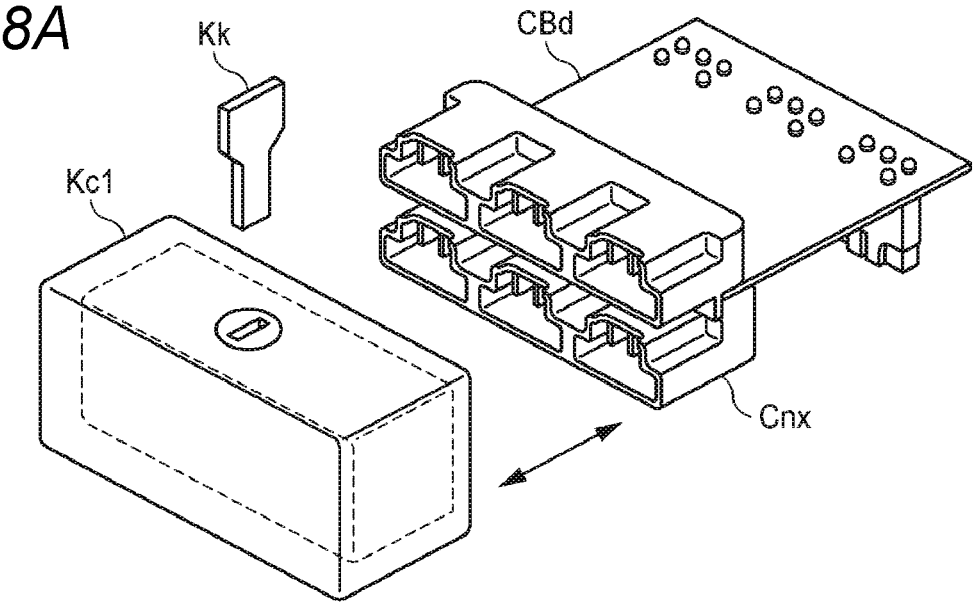
FIGS. 8A, 8B and 8C are perspective views respectively illustrating configuration examples for physically protecting unused connectors in a connection portion of the control box.
Figure 8B:
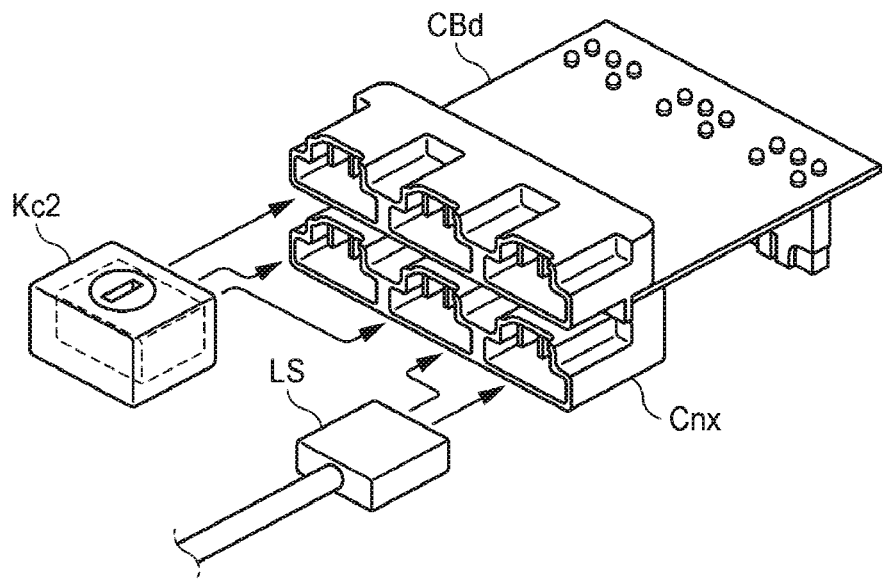
Figure 8C:
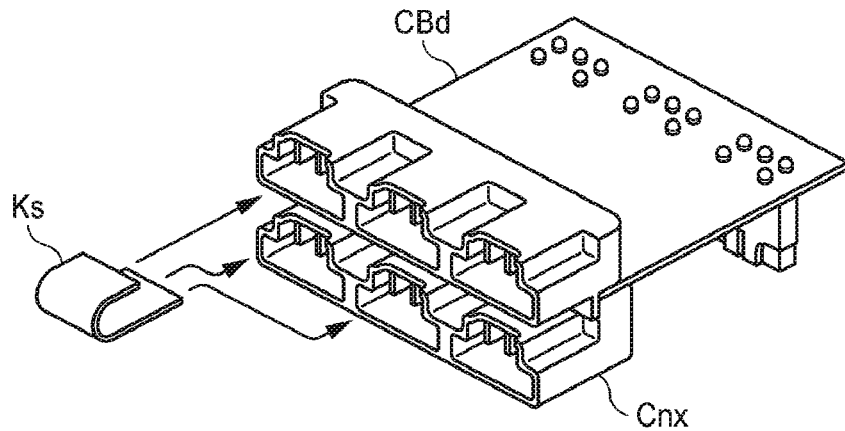

FIGS. 8A, 8B and 8C illustrate specific examples of techniques for physically protecting the connection portion Cnx of each control box CB. A circuit board CBd illustrated in FIGS. 8A, 8B and 8C is provided in each control box CB.

Each of the control boxes CB(1) to CB(4) has the connection portions Cnx including a plurality of connectors so as to be connected to various accessories AE via the branch line sub-harnesses LS or the like. The connectors are configured to be suitable for a predetermined standard such as the universal serial bus (USB), and the plurality of connectors are disposed to be arranged side by side for connection to a plurality of apparatuses.

However, in a specific control box CB, none of the connectors of the connection portion Cnx may be used, or some of the connectors of the connection portion Cnx may not be used, due to a difference in a vehicle model, a difference in a grade, a difference in a destination, and a difference in an option selected by a user purchasing a vehicle. If a configuration of each control box CB is changed so as to reflect the difference in the vehicle model, the difference in the grade, the difference in the destination, or the like, such a configuration cannot be used in common, and thus the number of control boxes CB is increased, thereby also increasing manufacturing cost.

On the other hand, in a case where a connector in an unoccupied state in which no branch line sub-harness LS is connected thereto in a defined vehicular default state is present in the connection portion Cnx, a user or a third party may freely and illegally connect a certain apparatus to the connector in an unoccupied state. Physical configurations illustrated in FIGS. 8A, 8B and 8C are used to prevent such illegality.

In the configuration illustrated in FIG. 8A, a case is assumed in which none of six connectors of the connection portion Cnx are used. Therefore, openings of all of the connectors are closed by using a physical cover Kc1 with a key so that none of the connectors of the connection portion Cnx are freely used.

The cover Kc1 with a key is a cover covering an outside of the connection portion Cnx, and can be fixed to the connection portion Cnx correctly. The cover Kc1 with a key has a key mechanism built therein, and has a structure in which fixation of the cover Kc1 with a key cannot be unlocked unless an operation is performed by using a physical unlock key Kk prepared in advance. Therefore, a person without the unlock key Kk cannot illegally connect any apparatus to the connectors of the connection portion Cnx.

In the configuration illustrated in FIG. 8B, a case is assumed in which the predetermined branch line sub-harnesses LS or the like are connected to some connectors of the connection portion Cnx, and remaining connectors are in an unoccupied state. Therefore, in the connection portion Cnx, openings or the like of the connectors in an unoccupied state are individually closed by using a physical cover Kc2 with a key so that the connectors are not freely used.

The cover Kc2 with a key is structurally fixed to a connector in a state of closing a corresponding single opening as a result of being attached to one of the six connectors having the same shape and size in the connection portion Cnx. In the same manner as the cover Kc1 with a key, the cover Kc2 with a key has a key mechanism built therein, and has a structure in which fixation of the cover Kc2 with a key cannot be unlocked unless an operation is performed by using a physical unlock key Kk prepared in advance.

In the configuration illustrated in FIG. 8C, a case is assumed in which the predetermined branch line sub-harnesses LS or the like are connected to some connectors of the connection portion Cnx, and remaining connectors are in an unoccupied state. Therefore, in the connection portion Cnx, openings or the like of the connectors in an unoccupied state are individually closed by using a physical seal Ks for sealing so that the connectors are not freely used. There may be a configuration in which openings of a plurality of connectors are collectively covered with a single seal Ks for sealing.

For example, the seal Ks for sealing is formed in an elongated and thin tape form, and is made of a resin. For example, a special pattern is formed on a surface of the seal Ks for sealing through printing so as to be clearly differentiated from other seals generally available in the market. Both ends of the seal Ks for sealing in a longitudinal direction are fixed to the connection portion Cnx via an adhesive or the like.

In a case where a user or the like illegally uses a specific connector whose opening is covered with the seal Ks for sealing so as not to be used, the seal Ks for sealing is broken or the adhesive location is torn off, and thus signs of removing the seal can be physically left. In other words, illegal use of a connector can be easily confirmed by a predetermined manager or the like after the illegal use is performed.

<Protection Based on Control>

Figure 9:
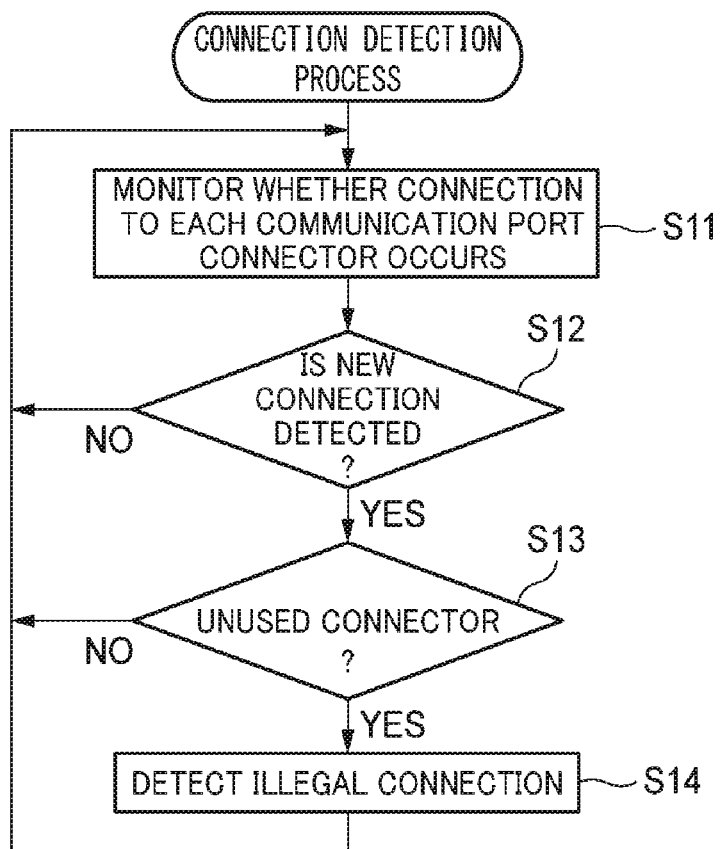
FIG. 9 is a flowchart illustrating an example of a process for protecting an unused connector through control.

FIG. 9 illustrates a specific example of a technique for protecting the connection portion Cnx of each control box CB on the basis of electrical control. In other words, a microcomputer (not illustrated) provided on the circuit board CBd performs control illustrated in FIG. 9, and thus protects an unused connector of the connection portion Cnx from illegal use.

The microcomputer on the circuit board CBd recognizes whether or not each connector of the connection portion Cnx managed by the microcomputer is used on the basis of a program and constant data written in advance by using a diagnosis tool. The microcomputer monitors voltages at a plurality of terminals provided in the respective connectors, and can thus actually detect whether or not a certain apparatus is connected to a connector.

In step S11, the microcomputer monitors whether or not each communication port connector is connected for each connector. If new connection to each connector is detected in step S12, the flow proceeds to step S13. In a case where the connector to which a new connection is detected is registered as an unused connector, the flow proceeds to the next step S14, and a process of detecting illegal connection is performed.

Through the process in step S14, for example, data indicating the illegal use is preserved in a nonvolatile memory, or abnormality display regarding the illegal use is performed on a display such as a meter unit. Communication using a corresponding connector may be automatically interrupted so that illegal use of an apparatus is prevented.

<Technique for Mutually Connecting Communication Networks and Communication Apparatuses Based on Various Specifications>

Figure 7:
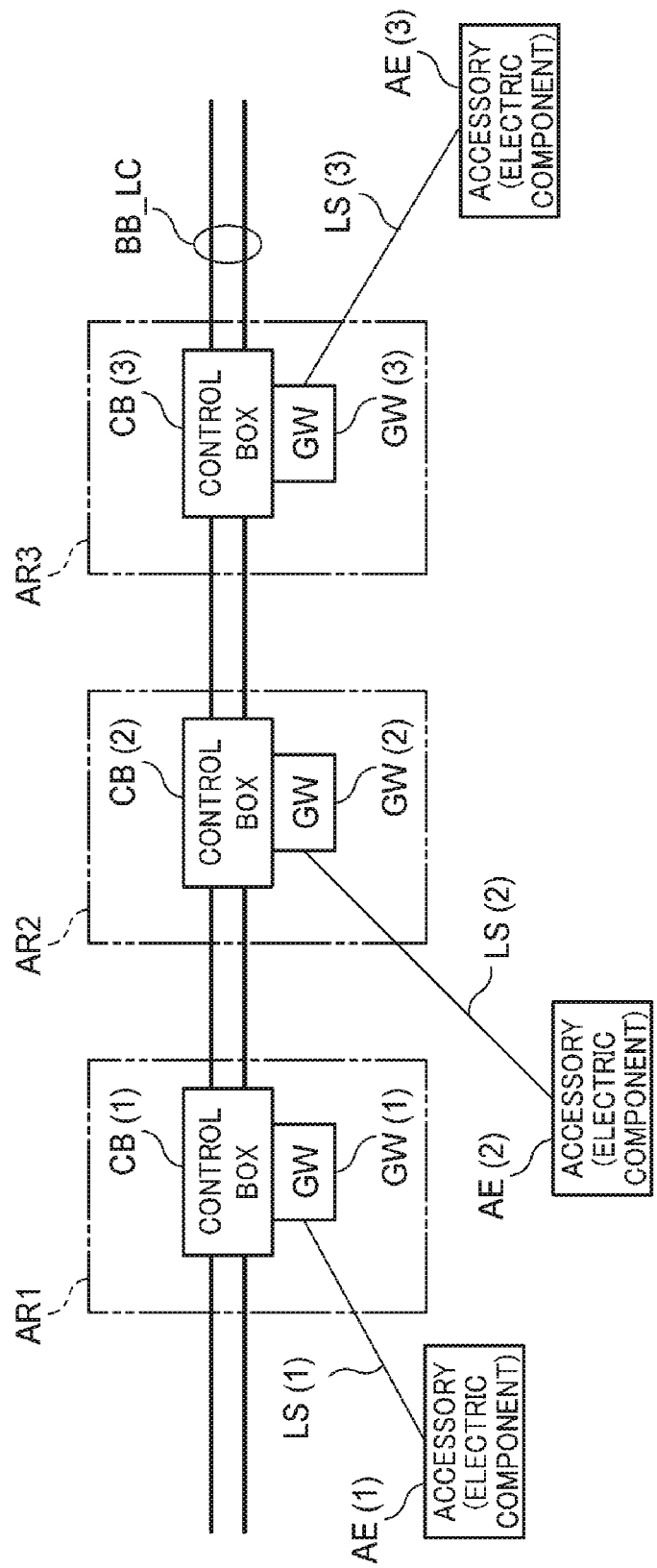
FIG. 7 is a block diagram illustrating a configuration example of the communication system in the on-vehicle system including a gateway.

FIG. 7 illustrates a configuration example of a communication system mounted on a vehicle. The communication system illustrated in FIG. 7 includes a communication trunk line BB_LC. Although not illustrated in FIG. 7, the communication trunk line BB_LC is integrally formed with a wire harness for power supply or a backbone trunk line including a specially provided power source line. The backbone trunk line is provided with an earth line as necessary.

In the configuration illustrated in FIG. 7, a plurality of control boxes CB(1), CB(2) and CB(3) are connected to the communication trunk line BB_LC used in common in a state of being distributed to a plurality of areas AR1, AR2 and AR3. Specific examples of the areas AR1, AR2 and AR3 may include an engine room, an instrument panel region, a floor region, and a luggage room.

Each of the control boxes CB(1) to CB(3) has a function of dividing power supplied to a trunk line so as to supply the power to the accessory AE, or a function of branching a path of a communication line so as to secure a connection path. In the configuration illustrated in FIG. 7, each of the plurality of control boxes CB(1), CB(2) and CB(3) includes a gateway GW.

Each of the plurality of gateways GW(1) to GW(3) illustrated in FIG. 7 fundamentally has a function of connecting networks or apparatuses based on different specifications such as communication protocols to each other.

For example, in a system on a vehicle, communication apparatuses or networks based on various standards using different specifications, such as Controller Area Network (CAN), CAN with Flexible Data Rate (CAN_FD), Clock Extensible Peripheral Interface (CXPI), Ethernet (registered trademark), and an optical communication network, may be employed for each area, each vehicle model, and the like. The gateway GW absorbs such a difference between the specifications, and thus apparatuses having different specifications can be communicably connected to each other.

In the configuration illustrated in FIG. 7, a gateway GW is respectively provided in the control box CB for each area, and thus communication lines can be connected to each other by using the gateway GW even if a communication specification differs for each area.

<Technique for Enabling High-Speed Communication and Technique for Gateway>

Figure 10:
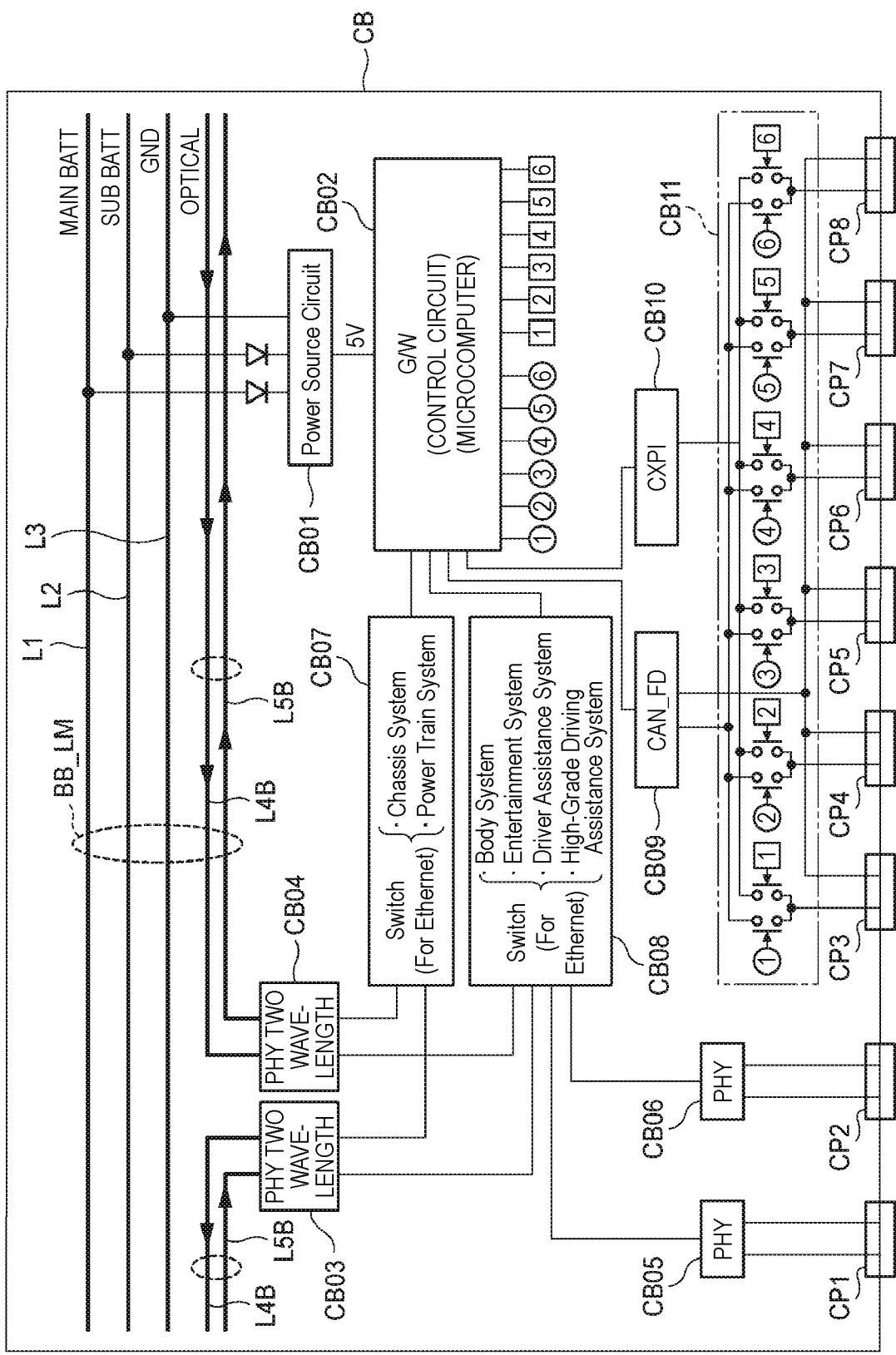
FIG. 10 is a block diagram illustrating a configuration example of a communication system inside the control box.
Figure 11:
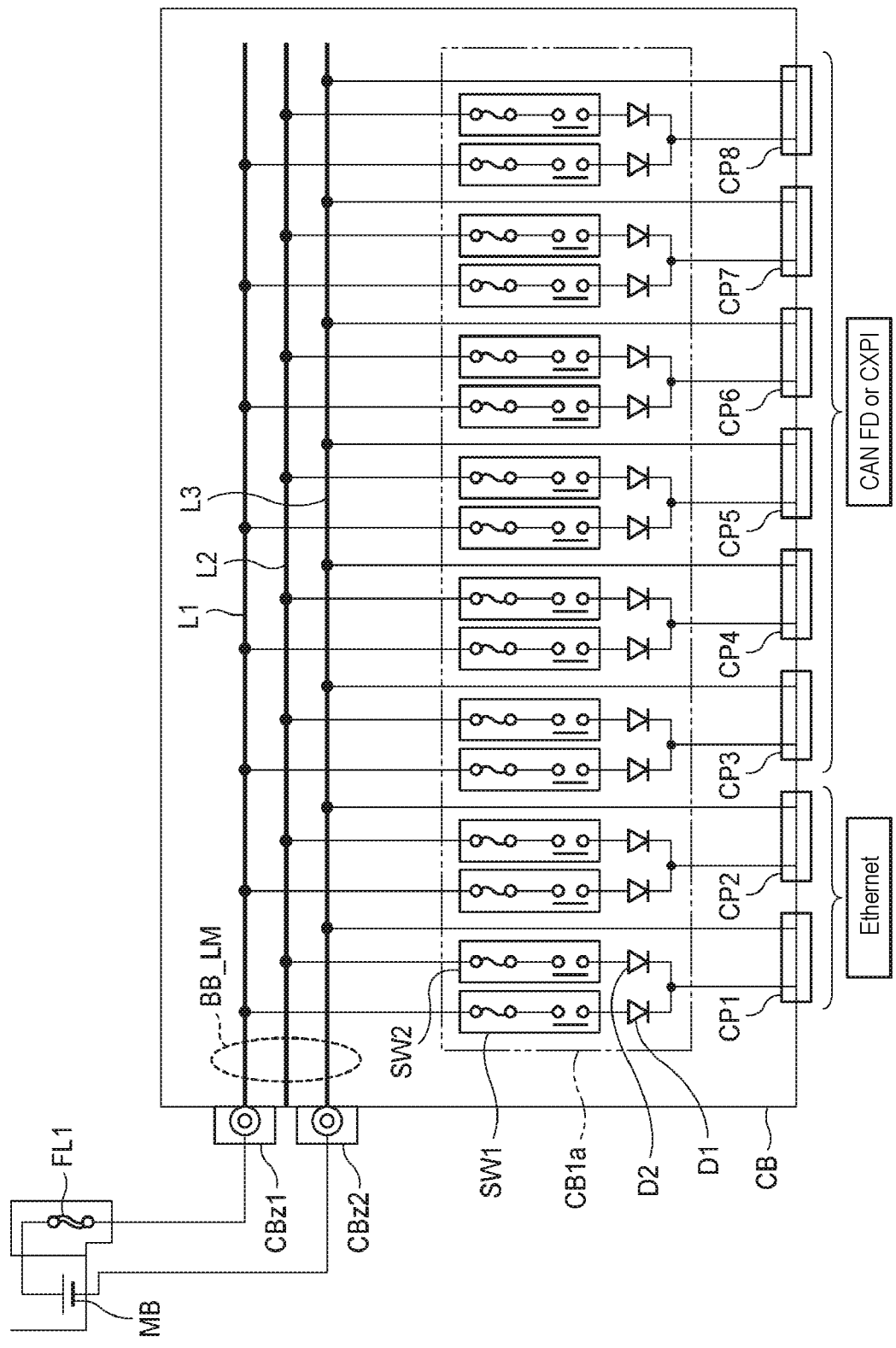
FIG. 11 is an electrical circuit diagram illustrating a circuit configuration example for supplying power to each communication system inside the control box.

FIG. 10 illustrates configuration examples of the control box CB having an optical communication function and a gateway function and a communication system of the backbone trunk line BB_LM. FIG. 11 illustrates a configuration example for supplying source power to a communication system.

Also in the system illustrated in FIG. 10, the control box CB is connected to the backbone trunk line BB_LM. The backbone trunk line BB_LM illustrated in FIG. 10 includes power source lines L1 and L2, an earth line L3, and communication lines L4B and L5B. In FIG. 10, GND indicates the ground, that is, the earth.

In the example illustrated in FIG. 10, the power source line L1 is connected to a main battery (BATT) of the vehicle, and the power source line L2 is connected to a sub-battery. The communication lines L4B and L5B are formed of optical fibers so as to cope with optical communication. The optical communication is employed in the trunk line, and thus high-speed communication can be performed at various locations on the vehicle. Also, it is hard to be influenced by noise.

The control box CB illustrated in FIG. 10 copes with each communication function in Ethernet (Trademark), CAN_FD, and CXPI in addition to the optical communication. Specifically, eight sets of communication port connectors CP1 to CP8 are provided in the control box CB. The communication port connectors CP1 and CP2 are communication ports for use only in Ethernet (Trademark), and each of the communication port connectors CP3 to CP8 is a communication port for which one of specifications such as CAN_FD and CXPI is selectable. Each of the eight sets of communication port connectors CP1 to CP8 has a specification corresponding to a metal communication line. A branch line has a metal specification, and thus component cost of the branch line can be reduced.

As illustrated in FIG. 10, the control box CB includes a power source circuit CB01, a gateway control circuit CB02, PHY circuits CB03, CB04, CB05 and CB06, network switches CB07 and CB08, transceivers CB09 and CB10, and a switching circuit CB11.

The power source circuit CB01 is connected to the power source lines L1 and L2 and the earth line L3, and a power source voltage, for example, "+5 V" required in each circuit such as the gateway control circuit CB02 is generated on the basis of source power supplied from the backbone trunk line BB_LM.

The gateway control circuit CB02 is formed of a microcomputer, and realizes a function of a gateway (GW). In other words, protocol conversion between communications based on different standards or signal switching control is performed. A control signal for switching in the switching circuit CB11 is also generated.

The PHY circuits CB03, CB04, CB05 and CB06 provide an interface function of a physical layer in Ethernet (Trademark). Each of the PHY circuits CB03 and CB04 has a function of performing mutual conversion between an optical signal and an electric signal or mutual conversion between a digital signal and an analog signal so as to correspond to two wavelengths of the optical signal. Each of the PHY circuits CB05 and CB06 has a function of performing mutual conversion between a digital signal and an analog signal so as to correspond to a signal based on the metal standard of Ethernet (Trademark).

The network switches CB07 and CB08 are switch circuits corresponding to the standards of Ethernet (Trademark), and have a function of determining whether or not transmission to each connected apparatus is to be performed by taking into consideration a destination of received data.

In the configuration illustrated in FIG. 10, the network switch CB07 has a function of controlling a chassis system and a power train system on the vehicle system. The network switch CB08 has a function of controlling a body system, an entertainment system, a driving assistance system, and a high-grade driving assistance system on the vehicle system. The network switch CB07 is connected between the PHY circuits CB03 and CB04, and the gateway control circuit CB02. The network switch CB08 is connected between the PHY circuits CB03 to CB06, and the gateway control circuit CB02.

The transceivers CB09 and CB10 are connected between the gateway control circuit CB02 and the switching circuit CB11. The transceiver CB09 has a function of transmitting and receiving signals corresponding to the standard of CAN_FD. The transceiver CB10 has a function of transmitting and receiving signals corresponding to the standard of CXPI.

The switching circuit CB11 has a switching function of enabling CAN_FD using two communication lines and CXPI using a single communication line to be used by the common communication port connectors CP3 to CP8. Specifically, the switching circuit CB11 has twelve switching elements for switching between signals which are input to the respective communication port connectors CP3 to CP8. Turning-on and turning-off of the switching elements are controlled on the basis of control signals output from the gateway control circuit CB02, and thus signals suitable for any one of CAN_FD and CXPI can be used by the communication port connectors CP3 to CP8.

For example, in a case where an accessory AE such as cameras or various sensors requiring a relatively high communication speed is connected to and under the control of the control box CB, it is possible to satisfy a specification required for high-speed communication by using, for example, the communication port connector CP1 or CP2. In a case where an accessory AE performing relatively low-speed communication is connected, it is possible to ensure a necessary minimum communication function by using the communication port connectors CP3 to CP8.

FIG. 11 illustrates a circuit configuration example for supplying source power to each of the communication port connectors CP1 to CP8. In the configuration illustrated in FIG. 11, terminals CBz1 and CBz2 provided in the control box CB are connected to a main power source. Specifically, the terminal CBz1 is connected to a positive electrode of the main battery MB via a fusible link FL built in the main battery MB. The terminal CBz2 of the control box CB is connected to a negative electrode of the main battery MB. The terminals CBz1 and CBz2 are respectively connected to the power source line L1 and the earth line L3 of the backbone trunk line BB_LM. The power source line L2 of the backbone trunk line BB_LM is connected to a positive electrode of a sub-battery (not illustrated).

A power source circuit CB01a for supplying source power to each of the communication port connectors CP1 to CP8 of eight systems is built in the control box CB. The power source circuit CB01a includes switch circuits SW01 and SW02, and diodes D1 and D2 for each system regarding the communication port connector.

Each of the switch circuits SW01 and SW02 is formed as a circuit in which a switching element whose turning-on and turning-off can be controlled by a control circuit of the control box CB is connected in series to a fuse. The diodes D1 and D2 have a function of preventing a reverse current.

Therefore, if, of the switch circuits SW01 and SW02, only the switch circuit SW01 is turned on, power from the main power source can be supplied to each of the communication port connectors CP1 to CP8. If, of the switch circuits SW01 and SW02, only the switch circuit SW02 is turned on, power from the sub-power source can be supplied to each of the communication port connectors CP1 to CP8.

<Special Optical Communication Technique>
<Combination of a Plurality of Communication Paths>

Figure 54:
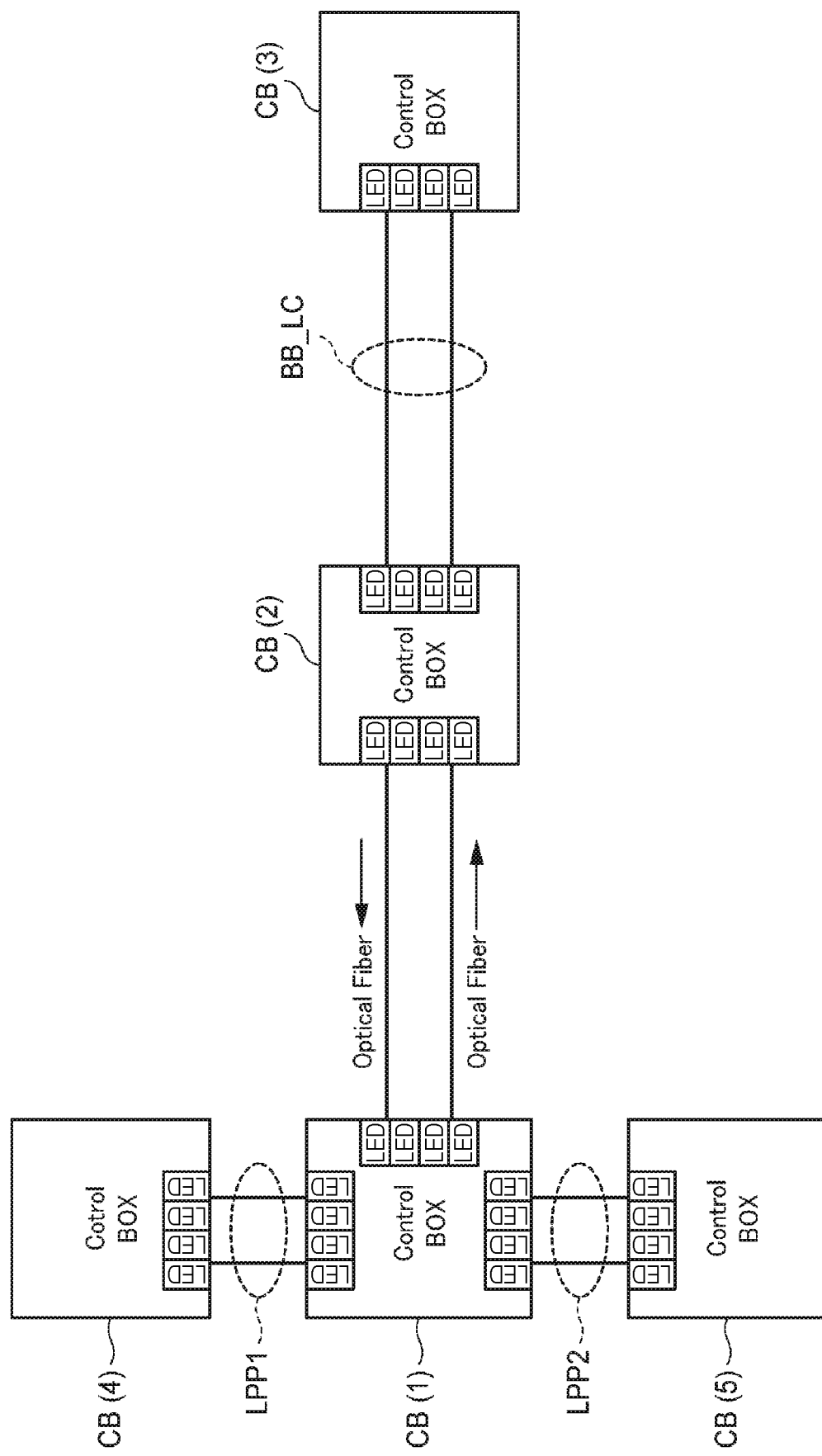
FIG. 54 is a block diagram illustrating a configuration example of a communication system in an on-vehicle system.

FIG. 54 illustrates a configuration example of a communication system of an on-vehicle system. The on-vehicle system illustrated in FIG. 54 includes five control boxes CB(1) to CB(5). Three control boxes CB(1), CB(2) and CB(3) are connected to each other via a communication trunk line BB_LC configured in a ring form. A peer-to-peer (P2P) communication line LPP1 is connected between the control box CB(1) and the control box CB(4), and a P2P communication line LPP2 is connected between the control box CB(1) and the control box CB(5). Optical communication is used for all of the communication trunk line BB_LC, and the communication lines LPP1 and LPP2.

In a case where the optical communication is used, each relay node on a communication path corresponding to the control box CB performs a process of converting a received optical signal into an electrical signal, converting the electrical signal to an optical signal again, and sending the optical signal to a transmission path. Therefore, a delay of an optical signal occurs for each relay node. In a case where a communication path of the entire system is configured in a ring form, a delay of an optical signal increases due to an increase in the number of connected relay nodes.

On the other hand, since, in the on-vehicle system illustrated in FIG. 54, the communication trunk line BB_LC having a ring form and the P2P communication lines LPP1 and LPP2 are combined with each other, a signal delay can be reduced, and high-speed communication can be performed. In other words, since the number of nodes on the communication trunk line BB_LC having a ring form is three, a delay occurring on the ring can be minimized Therefore, for example, in a case where optical communication is performed between the control box CB(3) and the control box CB(4), a signal delay is reduced, and thus high-speed communication can be performed, compared with a case where the entire communication path is configured in a ring form.

Since the communication trunk line BB_LC having a ring form is provided, there is redundancy in the communication path, and thus reliability of communication is improved. In other words, in a case where disconnection occurs at a single location on the communication trunk line BB_LC, communication can be performed by using other paths which are not disconnected. A trunk line may be formed of a transmission path for optical communication, a branch line may be formed of a transmission path for an electrical signal, and these may be combined with each other.

<Simultaneous Use of Optical Signals with a Plurality of Wavelengths>

Figure 55:
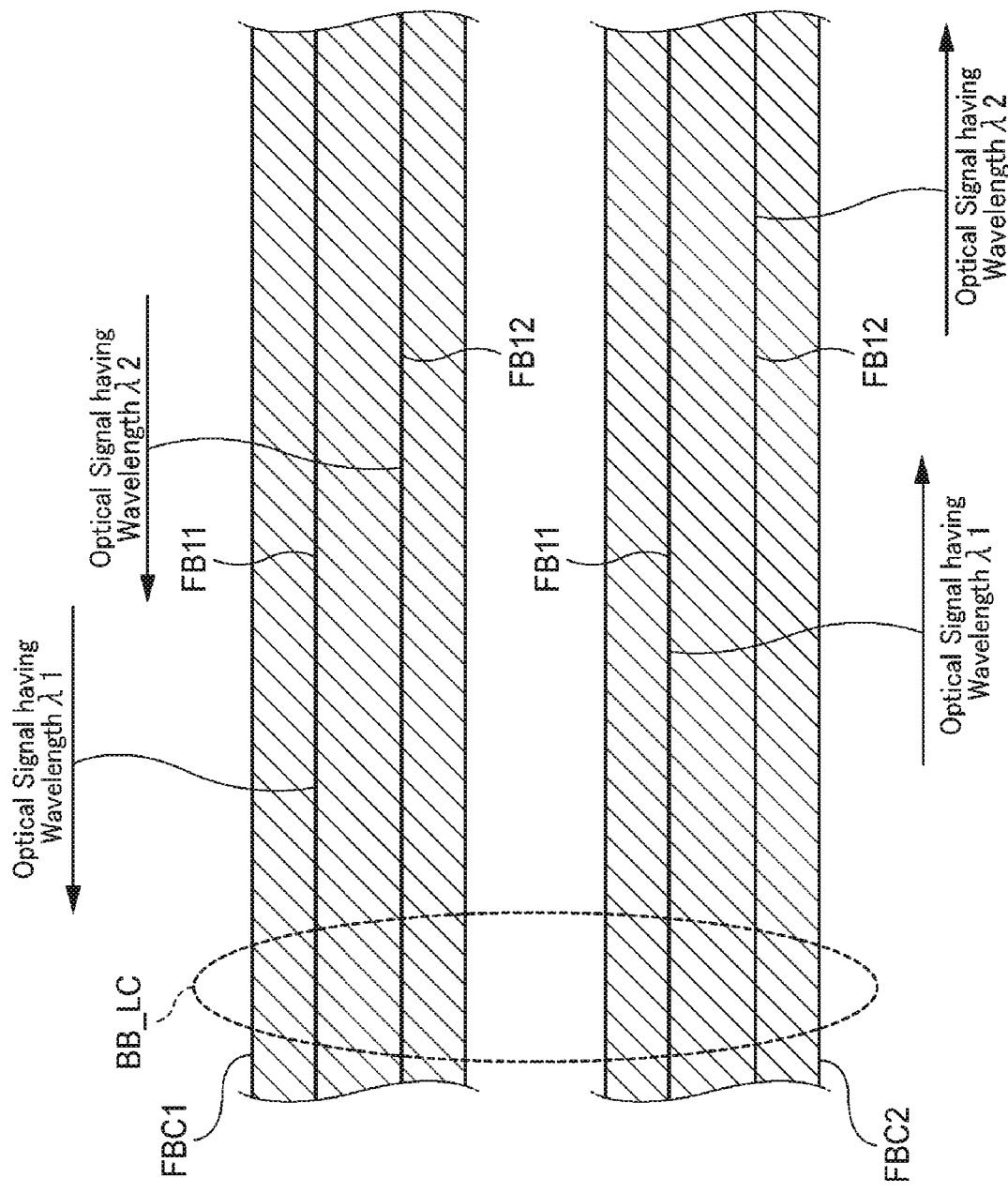
FIG. 55 is a longitudinal sectional view illustrating a configuration example of a communication trunk line BB_LC.

FIG. 55 illustrates a configuration example of a section of the communication trunk line BB_LC in the on-vehicle system illustrated in FIG. 54. In other words, as illustrated in FIG. 55, the communication trunk line BB_LC illustrated in FIG. 54 includes an optical fiber cable FBC1 forming a forward route and an optical fiber cable FBC2 forming a backward route. Each of the optical fiber cables FBC1 and FBC2 has two optical fibers FB11 and FB12 built therein.

In the present embodiment, both of a specific wavelength $\lambda 1$ and a wavelength $\lambda 2$ which is different from the wavelength $\lambda 1$ are respectively used for handled optical signals. As illustrated in FIG. 55, one optical fiber cable FBC1 transmits an optical signal having the wavelength $\lambda 1$, and the other optical fiber cable FBC2 transmits an optical signal having the wavelength $\lambda 2$.

Therefore, two communication paths can be secured together by using optical signals corresponding to two wavelengths on the communication trunk line BB_LC, and thus redundancy can be provided. Consequently, it is possible to improve reliability of communication.

As a specific example, optical signals corresponding to two kinds of wavelengths are used depending on importance or priority. For example, a signal used to control an important load on a vehicle is allocated to an optical signal having the wavelength $\lambda 1$, and a signal used to control a load having low importance is allocated to an optical signal corresponding to the wavelength $\lambda 2$. In a case where communication using an optical signal having the wavelength $\lambda 1$ on which an important load is put is interrupted, information to be transmitted is automatically transmitted by using an optical signal having the wavelength $\lambda 2$. Consequently, it is possible to secure a path for continuously performing communication. This control may be performed by using a microcomputer on each control box CB.

<Use of Wavelength Multiplexing/Time Division Multiplexing (TDM)>

Figure 56:
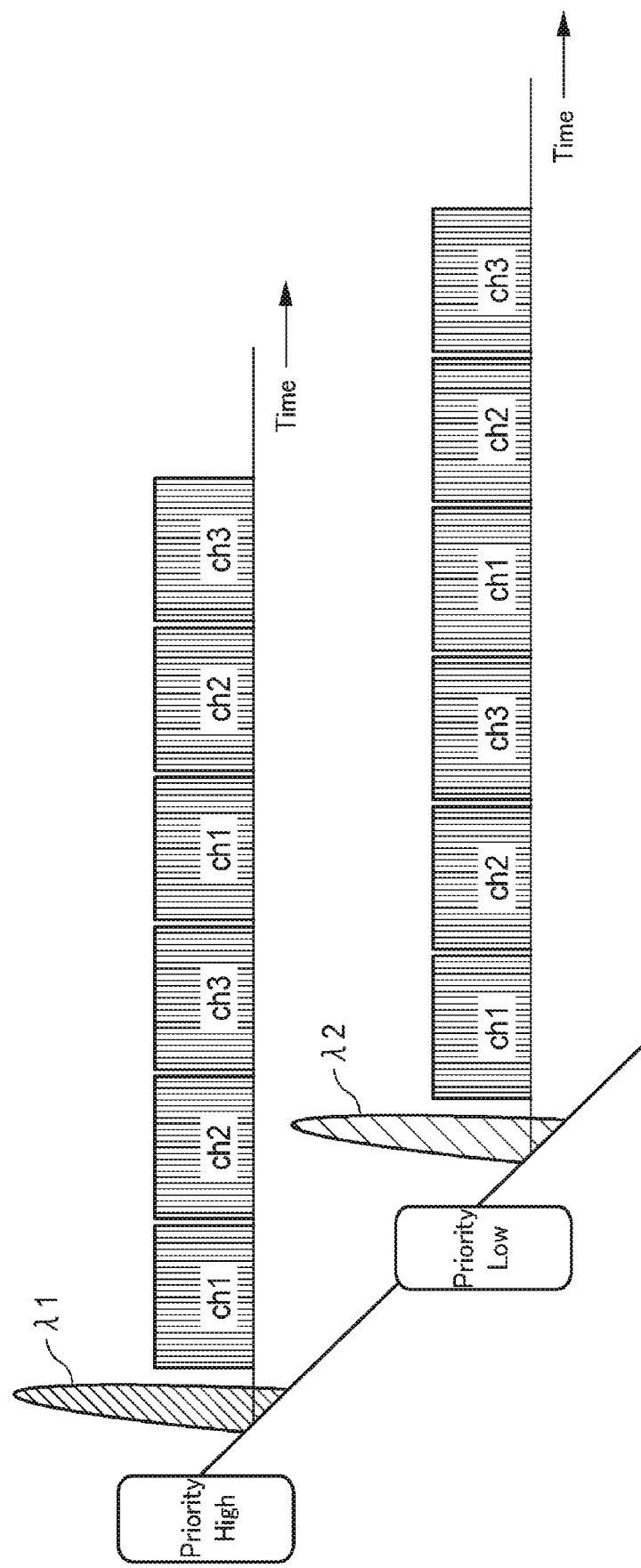
FIG. 56 is a time chart illustrating a configuration example of an optical signal on which wavelength multiplexing and time division multiplexing are performed.
Figure 57:
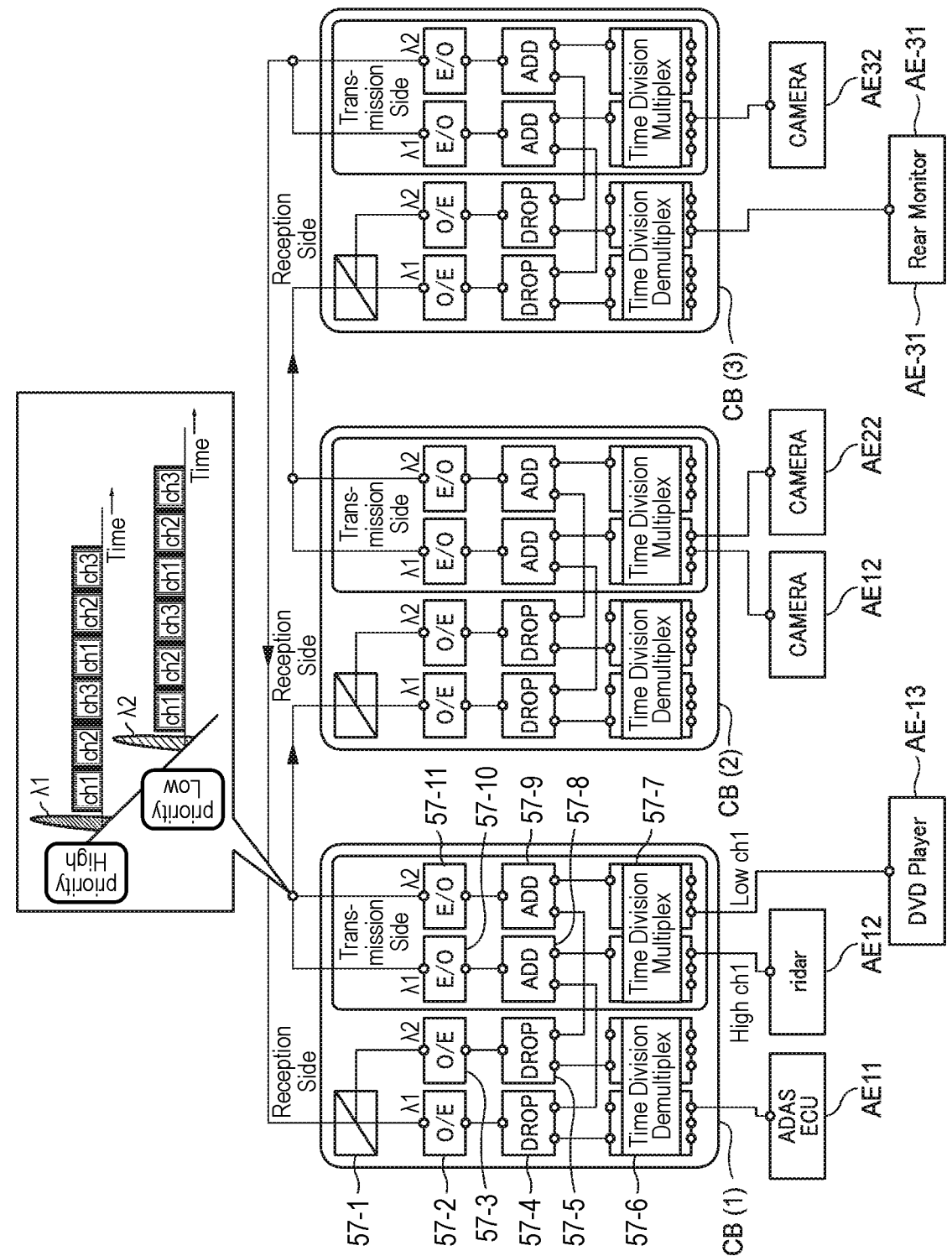
FIG. 57 is a block diagram illustrating a configuration example of a communication system in an on-vehicle system performing optical multiplexing communication.

FIG. 56 illustrates a configuration example of an optical signal on which wavelength multiplexing and time division multiplexing are performed. FIG. 57 illustrates a configuration example of a communication system of an on-vehicle system performing optical wavelength multiplex communication.

For example, in a case where an optical signal having the wavelength $\lambda 1$ and an optical signal having the wavelength $\lambda 2$ are used together, the wavelengths of the two optical signals are different from each other, and thus the signals may be transmitted with a single optical fiber through wavelength multiplexing as in FIG. 56.

Therefore, either one of the two optical fibers FB11 and FB12 illustrated in FIG. 55 can be omitted. High priority may be allocated to the optical signal having the wavelength $\lambda 1$, and low priority may be allocated to the optical signal having the wavelength $\lambda 2$. The optical signals are subjected to time division multiplexing, and thus optical signals ch1, ch2 and ch3 of a plurality of channels can be sequentially transmitted as illustrated in FIG. 56 by a single communication line.

In the on-vehicle system illustrated in FIG. 57, three control boxes CB(1), CB(2) and CB(3) are connected to each other via the communication trunk line BB_LC. The communication trunk line BB_LC illustrated in FIG. 57 is formed of an optical fiber for a forward route and an optical fiber a backward route, and is configured in a ring form as a whole.

An optical signal subjected to wavelength multiplexing and time division multiplexing is sent onto a single optical fiber of the communication trunk line BB_LC as illustrated in FIG. 56, and thus optical communication can be performed between the control box CB(1) to the control box CB(3).

Each of the control boxes CB(1) to CB(3) illustrated in FIG. 57 includes a reception side circuit and a transmission side circuit. The reception side circuit includes a splitter 57-1, optical/electrical conversion units (O/E) 57-2 and 57-3, branching units (DROP) 57-4 and 57-5, and a time division demultiplexer 57-6. The transmission side circuit includes a time division multiplexer 57-7, inserting units (ADD) 57-8 and 57-9, and electrical/optical conversion units (E/O) 57-10 and 57-11.

In other words, in the control boxes CB(1) to CB(3), an optical signal is incident to the reception side circuit from the single optical fiber of the communication trunk line BB_LC. The optical signal is divided into two optical signals respectively having the wavelengths $\lambda 1$ and $\lambda 2$ in the splitter 57-1. The divided optical signal having the wavelength $\lambda 1$ is converted into an electrical signal by the /optical/electrical conversion unit 57-2, and branches into two systems in the branching unit 57-4. One branched electrical signal is input to the time division demultiplexer 57-6, and the other electrical signal is input to the transmission side circuit.

Similarly, the divided optical signal having the wavelength $\lambda 2$ is converted into an electrical signal by the optical/electrical conversion unit 57-3, and branches into two systems in the branching unit 57-5. One branched electrical signal is input to the time division demultiplexer 57-6, and the other electrical signal is input to the transmission side circuit. The time division demultiplexer 57-6 divides the input electrical signals which are output from the branching units 57-4 and 57-5 for each time, so as to generate signals of a plurality of channels (ch1, ch2, and ch3).

For example, the control box CB(1) sends a received signal of a first channel output from the time division demultiplexer 57-6 to accessory AE11 (ADAS ECU). The control box CB(2) may use a received signal of a second channel output from the time division demultiplexer 57-6. The control box CB(3) sends a received signal of a third channel output from the time division demultiplexer 57-6 to accessory AE31 (rear monitor).

In the transmission side circuit of the control box CB(1), a signal for an accessory AE12 (ridar) is input to the time division multiplexer 57-7 as a signal having high priority, and a signal for an accessory AE13 (DVD player) is input to the time division multiplexer 57-7 as a signal having low priority, by using the channel (ch1) allocated to this control box CB. The time division multiplexer 57-7 allocates the input signals of two systems respectively to corresponding timings of the channel, so as to generate electrical signals subjected to time division multiplexing. The signal having high priority and the signal having low priority are respectively input to the inserting units 57-8 and 57-9 from the time division multiplexer 57-7.

The inserting unit 57-8 generates a signal obtained by combining the received signal with the output from the time division multiplexer 57-7 for each channel with respect to the signal having high priority. The inserting unit 57-9 generates a signal obtained by combining the received signal with the output from the time division multiplexer 57-7 for each channel with respect to the signal having low priority.

The output signal from the inserting unit 57-8 is converted into an optical signal having the wavelength $\lambda 1$ by the electrical/optical conversion unit 57-10. The output signal from the inserting unit 57-9 is converted into an optical signal having the wavelength $\lambda 2$ by the electrical/optical conversion unit 57-11. The optical signal having the wavelength $\lambda 1$ output from the electrical/optical conversion unit 57-10 and the optical signal having the wavelength $\lambda 2$ output from the electrical/optical conversion unit 57-11 are simultaneously supplied to a single common optical fiber of the communication trunk line BB_LC, and are transmitted as an optical signal subjected to wavelength multiplexing.

Similarly, in the transmission side circuit of the control box CB(2), a signal for an accessory AE21 (camera) is input to the time division multiplexer 57-7 as a signal having high priority, and a signal for an accessory AE22 (camera) is input to the time division multiplexer 57-7 as a signal having low priority, by using the channel (ch2) allocated to this control box CB. In the transmission side circuit of the control box CB(3), a signal for an accessory AE32 (camera) is input to the time division multiplexer 57-7 as a signal having high priority by using the channel (ch3) allocated to this control box CB.

In any case, in the communication system of the on-vehicle system illustrated in FIG. 57, an optical signal subjected to wavelength multiplexing and time division multiplexing can be transmitted by using a single optical fiber of the communication trunk line BB_LC as illustrated in FIG. 56.

In the on-vehicle system illustrated in FIG. 57, both of the two kinds of wavelengths $\lambda 1$ and $\lambda 2$ are used, and signal processing is separately performed for each wavelength. A difference between the wavelengths is correlated with a difference between priorities. Therefore, in a case where a failure occurs in communication using either one of the two kinds of wavelengths $\lambda 1$ and $\lambda 2$, for example, switching control may be performed so that a normal communication line is used for transmitting a signal having high priority. A communication path can be secured with only a single optical fiber.

<Other Characteristic Techniques>
<Technique of Reducing the Number of Components of Wire Harness>

Figure 12:
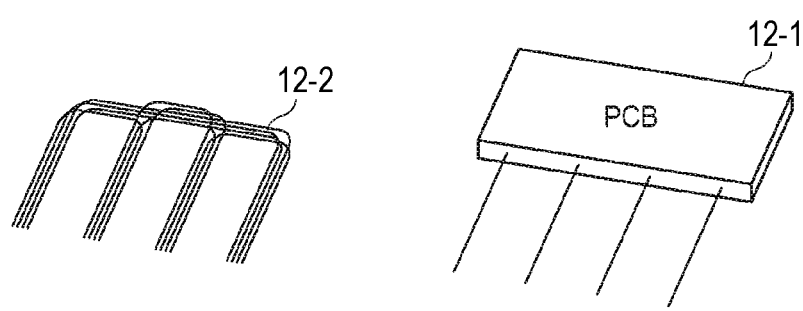
FIG. 12 is an exploded view illustrating a configuration example of a wire harness obtained by combining a printed circuit board with electric wires.

FIG. 12 is an exploded view illustrating a configuration example of a wire harness obtained by combining a printed circuit board with electric wires.

A configuration of a wire harness may variously change depending on a difference in a vehicle model, a difference in a grade, a difference in a destination, and a difference in an option. If the configuration changes, it is necessary to individually add a component number to each component for each configuration. If the number of kinds of configurations increases, the number of components increases and thus manufacturing also increases.

Therefore, a constituent element of a wire harness is divided into a base in which a configuration does not change and an addition in which a configuration changes. As in a backbone member 12-1 illustrated in FIG. 12, a circuit formed on a printed circuit board (PCB) is used as an addition element of a wire harness, a sub-harness 12-2 formed of electric wires is used as a base element of the wire harness, and the entire wire harness is configured by combining the addition element with the base element.

Here, the circuit formed on the printed circuit board is easily configured as an electronic circuit, and has, for example, a field-programmable gate array (FPGA) device built therein so as to rewrite a program, and thus a circuit configuration can be easily changed. Thus, hardware common to all elements can be employed in the backbone member 12-1, and thus it is possible to prevent an increase in the number of components.

<Technique for Coping with Connection of Post-Installation Apparatus or Carry-in Apparatus>

Figure 13:
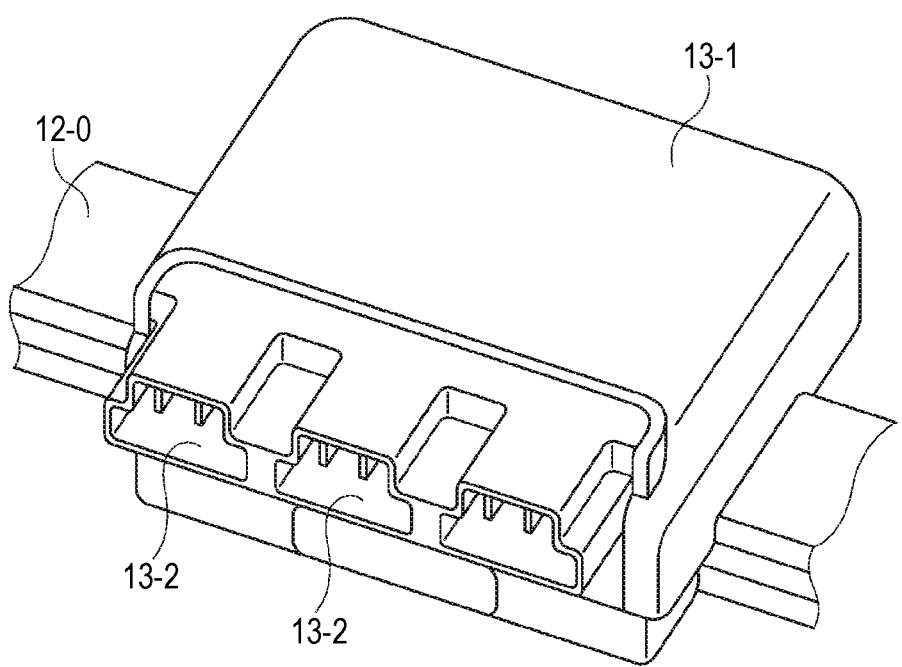
FIG. 13 is a perspective view illustrating an example of an exterior of a control box having USB ports.

FIG. 13 is a perspective view illustrating an example of an exterior of a control box having USB ports.

A control box 13-1 illustrated in FIG. 13 is connected to a backbone trunk line 12-0, and includes a plurality of standard communication ports 13-2 so as to be connected to predetermined branch line harnesses. Specifically, a plurality of connectors having a communication function based on a universal serial bus (USB) standard are provided in the standard communication ports 13-2. Therefore, various apparatuses can be connected to the backbone trunk line 12-0 via the control box 13-1 as long as the apparatus has a standardized communication port. In other words, it is easy to post-install various apparatuses or to connect an apparatus carried in a vehicle by a user.

<Technique for Diversifying Functions of Control Box or the Like>

Figure 14A:
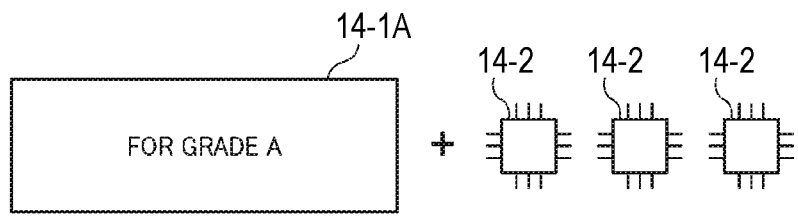
Figure 14B:
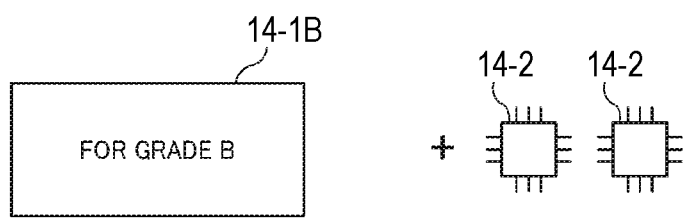
Figure 14C:
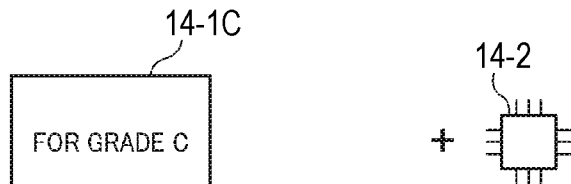

FIGS. 14A, 14B and 14C are plan views illustrating three configuration examples of circuit boards built in a control box or the like.

In a wire harness or the like of a vehicle, functions to be supported greatly change depending on the kind of a vehicle model, the kind of a grade, the kind of a destination, the kind of an option, and the like. For example, the number of circuits, a current capacity, a processing speed, and the number of processes with which each control box on a backbone trunk line should cope change depending on a grade or the like of a vehicle. If functions satisfying all needs are installed in control boxes of all grades, the minimum cost increases, and thus a low cost vehicle cannot be provided. However, if a control box having a configuration optimal for each of various combinations of vehicle models, grades, destinations, options, and the like is prepared, the number of components considerably increases, and thus cost increases.

Therefore, as illustrated in FIGS. 14A, 14B and 14C, an increase in the number of components is prevented by using a component in common. Specifically, a necessary circuit function is realized by combining the standardized circuit boards 14-1A, 14-1B and 14-1C of three kinds with a microcomputer 14-2 formed of an FPGA.

The circuit board 14-1A is a circuit board for a grade A which is the highest of three grades. The circuit board 14-1B is a circuit board for a grade B which is the second highest of three grades. The circuit board 14-1C is a circuit board for a grade C which is the lowest of three grades. The circuit boards 14-1A, 14-1B and 14-1C of three kinds have different sizes (large, medium, and small), and can thus cope with a change in the number of circuits through selection of the boards. The number of microcomputers 14-2 is changed in order to cope with a change in the number of circuits.

In other words, since the number of circuits to cope with is small in a case of a low grade vehicle, the small-sized circuit board 14-1C is combined with a single microcomputer 14-2 so as to realize a necessary function as illustrated in FIG. 14C. Since the number of circuits to cope with is intermediate in a case of an intermediate grade vehicle, the medium-sized circuit board 14-1B is combined with two microcomputers 14-2 so as to realize a necessary function as illustrated in FIG. 14B. Since the number of circuits to cope with is large in a case of a high grade vehicle, the large-sized circuit board 14-1A is combined with three microcomputers 14-2 so as to realize a necessary function as illustrated in FIG. 14A.

Each microcomputer 14-2 is an FPGA, and a program thereof is easily rewritten. Therefore, the program of each microcomputer 14-2 is rewritten in order to cope with a difference between various specifications such as a grade of a vehicle.

Therefore, in a case of employing the configurations illustrated in FIGS. 14A, 14B and 14C, any one of the three kinds of circuit boards 14-1A, 14-1B and 14-1C and one kind of microcomputer 14-2 have only to be prepared, and thus it is possible to prevent increases in the number of kinds of components and the number of components.

<Technique for Reducing the Number of Components Such as Trunk Line>

Figure 15:
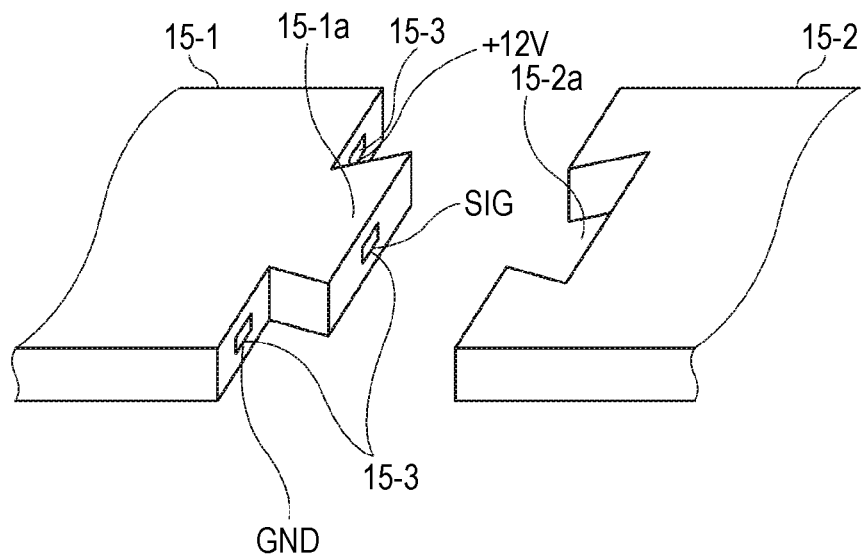
FIG. 15 is a perspective view illustrating a configuration example of a connection location of a routing member forming a trunk line.

FIG. 15 is a perspective view illustrating a configuration example of a connection location of a routing member forming a trunk line.

For example, in a case of forming large-sized routing members such as the backbone trunk line portions 21, 22 and 23 illustrated in FIG. 1, a single routing member may be configured by combining a plurality of components used in common with each other in order to prevent an increase in the number of kinds of components or an increase in the number of components due to a difference between specifications such as configurations or shapes.

In the configuration example illustrated in FIG. 15, two thin tabular routing members 15-1 and 15-2 are connected to each other by butting facing surfaces thereof, so as to be integrated. Specifically, as illustrated in FIG. 15, a protrusion 15-1a is formed on a right end surface of the routing member 15-1, and a concave 15-2a having a shape complementary to that of the protrusion 15-1a is formed on a left end surface of the routing member 15-2.

A plurality of electrodes 15-3 respectively connected to a power source line (+12 V), the ground (GND), and a predetermined signal line are disposed to be exposed to the right end surface of the routing member 15-1. Although not illustrated, similarly, electrodes which can be respectively brought into contact with the electrodes 15-3 are also disposed on the left end surface of the routing member 15-2.

As mentioned above, the types of the routing members 15-1 and 15-2 in which shapes of connection locations, electrode specifications, and the like are standardized in advance, are selected, and the selected members are combined with each other, so that the routing member corresponding to various specifications can be configured. In this case, it is possible to reduce the number of types of standardized routing members and also to reduce the number of components.

<Technique for Coping with Change in Connection Specification>

Figure 16:
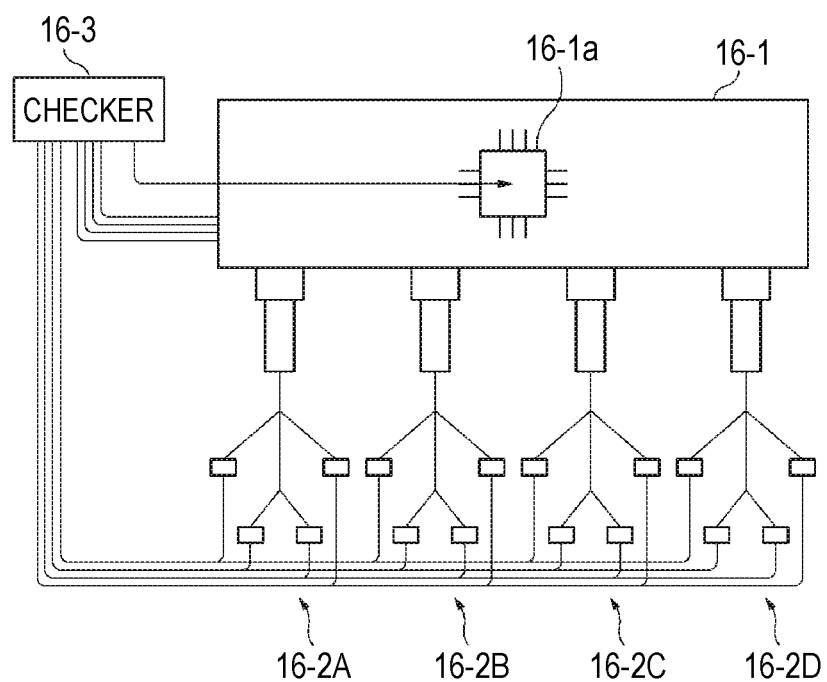
FIG. 16 is a plan view illustrating a connection example between a control box on the trunk line and branch line sub-harnesses.

FIG. 16 is a plan view illustrating a connection example between a control box on the trunk line and branch line sub-harnesses.

A control box 16-1 illustrated in FIG. 16 is connected to, for example, the backbone trunk line portions 21, 22 and 23 illustrated in FIG. 1. The whole function or specification of a wire harness is determined according to an order of a user who has ordered a vehicle, and predetermined branch line sub-harnesses 16-2A, 16-2B, 16-2C and 16-2D are connected to connection portions of the control box 16-1.

A microcomputer whose program is easily rewritten is mounted on the control box 16-1. When such a wire harness is manufactured, a conduction checker 16-3 is prepared to check whether or not there is the occurrence of conduction between each terminal of the branch line sub-harnesses 16-2A, 16-2B, 16-2C and 16-2D and each terminal of the control box 16-1 through actual connection. When the program of the microcomputer on the control box 16-1 is rewritten with a predetermined tool, the content of the program is rewritten so as to reflect an actual conduction state in conjunction with the conduction checker 16-3.

Therefore, actually, a worker appropriately rewrites the program so that the kinds of branch line sub-harnesses 16-2A, 16-2B, 16-2C and 16-2D assembled to the control box 16-1, or a difference between connection positions is reflected, and thus switching between circuit connection states in the actual control box 16-1 can occur automatically. Thus, productivity of a wire harness is improved.

<Technique for Coping with Change in Connection Specification>

Figure 17:
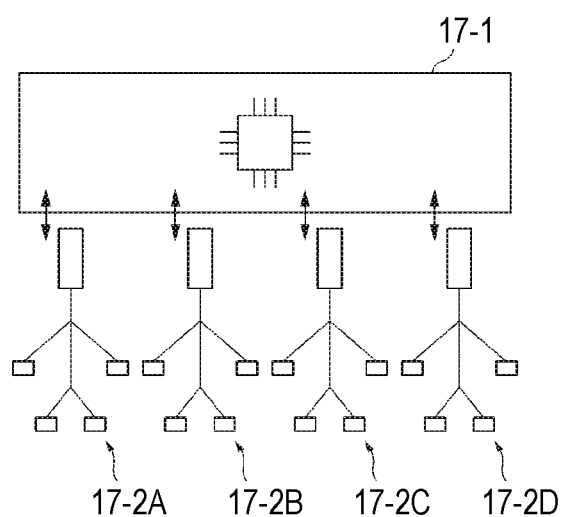
FIG. 17 is a plan view illustrating a connection example between a control box on the trunk line and branch line sub-harnesses.

FIG. 17 is a plan view illustrating a connection example between a control box on the trunk line and branch line sub-harnesses.

A control box 17-1 illustrated in FIG. 17 is connected to, for example, the backbone trunk line portions 21, 22 and 23 illustrated in FIG. 1. The whole function or specification of a wire harness is determined according to an order of a user who has ordered a vehicle, and predetermined branch line sub-harnesses 17-2A, 17-2B, 17-2C and 17-2D are connected to connection portions of the control box 17-1.

Here, each of the branch line sub-harnesses 17-2A, 17-2B, 17-2C and 17-2D has a communication function, and transmits unique identification information (ID) pre-allocated thereto to a microcomputer of the control box 17-1 which is a connection destination. The microcomputer identifies any one of, for example, "ABCD", "ABDC", and "ACDB" as combinations of IDs transmitted from the branch line sub-harnesses 17-2A, 17-2B, 17-2C and 17-2D which are actually connected thereto, and thus automatically selects a pattern of software which is to be applied to a connection destination of each branch line.

Therefore, a worker can freely select a connection position of each of various branch line sub-harnesses 17-2A, 17-2B, 17-2C and 17-2D, and thus productivity is improved. Even in a case where any accessory is post-installed, the microcomputer can automatically cope with the accessory if the microcomputer recognizes the accessory in advance.

<Technique for Coping with Change in Connection Specification>

Figure 18A:
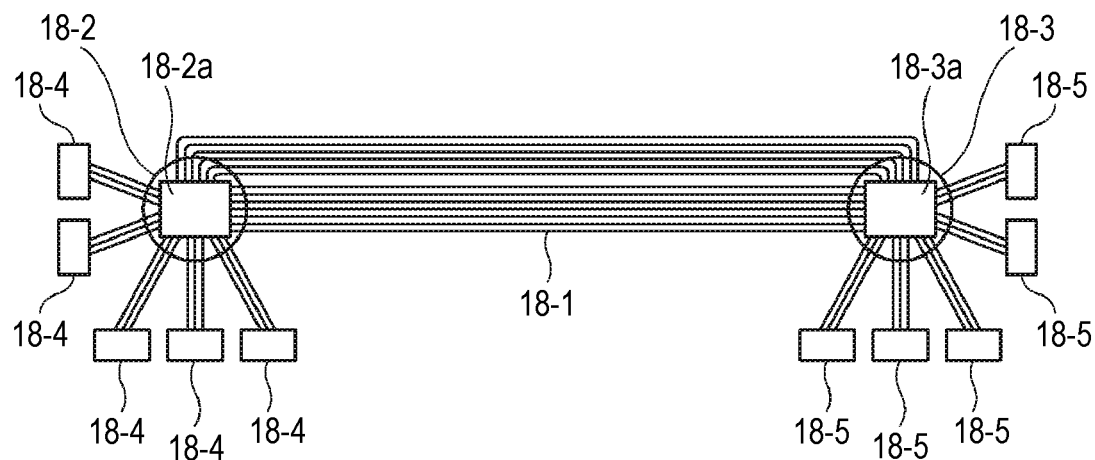
FIGS. 18A and 18B are plan views illustrating connection examples between a trunk line and branch line sub-harnesses.
Figure 18B:
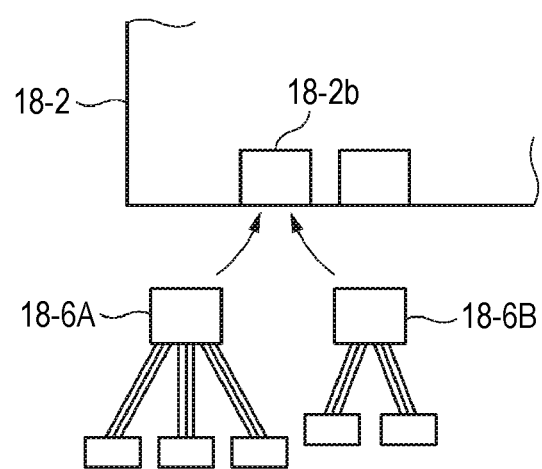

FIGS. 18A and 18B are plan views illustrating connection examples between a trunk line and branch line sub-harnesses.

As illustrated in FIG. 18A, in a case where a backbone formed of a trunk line 18-1 and a plurality of control boxes 18-2 and 18-3 is connected to various accessories via various branch line sub-harnesses 18-4 and 18-5, positions of connectors for connection of the respective branch line sub-harnesses 18-4 and 18-5 may change, or pin arrangement of the connectors may change.

For example, in the example illustrated in FIG. 18B, a case is assumed in which either one of an automatic air conditioner 18-6A and a manual air conditioner 18-6B which are accessories is selectively connected to a connector 18-2b of the control box 18-2 according to a change in a specification. In this case, pin arrangement of a connector for the automatic air conditioner 18-6A and pin arrangement of a connector for the manual air conditioner 18-6B are different from each other.

In order to cope with this change, a microcomputer 18-2a formed of an FPGA is mounted on the control box 18-2, and a microcomputer 18-3a formed of an FPGA is also mounted on the control box 18-3. The microcomputer 18-2a formed of an FPGA is mounted in main bodies or connectors of the automatic air conditioner 18-6A and the manual air conditioner 18-6B illustrated in FIG. 18B.

Each connection destination is appropriately selected by the microcomputers 18-2a and 18-3a rewriting a program according to a specification for each circuit of the connected branch line sub-harnesses 18-4 and 18-5. As illustrated in FIG. 18B, a microcomputer disposed in a branch line sub-harness on an accessory side or a connector thereof performs controls so that a specification difference such as a connector pin arrangement difference is absorbed. Consequently, an accessory side can absorb a connection specification in a case where respective accessories are connected to the control boxes 18-2 and 18-3, and a specification of the backbone side can be used in common.

<Technique for Coping with Change in Connection Specification>

Figure 19:
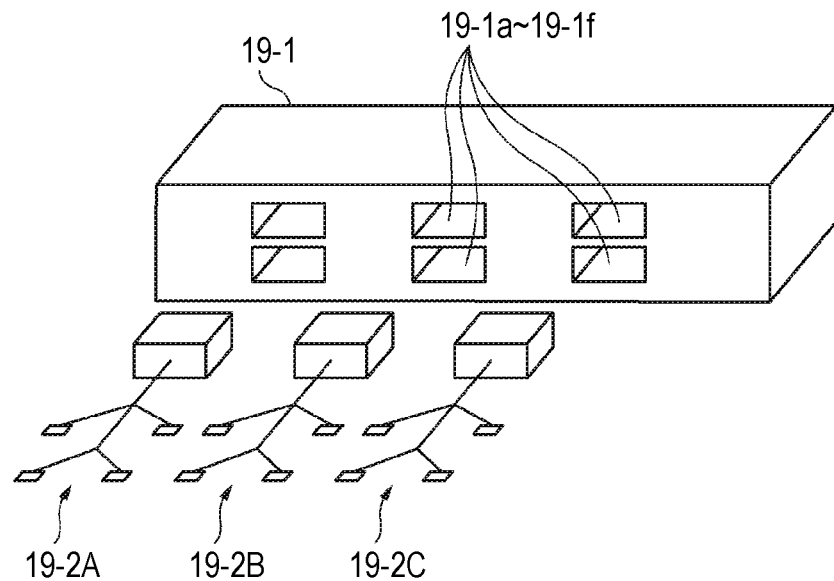
FIG. 19 is a perspective view illustrating a connection example between a control box on the trunk line and branch line sub-harnesses.

FIG. 19 is a perspective view illustrating a connection example between a control box on a trunk line and branch line sub-harnesses.

A plurality of connectors 19-1a, 19-1b, 19-1c, 19-1d, 19-1e and 19-1f which have the same size or shape are disposed to be arranged side by side on a control box 19-1 illustrated in FIG. 19 in order to connect various branch lines and accessories. In a case where an accessory is connected to the control box 19-1, any one of the plurality of connectors 19-1a to 19-1f is selected, and branch line sub-harnesses 19-2A, 19-2B and 19-2C are respectively connected.

Here, a worker can freely select a position of a connector which is a connection destination of each of the branch line sub-harnesses 19-2A, 19-2B, and 19-2C as necessary when a vehicle is produced. A change in a position of a connector which is a connection destination of the branch line sub-harnesses 19-2A, 19-2B, and 19-2C is coped with by automatically changing a circuit connection state in the control box 19-1 by a microcomputer formed of an FPGA built in the control box 19-1 rewriting a program.

Therefore, the worker can freely select a position of a connector which is a connection destination of each of the branch line sub-harnesses 19-2A, 19-2B, and 19-2C, and thus productivity is improved. It is possible to reduce the number of components by using a function in common.

<Technique of Using AC Power>

Figure 20:
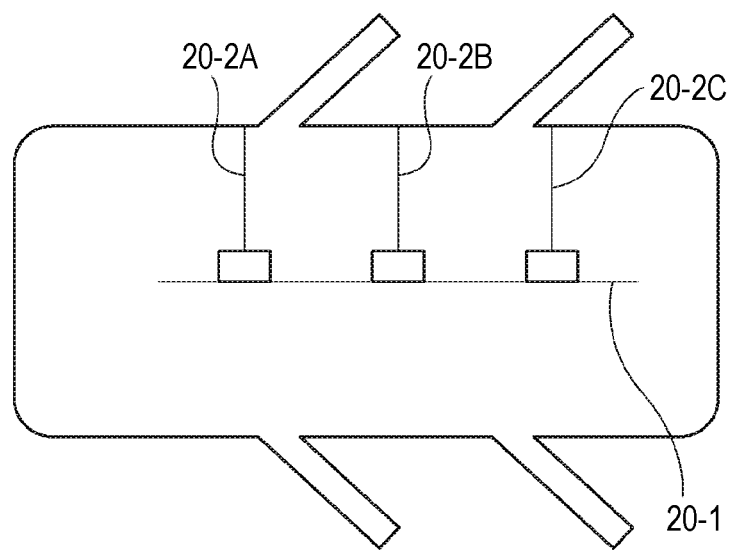
FIG. 20 is a perspective view illustrating an arrangement example of a trunk line and a plurality of branch line sub-harnesses routed on a vehicle body.

FIG. 20 is a perspective view illustrating an arrangement example of a trunk line and a plurality of branch line sub-harnesses routed on a vehicle body.

An on-vehicle system illustrated in FIG. 20 includes a backbone trunk line 20-1 routed linearly in a front-and-rear direction of a vehicle body, and a plurality of branch line sub-harnesses 20-2A, 20-2B and 20-2C connected to respective locations of the backbone trunk line 20-1. The respective branch line sub-harnesses 20-2A, 20-2B and 20-2C are connected to control boxes provided on the backbone trunk line 20-1.

As a characteristic matter, AC power is supplied to the backbone trunk line 20-1. Specifically, a voltage of about AC 200 V is used. Each control box is provided with a transformer and an AC/DC converter, transforms the AC power and converts the AC power into a predetermined DC voltage in the control box, and then supplies to each of the branch line sub-harnesses 20-2A, 20-2B and 20-2C. In the example illustrated in FIG. 20, DC power voltages such as DC 5 V, DC 48 V, and DC 12 V are respectively supplied to the branch line sub-harnesses 20-2A, 20-2B and 20-2C.

As mentioned above, AC power is made to flow through the backbone trunk line 20-1, and thus it is possible to reduce a power loss in the trunk line compared with a case of DC power. Since a configuration is simple, and a voltage can be converted by using a cheap transformer, it is possible to reduce cost of the system. A power loss is reduced, and thus fuel efficiency of a vehicle is improved.

<Technique of Using Multiplex Communication>

Figure 21A:
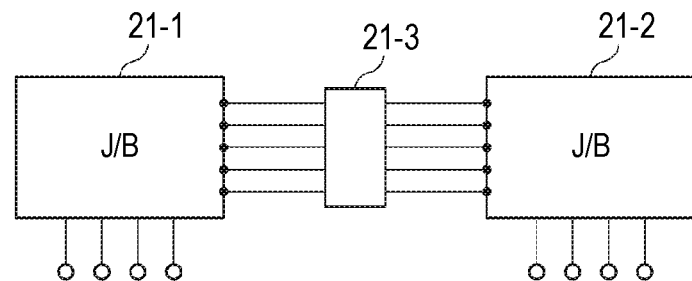
FIGS. 21A and 21B are block diagrams illustrating a plurality of control boxes and a communication trunk line connecting the control boxes to each other.
Figure 21B:
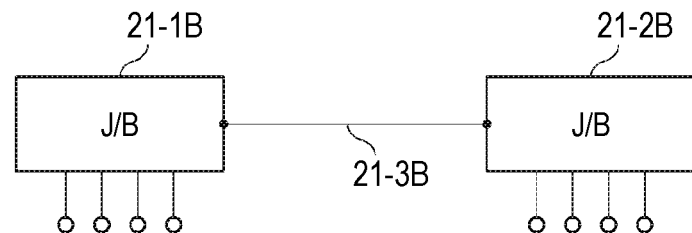

FIGS. 21A and 21B are block diagrams illustrating a plurality of control boxes and a communication trunk line connecting the control boxes to each other.

In a configuration illustrated in FIG. 21A, a communication line 21-3 of a backbone trunk line connecting two control box 21-1 and 21-2 to each other is formed of a set of a plurality of electric wires. In other words, individual communication lines of the same number of signals to be transmitted are required to be prepared in order to secure communication paths, and thus, if the number of signals increases, the number of communication lines also increases.

On the other hand, in the configuration illustrated in FIG. 21B, a communication line 21-3B of a backbone trunk line connecting two control box 21-1B and 21-2B to each other is formed of only one or two communication lines.

In other words, in a configuration illustrated in FIG. 21B, since signals of a plurality of systems are superimposed on a single communication line by using a technique such as time division multiplexing (TDM), it is possible to considerably reduce the number of communication lines in a case where the number of signals to be transmitted increases. A technique such as frequency division multiplexing (FDM) may be used instead of time division multiplexing (TDM).

In a case where the number of communication lines is large as in FIG. 21A, a communication line may be required to be divided at an intermediate portion of a line path of a trunk line, but a communication line is not required to be divided by reducing the number of communication lines, and thus a configuration can be simplified. Therefore, the number of circuits and the number of components are reduced.

<Technique for Recovery During Occurrence of Abnormality>

Figure 22:
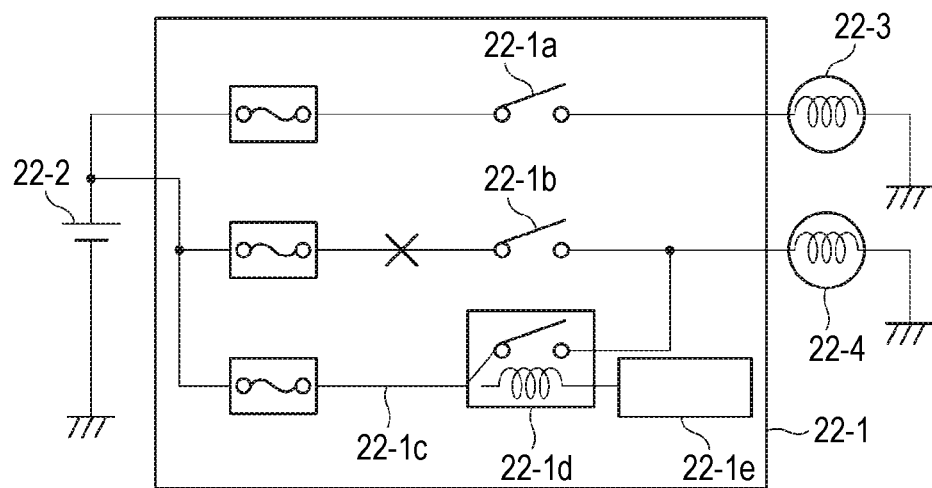
FIG. 22 is an electrical circuit diagram illustrating a configuration example of a control box having a recovery function.

FIG. 22 is an electrical circuit diagram illustrating a configuration example of a control box having a recovery function.

Abnormality such as disconnection of a circuit may occur in a backbone trunk line or a control box. If such abnormality occurs, predetermined source power cannot be supplied to a branch line sub-harness or a load side, and thus operations of accessories including various loads are stopped. In order to prevent this, a recovery function is provided.

In the configuration illustrated in FIG. 22, a case is assumed in which source power supplied from a main power source 22-2 of a vehicle is supplied to two loads 22-3 and 22-4 via a control box 22-1. If a switch 22-1a is closed, power can be supplied to the load 22-3. If a switch 22-1b is closed, power can be supplied to the load 22-4.

However, if a failure such as disconnection occurs in a line path connected to the switch 22-1b, an abnormal state occurs in which power is not supplied to the load 22-4 even if the switch 22-1b is closed. Therefore, assuming that the load 22-4 is a load having considerably high priority, in the configuration illustrated in FIG. 22, a backup path 22-1c is connected in a state of in parallel to the path of the switch 22-1b. The backup path 22-1c is connected to a relay 22-1d which can be turned on and off by a microcomputer 22-1e.

If it is detected that abnormality has occurred in a conduction path of the switch 22-1b, the microcomputer 22-1e automatically switches on the relay 22-1d so as to perform recovery control in which source power is supplied to the load 22-4 via the backup path 22-1c. The microcomputer 22-1e controls a warning display portion provided in a meter unit of a vehicle to display the occurrence of the failure. The reliability regarding a wire harness and operations of various accessories is improved due to the recovery function.

<Proximity Wireless Communication Technique on Vehicle>

Figure 23A:
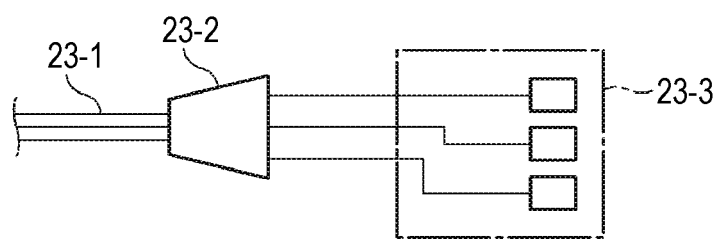
FIGS. 23A and 23B are block diagrams illustrating connection examples between a wire harness and a load.
Figure 23B:
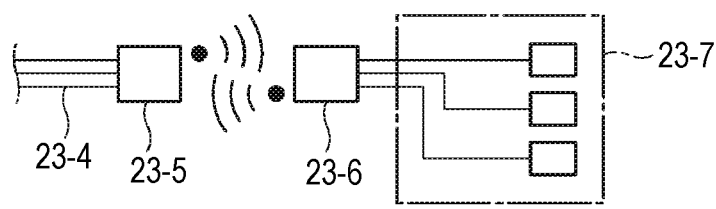
Figure 24:
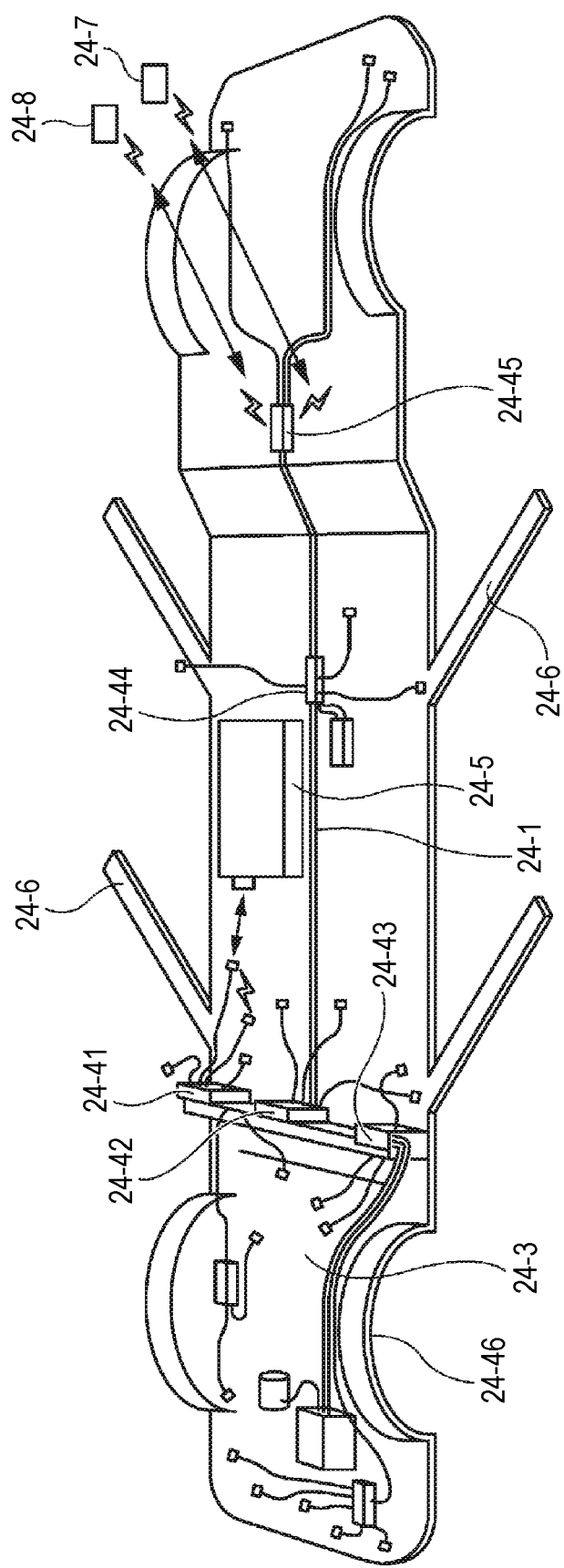
FIG. 24 is a perspective view illustrating a specific example of arrangement and connection of various constituent elements on a vehicle body.

FIGS. 23A and 23B are block diagrams illustrating connection examples between a wire harness and a load. FIG. 24 is a perspective view illustrating a specific example of arrangement and connection of various constituent elements on a vehicle body.

As illustrated in FIG. 23A, in a case where various accessories disposed in a door 23-3 of a vehicle are connected to a wire harness 23-1 on a vehicle interior side via a wire harness, an electric wire bundle at a bent part of the wire harness which is bent with opening and closing of the door generally is put in a grommet 23-2 and thus has functions such as protection of electric wires, waterproof, dustproof, and soundproof. However, in a case where a grommet is used, it is hard to perform routing work of a wire harness, and component cost also increases.

Therefore, in the configuration illustrated in FIG. 23B, proximity wireless communication units 23-5 and 23-6 are used to connect a control box 23-4 on a backbone on the vehicle interior side to various accessories disposed in a door 23-7 of the vehicle. The proximity wireless communication units 23-5 and 23-6 has not only a communication function but also a function of supplying source power in a wireless manner. Therefore, in a case of using the configuration illustrated in FIG. 23B, a grommet is not necessary, and routing work for connection of accessories is also considerably simplified.

A description will be made on a more realistic configuration example on a vehicle. In a configuration illustrated in FIG. 24, a backbone main line 24-1, an instrument panel portion backbone 24-2, an engine compartment backbone 24-3, and the like are routed at respective locations on a vehicle body as trunk lines. Control boxes 24-41, 24-42, 24-43, 24-44 and 24-45 are disposed at respective locations in these trunk lines.

In the configuration illustrated in FIG. 24, a steering module 24-5 and the control box 24-41 are connected to each other in a wireless manner through proximity wireless communication. The respective control boxes and the accessories in the door are also connected to each other in a wireless manner through proximity wireless communication. Accessories such as a sensor 24-7 and an antenna 24-8 disposed in a luggage space and the control box 24-45 are also connected to each other in a wireless manner through proximity wireless communication.

<Technique for Noise Countermeasure>

Figure 25A:
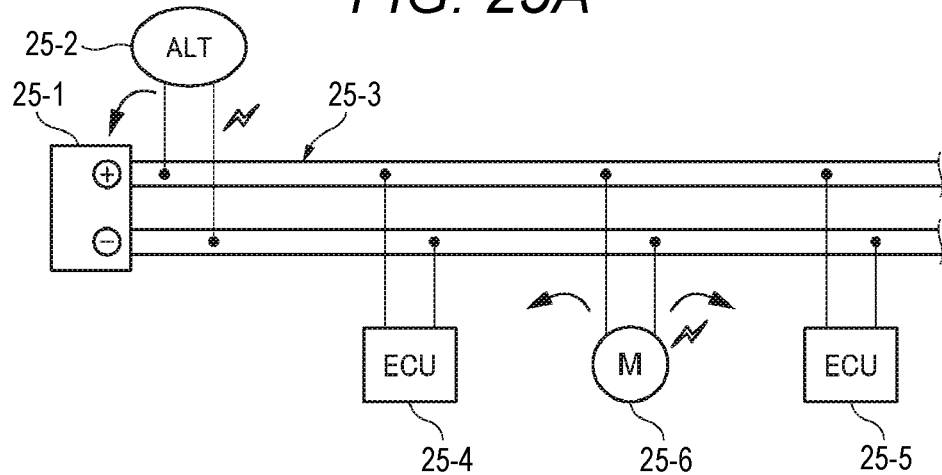
Figure 25B:
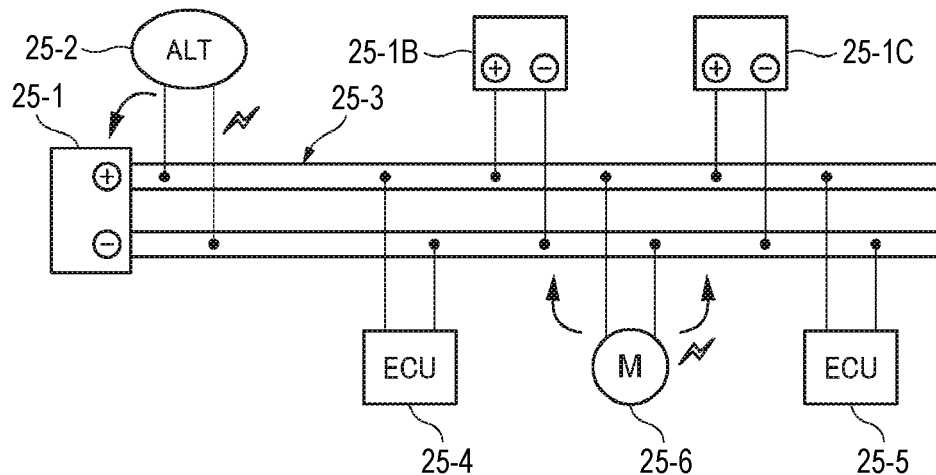
Figure 25C:
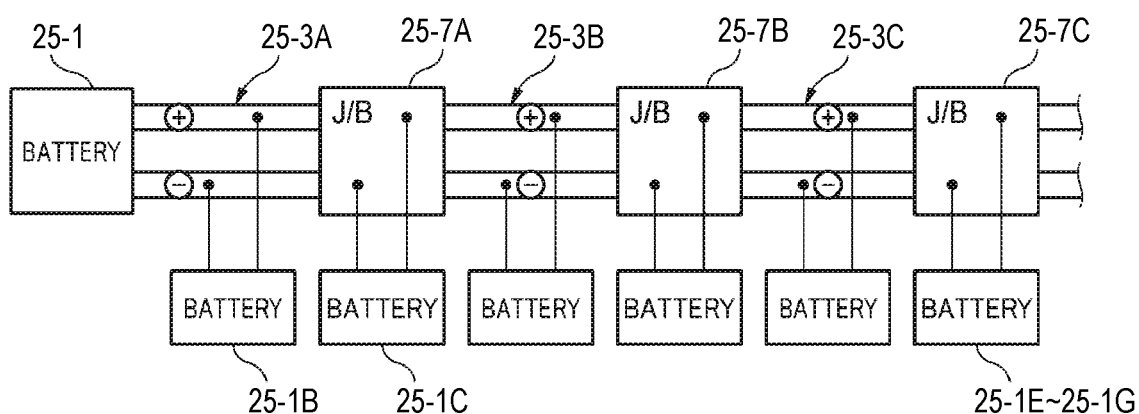

FIGS. 25A, 25B and 25C are block diagrams illustrating specific examples of connection states of a trunk line, a control box, a battery, and the like.

In a configuration example illustrated in FIG. 25A, in the same manner as in a general vehicle, a single main battery 25-1 and an alternator 25-2 are connected to the vicinity of an end of a wire harness 25-3. Various parts of the wire harness 25-3 are connected to accessories such as electronic control units (ECUs) 25-4 and 25-5, and an electric motor 25-6.

In the configuration as illustrated in FIG. 25A, an apparatus such as the alternator 25-2 or the electric motor 25-6 is a source generating noise, and thus there is a probability that electromagnetic noise generated therefrom has an adverse effect on the electronic control units 25-4 and 25-5 or the like located in the vicinity thereof.

Therefore, the following countermeasures are taken in order to reduce the influence of noise. In other words, a plurality of batteries are prepared and disposed in a distribution manner in a backbone at positions close to the noise sources. Consequently, the battery easily absorbs generated noise. It is possible to prevent sneaking of noise into each electronic control unit. The noise problem can be solved regardless of locations on the backbone where noise sources and apparatuses which are easily influenced by noise are connected.

In the configuration example illustrated in FIG. 25B, in addition to the main battery 25-1, sub-batteries 25-1B and 25-1C are connected to the backbone of the wire harness 25-3 in a distribution manner. Therefore, noise generated from the electric motor 25-6 which is a noise source is absorbed by the sub-batteries 25-1B and 25-1C connected in the vicinity thereof.

The electronic control units 25-4 and 25-5 which are easily influenced by noise are disposed at positions farther away from the noise source than the sub-batteries 25-1B and 25-1C, and are thus hardly influenced by noise.

In the configuration example illustrated in FIG. 25C, in addition to the main battery 25-1, six sub-batteries 25-1B, 25-1C, 25-1D, 25-1E, 25-1F and 25-1G are connected to the backbone of the wire harness 25-3 in a distribution manner. The sub-battery 25-1B is connected to a trunk line 25-3A between the main battery 25-1 and a control box 25-7A. The sub-battery 25-1C is connected to an internal circuit of the control box 25-7A.

The sub-battery 25-1D is connected to a trunk line 25-3B between two control boxes 25-7A and 25-7B. The sub-battery 25-1E is connected to an internal circuit of the control box 25-7B. The sub-battery 25-1F is connected to a trunk line 25-3C between two control boxes 25-7B and 25-7C. The sub-battery 25-1G is connected to an internal circuit of the control box 25-7C.

As in the configuration illustrated in FIG. 25C, in a case where a plurality of sub-batteries are connected, each sub-battery may be connected to any location. Since each sub-battery functions as a noise filter, a plurality of sub-batteries are connected, and thus performance of absorbing noise in a power supply line is improved.

<Technique for Noise Countermeasure>

FIGS. 26A, 26B, 26C, 26D and 26E are block diagrams illustrating specific examples of connection states of a trunk line and one or more batteries.

In this technique, countermeasures of the following (1), (2) and (3) are taken.

(1) A battery having a characteristic of absorbing noise is configured to be connected to any location of a backbone trunk line. (2) In order to remove the influence of a voltage fluctuation or noise, a low impedance routing material is used as a routing material of a backbone trunk line. (3) A configuration of a backbone trunk line is used in common, and a battery attachment position can be changed according to conditions of each vehicle.

Figure 26A:
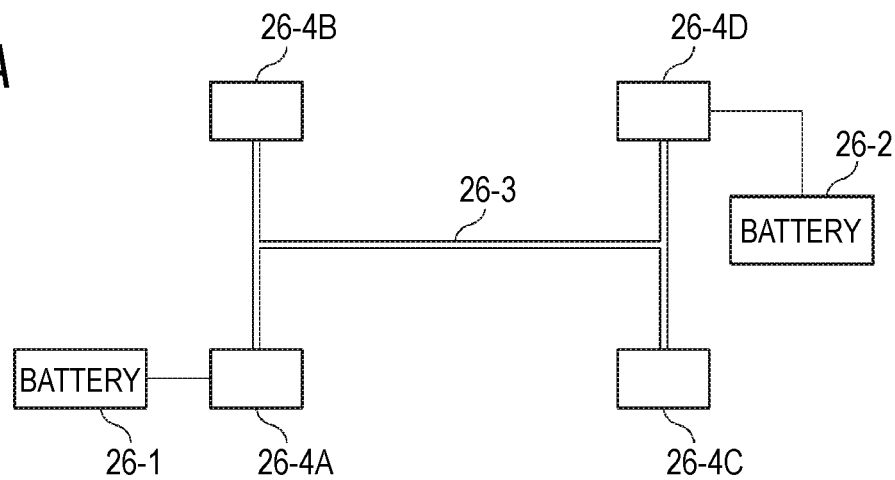
FIGS. 26A, 26B, 26C, 26D and 26E are block diagrams illustrating specific examples of connection states of a trunk line and one or more batteries.

In a configuration illustrated in FIG. 26A, control boxes 26-4A, 26-4B, 26-4C and 26-4D are respectively connected to four ends of a backbone trunk line 26-3. A main battery 26-1 is connected to the backbone trunk line 26-3 at the position of the control box 26-4A, and a sub-battery 26-2 is connected to the backbone trunk line 26-3 at the position of the control box 26-4D. Even in a case where the main battery 26-1 and the sub-battery 26-2 are connected to the backbone trunk line 26-3 at any positions of the control boxes 26-4A, 26-4B, 26-4C and 26-4D, the backbone trunk line 26-3 whose configuration is used in common can be used.

Figure 26B:
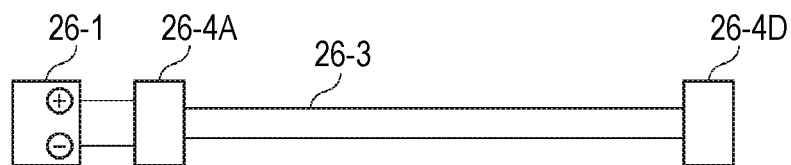

In a configuration illustrated in FIG. 26B, only a main battery 26-1 is connected to a tip end of a backbone trunk line 26-3 located on the front side of a vehicle via a control box 26-4A.

Figure 26C:
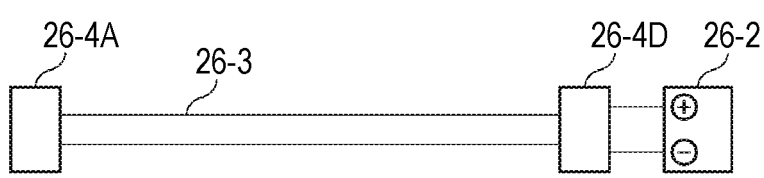

In a configuration illustrated in FIG. 26C, only a sub-battery 26-2 is connected to a rear end of a backbone trunk line 26-3 located on the rear side of a vehicle via a control box 26-4D.

Figure 26D:
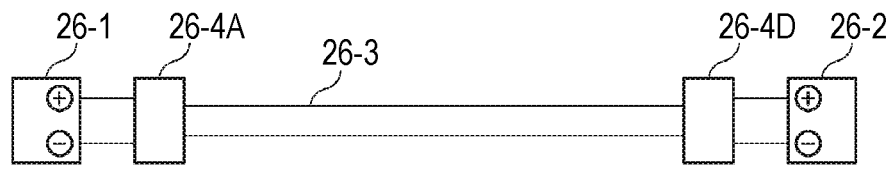

In a configuration illustrated in FIG. 26D, a main battery 26-1 is connected to a tip end of a backbone trunk line 26-3 located on the front side of a vehicle via a control box 26-4A, and a sub-battery 26-2 is connected to a rear end of a backbone trunk line 26-3 located on the rear side of a vehicle via a control box 26-4D.

Figure 26E:
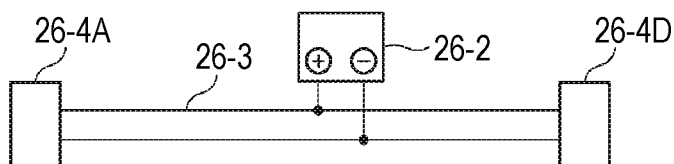

In a configuration illustrated in FIG. 26E, a sub-battery 26-2 is disposed in the vicinity of the center of a vehicle, and the sub-battery 26-2 is directly connected to the center of a backbone trunk line 26-3.

<Technique for Noise Countermeasure>

Figure 27:
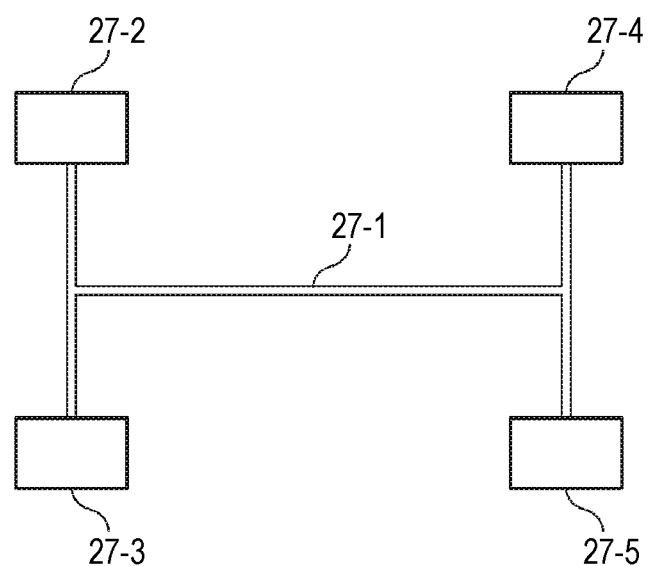
FIG. 27 is a block diagram illustrating a specific example of a connection state of a trunk line and a plurality of batteries.

FIG. 27 is a block diagram illustrating a specific example of a connection state of a trunk line and a plurality of batteries.

In a configuration illustrated in FIG. 27, control boxes 27-2, 27-3, 27-4 and 27-5 are respectively connected to four ends of a backbone trunk line 27-1. Each of the plurality of control boxes 27-2, 27-3, 27-4 and 27-5 has a small-sized sub-battery (secondary battery) built therein. Each sub-battery is connected to a power source line of the backbone trunk line 27-1. A main power source such as a main battery (not illustrated) is also connected to the backbone trunk line 27-1. Therefore, the content shown in the following (1) to (4) is realized.

(1) A plurality of batteries can be disposed at respective parts of the backbone trunk line 27-1 in a distribution manner. Consequently, a voltage fluctuation in a case where a voltage required in a load is high can be suppressed by supplying a current from each battery.

(2) A plurality of batteries disposed can be normally connected to respective portions of the backbone trunk line 27-1 in a distribution manner. Consequently, in a case where regenerative electrical energy appears on the backbone trunk line 27-1, this energy can be efficiently recovered by a plurality of batteries at the respective parts. Therefore, a recovery ratio of regenerative energy is improved.

(3) Since a plurality of batteries are provided, in a case where abnormality occurs in a main power source such as a main battery, backup power can be supplied from a plurality of sub-batteries. Such power backup control can be automatically performed by using microcomputers provided in the control boxes 27-2, 27-3, 27-4 and 27-5.

(4) Since a battery is provided in each area on a vehicle, even in a case where a part of the backbone trunk line 27-1 is disconnected due to vehicle crash or the like, source power can be supplied from a battery located in the vicinity of an area in which an accessory is disposed, and thus a safe power source which does not stop supplying power can be implemented.

<Technique for Noise Countermeasure>

Figure 28:
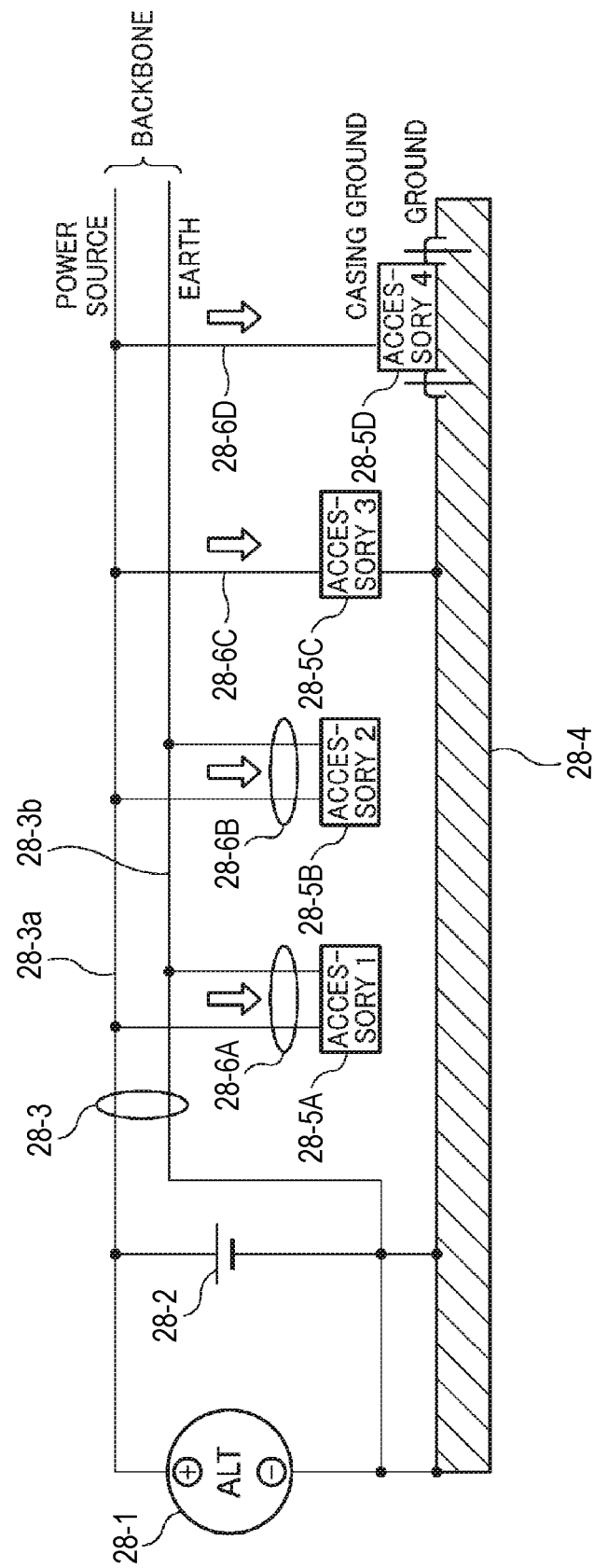
FIG. 28 is an electrical circuit diagram illustrating a configuration example of a power source system in an on-vehicle system.

FIG. 28 is an electrical circuit diagram illustrating a configuration example of a power source system in an on-vehicle system.

A device illustrated in FIG. 28 includes an alternator 28-1, a main battery 28-2, a backbone trunk line 28-3, a body ground 28-4, accessories 28-5A to 28-5D, and branch line sub-harnesses 28-6A to 28-6D. The backbone trunk line 28-3 includes a power source line 28-3a and a ground (GND) line 28-3b. The body ground 28-4 is a ground path using a metal forming a body of a vehicle.

In a configuration illustrated in FIG. 28, the alternator 28-1 and the main battery 28-2 are connected to an upstream side of the backbone trunk line 28-3. Respective parts of the backbone trunk line 28-3 are connected to the accessories 28-5A to 28-5D via the branch line sub-harnesses 28-6A to 28-6D.

Each negative terminal of the alternator 28-1 and the main battery 28-2 is respectively connected to both of the earth line 28-3b of the backbone trunk line 28-3 and the body ground 28-4. Terminals on a ground side of a power source of the accessories 28-5A and 28-5B are connected to only the earth line 28-3b of the backbone trunk line 28-3 via the branch line sub-harnesses 28-6A and 28-6B, respectively. Terminals on a ground side of a power source of the accessories 28-5C and 28-5D are connected to only the body ground 28-4 via a dedicated earth line or a casing ground.

A resistance value of a line path in a case of using the body ground 28-4 is very small as, for example, about 0.7 mΩ, but a resistance value relatively increases in a case of using the earth line 28-3b of the backbone trunk line 28-3.

Since the earth line 28-3b of the backbone trunk line 28-3 has a relatively large resistance value, if a large current flows, a ground potential fluctuation may occur due to a voltage drop caused by a resistance of the line path. However, if the body ground 28-4 is used, a resistance value thereof is small, and thus a ground potential fluctuation scarcely occurs.

In the configuration illustrated in FIG. 28, since it is assumed that a power source current consumed in the accessories 28-5A and 28-5B is relatively small, the ground terminals thereof are connected to the earth line 28-3b of the backbone trunk line 28-3. In addition, since it is assumed that a power source current consumed in the accessories 28-5C and 28-5D is relatively large, the ground terminals thereof are connected to the body ground 28-4. In the above-described connection way, it is possible to reduce a ground potential fluctuation.

The alternator 28-1 has a switching circuit such as a DC/DC converter built therein, and thus there is a high probability that noise is generated due to switching. However, as illustrated in FIG. 28, the negative terminal of the alternator 28-1 is connected to the body ground 28-4, and thus generated noise can be absorbed by using the main battery 28-2 or the like since resistance of a line path is small.

<Technique for Communicating Between Vehicle and Vehicle Exterior>

Figure 29A:
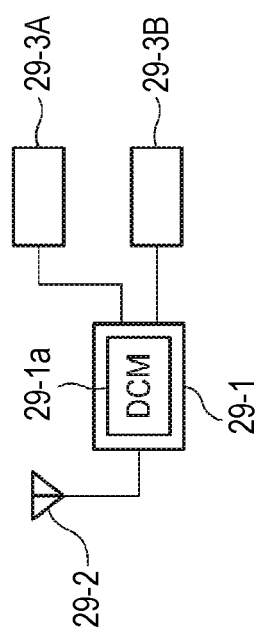
FIG. 29A is a block diagram illustrating a configuration example of an on-vehicle system.
Figure 29B:
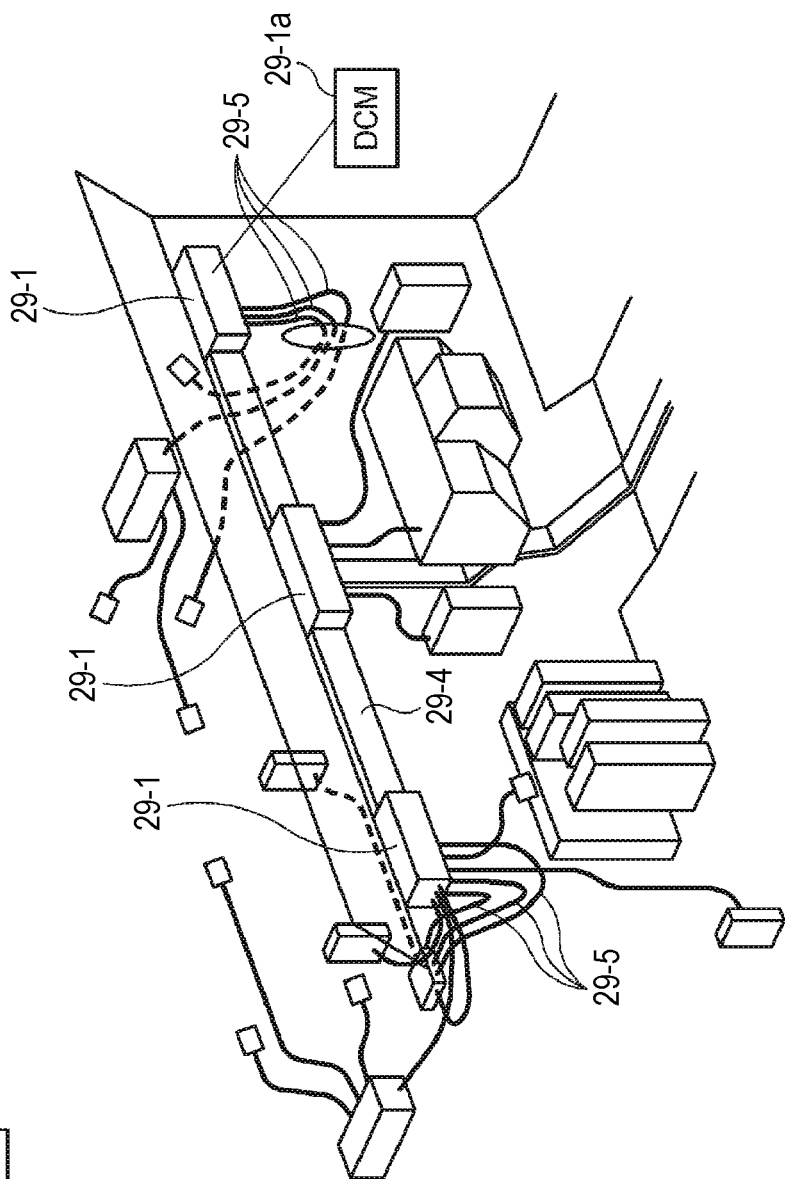
FIG. 29B is a perspective view illustrating an example of an exterior of the same on-vehicle system.

FIG. 29A is a block diagram illustrating a configuration example of an on-vehicle system, and FIG. 29B is a perspective view illustrating an example of an exterior of the same on-vehicle system.

The on-vehicle system illustrated in FIG. 29B includes a plurality of control boxes 29-1, a backbone trunk line 29-4 connecting the control boxes to each other, and a plurality of branch line sub-harnesses 29-5 connected to the backbone trunk line 29-4 via the control boxes.

As illustrated in FIG. 29A, accessories 29-3A and 29-3B, and the like are connected to and under the control of the branch line sub-harnesses 29-5. As specific examples of the accessories 29-3A and 29-3B, for example, an audio device or an electronic control unit (ECU) is connected. As illustrated in FIG. 29B, in this example, a data communication module (DCM) 29-1a is provided in one of the plurality of control boxes 29-1.

In a general vehicle, respective accessories are separately connected to the DCM so that the accessories of various kinds perform wireless communication with a vehicle exterior. Thus, connection locations of various circuits concentrate on the DCM. If many circuits concentrate, the number of processed electric wires in a wire harness increases, which leads to an increase in a size of a connector, and thus productivity of the wire harness deteriorates.

Therefore, as in the configuration illustrated in FIG. 29A, the DCM 29-1a is built in a single control box 29-1, and the various accessories 29-3A and 29-3B are connected to the common control box 29-1.

Since the control box 29-1 illustrated in FIG. 29A is connected to the backbone trunk line 29-4, various kinds of accessories disposed at various positions on a vehicle are connected to the backbone trunk line 29-4, and thus it is possible to easily use the wireless communication function of the DCM 29-1a via the trunk line. Consequently, it is possible to reduce the number of circuits of a wire harness, and thus to reduce component cost and manufacturing cost of the wire harness.

<Technique Regarding Voltage and Current Consumption in Trunk Line>

Figures 30A, 30B:
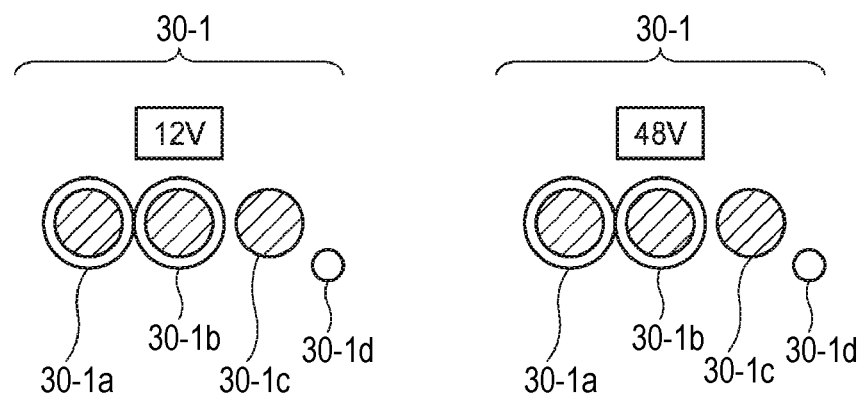
FIGS. 30A and 30B are longitudinal sectional views respectively illustrating configuration examples of different backbone trunk lines.
Figure 31:
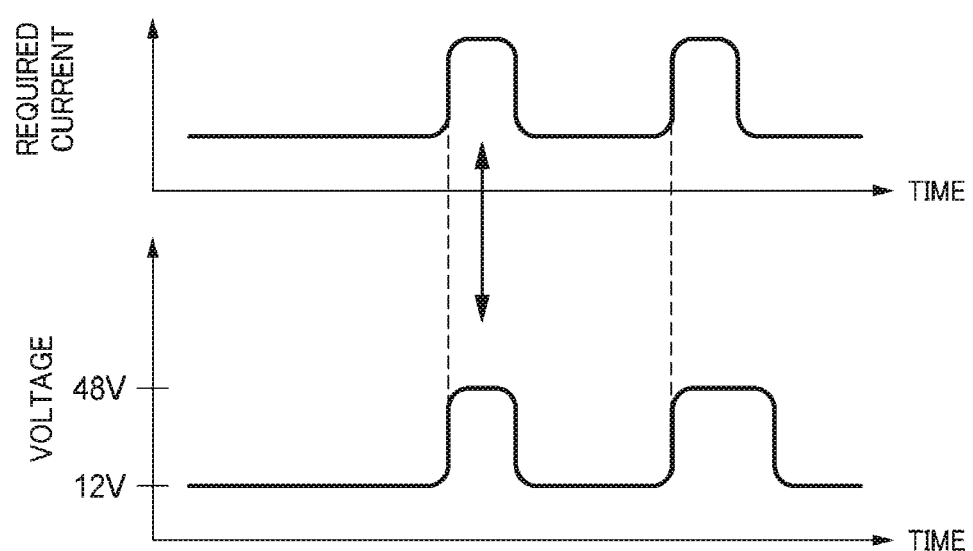
FIG. 31 is a time chart illustrating an example of a correspondence relationship between a power source current and a power source voltage in a case where special power source control is performed.

FIGS. 30A and 30B are longitudinal sectional views respectively illustrating configuration examples of different backbone trunk lines. FIG. 31 is a time chart illustrating an example of a correspondence relationship between a power source current and a power source voltage in a case where special power source control is performed.

In an on-vehicle system, if current consumption of an accessory connected to a wire harness increases, a voltage drop increases and a ground potential easily fluctuates in a case where resistance of an earth line is large. A ground terminal of the accessory may float from an earth line. There is a case where a power source voltage supplied to an accessory is reduced due to a voltage drop in a power source line.

Therefore, in the present embodiment, two kinds of power source voltages, for example, +12 V and +48 V are configured to be used together in a common backbone trunk line, and the two kinds of power source voltages are used depending on situations.

A backbone trunk line 30-1 illustrated in FIGS. 30A and 30B includes two power source lines 30-1a and 30-1b, an earth line 30-1c, and a communication line 30-1d. In the present embodiment, it is possible to switch between power source voltages supplied to at least one of the power source lines 30-1a and 30-1b. In other words, in a case where the power source voltage of +12 V is selected, as illustrated in FIG. 30A, the power source voltage of +12 V is supplied to the power source line 30-1a or 30-1b. In a case where the power source voltage of +48 V is selected, as illustrated in FIG. 30B, the power source voltage of +48 V is supplied to the power source line 30-1a or 30-1b.

For example, DC power supplied from a main power source such as a main battery is stepped up or down in a control box disposed on the backbone trunk line 30-1, and thus switching between +12 V and +48 V can be performed.

Control is performed by using a microcomputer of the control box, and thus switching between +12 V and +48 V can be automatically performed. For example, if the microcomputer monitors a current required in a load or actual current consumption, automatic switching between voltages can be performed as in the example illustrated in FIG. 31 depending on the magnitude of the current.

In other words, in a case where current consumption of a load is great, a voltage supplied by the control box is changed from +12 V to +48 V, and thus it is possible to reduce the influence of a decrease in a voltage supplied to the load.

<Technique Regarding Configuration of Trunk Line>

Figure 32A:
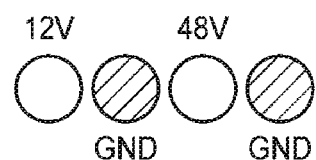
FIGS. 32A, 32B and 32C are longitudinal sectional views respectively illustrating configuration examples of different backbone trunk lines.
Figure 32B:
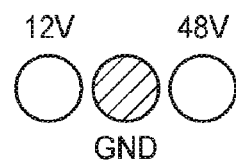
Figure 32C:
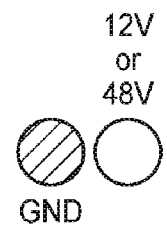

FIGS. 32A, 32B and 32C are longitudinal sectional views respectively illustrating configuration examples of different backbone trunk lines.

In a general vehicle, +12 V is used as a power source voltage. However, if current consumption of a load increases, a problem such as a voltage drop in a wire harness occurs. If an electric wire diameter of the wire harness is increased in order to reduce the voltage drop, the wire harness grows too large, and thus a weight thereof also increases.

Therefore, as a power source voltage handled in a wire harness, +48 V is configured to be also used in addition to +12 V.

In a configuration illustrated in FIG. 32A, a backbone trunk line is formed of four routing materials (electric wires, bus bars, and the like). Two of the four routing materials are used as a power source line and an earth (GND) line for +12 V, and the other two remaining routing materials are used as a power source line and an earth line for +48 V.

In a configuration illustrated in FIG. 32B, a backbone trunk line is formed of three routing materials. One of the three routing materials is used as a power source line for +12 V, another one is used as an earth (GND) line, and the remaining one is used as a power source line for +48 V.

In a configuration illustrated in FIG. 32C, a backbone trunk line is formed of two routing materials. One of the two routing materials is used as a common power source line for +12 V or +48 V, and the other one is used as an earth (GND) line. In a case of using the configuration illustrated in FIG. 32C, for example, voltage switching between +12 V and +48 V is performed in a control box on the backbone trunk line.

<Technique Regarding Power Saving Control>

For example, if the supply of power to a load having low priority is reduced, or conduction of a load having low priority is temporarily stopped, power consumption of the entire vehicle can be reduced, and this leads to improvement of power efficiency and miniaturization of a battery. However, if such power saving control is performed at all times, a user may not be able to comfortably use a load having low priority.

Therefore, a case is assumed in which a normal mode is switched to a power saving mode only when a certain situation occurs, and the above-described power saving control is performed. Here, it is important how to define a determination condition for determining whether or not to switch the normal mode to the power saving mode.

In the present embodiment, past data DA and expectation data DB for one day from now on are prepared in order to determine the switching from the normal mode to the power saving mode. The past data DA is compared with the expectation data DB, a today's power use prediction is presented to a user, and a control device on a vehicle side automatically selects the power saving mode.

As a specific example of the past data DA, condition patterns such as a day basis, a season basis, and an environmental condition basis, for example, weather, temperature, and humidity are taken into consideration, and a power use amount for each condition pattern is measured, and is generated as data. The data is optimized by using a learning function.

As a specific example of the expectation data DB, there are use amount prediction data of a car air conditioner based on a today's weather prediction, a user's schedule data registered in a smart phone or the like, destination information which is input to a car navigation device, and the like. Specific condition patterns are extracted on the basis of the specific data, and thus appropriate expectation data DB can be obtained.

<Technique for Preventing Battery Exhaustion>

For example, in a case where a vehicle is parked without being connected to an external power source, most of the accessories on a vehicle are in a stop state, and power accumulated in a battery is scarcely consumed. However, for example, since some loads such as a theft prevention device continue to consume power even during parking, if a parking state is continued for a long period of time, battery exhaustion occurs, and thus the vehicle cannot be started.

Therefore, in the present embodiment, a control device on the vehicle performs special control in order to prevent battery exhaustion in advance. In other words, the control device recognizes a power residual capacity in a power source such as a main battery, measures a conduction current or a dark current flowing out of the battery, and predicts the number of days left until battery exhaustion occurs based on the information. In a case where the number of days left is small, the supply of power from the battery is automatically stopped. The supply of power may be controlled to be reduced stepwise.

<Technique Regarding Disconnection Detection>

Figure 33:
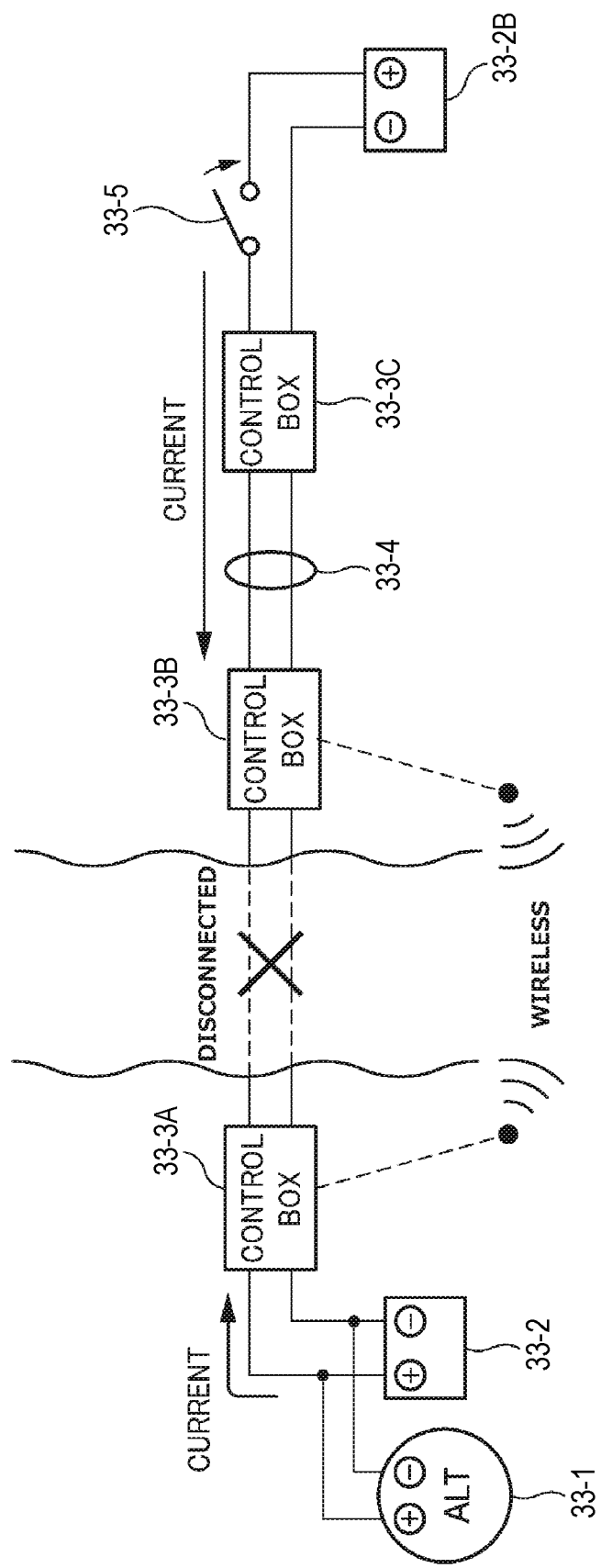
FIG. 33 is an electrical circuit diagram illustrating a configuration example of a power source system in an on-vehicle system.

FIG. 33 is an electrical circuit diagram illustrating a configuration example of a power source system in an on-vehicle system.

In an on-vehicle system illustrated in FIG. 33, an alternator 33-1 and a main battery 33-2 which are main power sources are connected to a tip end side of a backbone trunk line 33-4, and a sub-battery 33-2B is connected to a rear end side of the backbone trunk line 33-4 via a switch 33-5.

A plurality of control boxes 33-3A, 33-3B and 33-3C are connected to an intermediate portion of the backbone trunk line 33-4 in a distribution manner at respective positions. A power source line and an earth line are included as constituent elements of the backbone trunk line 33-4. The power source line of the backbone trunk line 33-4 is configured to be used not only for the supply of power but also for communication. In other words, by using the existing power line communication (PLC) technique, DC source power and an AC signal for communication are transmitted in a state of being superimposed with each other on the power source line.

Therefore, each of the plurality of control boxes 33-3A, 33-3B and 33-3C has an interface for PLC communication built therein, and thus the plurality of control boxes 33-3A, 33-3B and 33-3C can perform PLC communication with each other.

In this configuration, for example, if the backbone trunk line 33-4 between the two control boxes 33-3A and 33-3B is disconnected, PLC communication cannot be performed between the two control boxes 33-3A and 33-3B. Therefore, in a case where the PLC communication cannot be performed, the control boxes 33-3A and 33-3B can recognize disconnection of the backbone trunk line 33-4. Further, a position where the disconnection occurs can be specified. Each of the plurality of control boxes 33-3A, 33-3B and 33-3C has a short-range wireless communication function so as to perform communication even in a case where the backbone trunk line 33-4 is disconnected.

In a case where the above-described disconnection occurs, power recovery control is performed according to a fail-safe function of any one of the control boxes 33-3A, 33-3B and 33-3C which detected the disconnection. In other words, if the switch 33-5 is closed, source power is supplied to the backbone trunk line 33-4 from both of the main battery 33-2 and the sub-battery 33-2B. The switch 33-5 is maintained in a closed state. Consequently, power is supplied to each circuit from the main battery 33-2 on the upstream side of the disconnection position, and power is supplied to each circuit from the sub-battery 33-2B on the downstream side of the disconnection position. In a case where disconnection occurs, PLC communication is stopped, and communication paths between the control boxes 33-3A, 33-3B and 33-3C are secured by using wireless communication whose function is restricted.

<Technique for Using Communication System in Common>

Figure 34:
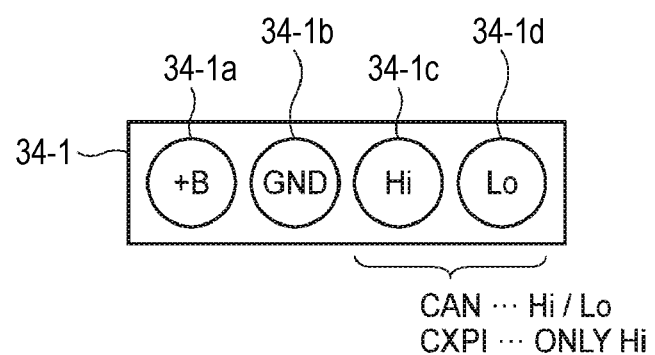
FIG. 34 is a longitudinal sectional view illustrating a configuration example of a communication cable.

FIG. 34 is a longitudinal sectional view illustrating a configuration example of a communication cable.

There is a plurality of standards such as CAN or CXPI as standards related to communication on a vehicle. Therefore, there is a probability that communication interfaces based on a plurality of standards may be combined with each other due to a difference between vehicle specifications, a difference between areas on a vehicle, a difference between grades, and the like. Components such as communication cables having different configurations for the respective standards are used. Since the configurations are different from each other, components based on a plurality of standards cannot be used in common.

A communication cable 34-1 illustrated in FIG. 34 is configured to be able to be used for both of communication based on the CAN standard and communication based on the CXPI standard. The communication cable 34-1 is formed of four electric wires including a power source line 34-1a, an earth (GND) line 34-1b, a high-side communication line 34-1c, and a low-side communication line 34-1d.

In a case of performing communication based on the CAN standard, both of the high-side communication line 34-1c and the low-side communication line 34-1d are used, and, in a case of performing communication based on the CXPI standard, only the high-side communication line 34-1c is used. Consequently, the communication cable 34-1 whose configuration is used in common can be used regardless of whether being connected to a communication interface based on any one of the CAN and CXPI standards. Through this common use, manufacturing of a wire harness is facilitated, and thus various accessories are also easily post-installed.

A configuration of a switching circuit CB11 for switching between two kinds of interface connections based on CAN and CXPI is illustrated in FIG. 10 as described above.

<Technique for Using Configuration in Common>

Figure 35:
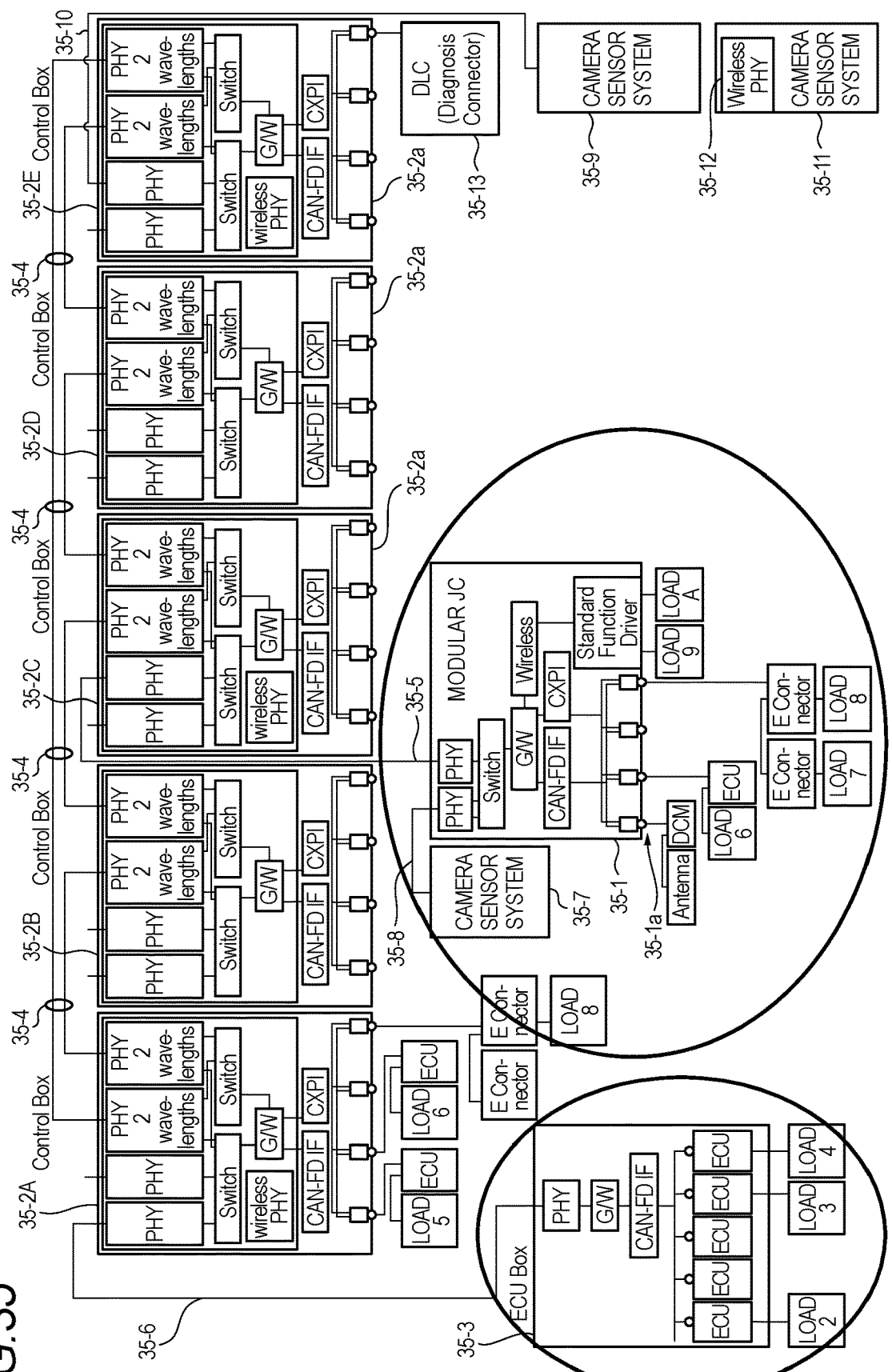
FIG. 35 is a block diagram illustrating a configuration example of a communication system in an on-vehicle system.

FIG. 35 is a block diagram illustrating a configuration example of a communication system in an on-vehicle system.

For example, in a case where various accessories are connected to and under the control of the control boxes 31 to 33 as illustrated in FIG. 1 via branch line sub-harnesses, it is hard to use a large-sized control box, and the number of connectors for connection of the branch line sub-harnesses may be restricted. Thus, in a case where a plurality of accessories are to be connected to a single control box, the number of connectors may be insufficient. In other words, a width of the control box is small, and thus there is a case where a plurality of connectors cannot be provided in the control box.

Therefore, in the present embodiment, a modular connection connector (JC) 35-1 illustrated in FIG. 35 is prepared. The modular connection connector 35-1 has a configuration similar to that of a table tap, an upstream side thereof is connected to a single branch line sub-harness 35-5, and a connection portion 35-1*a* on a downstream side is provided with a plurality of connectors for connection of a plurality of apparatuses.

As illustrated in FIG. 35, the branch line sub-harness 35-5 of the modular connection connector 35-1 is connected to a connector of a single control box 35-2C as a branch line, for example. As illustrated in FIG. 35, the modular connection connector 35-1 is provided with two PHY circuits, a network switch (switch), a gateway (GW), a processing unit, an CAN-FD interface, a CXPI interface, a standard function driver, and the like therein.

In the configuration illustrated in FIG. 35, one of the PHY circuits of the modular connection connector 35-1 is connected to an apparatus 35-7 of a camera and a sensor system via a communication line 35-8. Two loads are connected to and under the control of the standard function driver.

The connection portion 35-1*a* on the downstream side of the modular connection connector 35-1 is provided with a plurality of connectors, and thus a plurality of accessories can be connected thereto as necessary. For example, as illustrated in FIG. 35, a DCM and an antenna may be connected, or a load 6 may be connected via an electronic control unit (ECU). Instead of the ECU, a load may also be connected via connectors (E connectors) having a simple communication function or an output control function.

Another modular connection connector 35-1 can be connected in series to the connection portion 35-1*a* on the downstream side of the modular connection connector 35-1, and thus it is possible to increase the number of connectable apparatuses as necessary. Constituent elements such as an ECU box 35-3 illustrated in FIG. 35 will be described later in detail.

<Technique of Incorporating Optical Communication Path in Backbone Trunk Line>

As illustrated in FIG. 10 described above, optical fiber cables are used as two communication lines L4B and L5B of the backbone trunk line BB_LM, and thus the control box CB has an optical communication function. Consequently, since large-capacity or high-speed communication can be performed by using the trunk line, it can be used for communication for a high grade vehicle. Specifically, since the maximum communication speed of about 10 Gbps can be ensured, it can be applied also to an application in which high resolution video data is required to be sent without time lag.

<Technique for Handling Optical Signal in Control Box>

A function for handling an optical signal is installed in a control box. For example, as in the on-vehicle system illustrated in FIG. 10, the PHY circuits CB03 and CB04 are incorporated into the control box CB, so that an electrical signal can be converted into an optical signal so as to be transmitted, and a received optical signal can be converted into an electrical signal so as to be subjected to a reception process.

More specifically, as in the control box CB(1) illustrated in FIG. 57, the optical/electrical conversion units 57-2 and 57-3, and the electrical/optical conversion units 57-10 and 57-11 are incorporated therein, and thus mutual conversion between an optical signal and an electrical signal can be performed.

<Technique Regarding Connection Form of Communication System Trunk Line>

Figure 36:
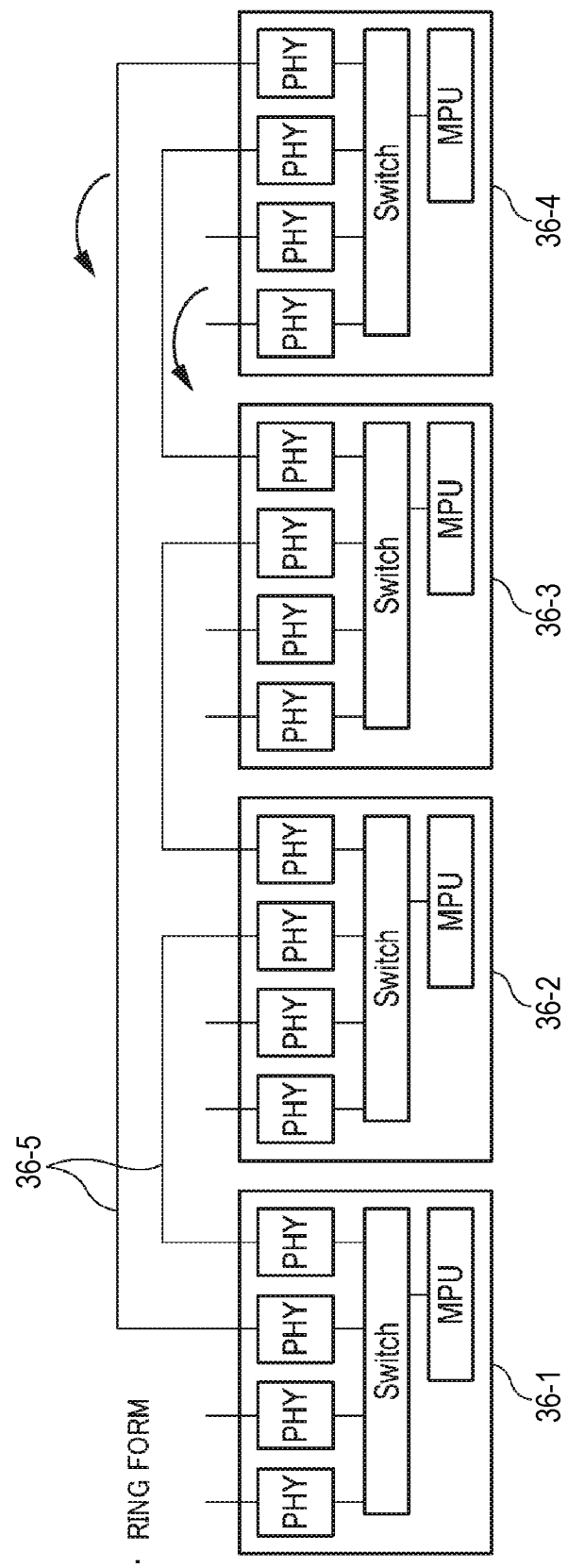
FIG. 36 is a block diagram illustrating a configuration example of communication systems in an on-vehicle system in which the communication systems are connected in a ring form.
Figure 37:
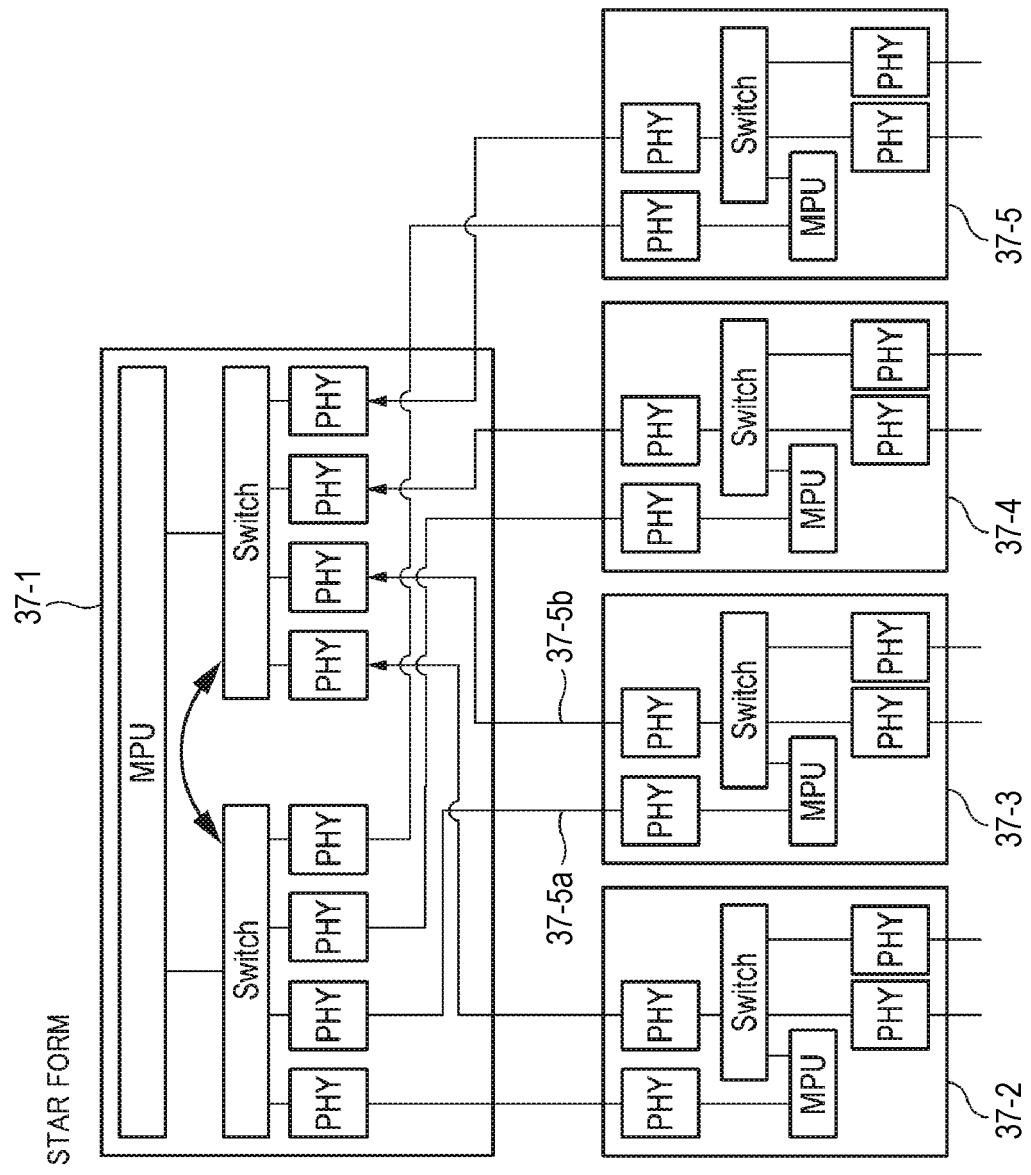
FIG. 37 is a block diagram illustrating a configuration example of communication systems in an on-vehicle system in which the communication systems are connected in a star form.

FIG. 36 is a block diagram illustrating a configuration example of communication systems in an on-vehicle system in which the communication systems are connected in a ring form. FIG. 37 is a block diagram illustrating a configuration example of communication systems in an on-vehicle system in which the communication systems are connected in a star form.

In the on-vehicle system illustrated in FIG. 36, four control boxes 36-1, 36-2, 36-3 and 36-4 are connected to each other via a communication trunk line 36-5 of a backbone, and this connection form is configured in a ring shape.

In other words, a signal transmitted from the control box 36-1 reaches the next control box 36-2 via the communication trunk line 36-5, and the signal relayed inside the control box 36-2 is transmitted from the control box 36-2 to the communication trunk line 36-5 and reaches the next control box 36-3. Similarly, the signal which is received and relayed by the control box 36-3 is transmitted to the communication trunk line 36-5, and reaches the next control box 36-4. The signal which is received and relayed by the control box 36-4 is transmitted to the communication trunk line 36-5, and reaches the next control box 36-1. In the above-described way, the signal on the communication trunk line 36-5 is sequentially transmitted while being relayed along the ring-shaped path.

Therefore, the same communication function as that of the on-vehicle system illustrated in FIG. 6 can be realized. If a path of the communication trunk line 36-5 is duplicated, even in a case where abnormality occurs in one communication path, a communication path can be secured by using the remaining normal path, and thus reliability is increased. A communication speed can be doubled by using the two paths together.

On the other hand, in the on-vehicle system illustrated in FIG. 37, five control boxes 37-1, 37-2, 37-3, 37-4 and 37-5 are connected to communication trunk lines 37-5*a* and 37-5*b*, and this connection form is configured in a star shape. In other words, the single control box 37-1 is centered, and the other four control boxes 37-2 to 37-5 are connected thereto via separate paths.

In the configuration illustrated in FIG. 37, each communication path is duplicated. For example, the control box 37-1 and the control box 37-3 are connected to each other via the two communication trunk lines 37-5*a* and 37-5*b* which are independent from each other.

Each of the duplicated communication paths may be used separately depending on, for example, priority, importance, and a security level difference of communication. Specifically, a communication path having high priority is used for communication related to traveling of a vehicle, and a communication path having low priority is used for other general communication. In a case where a communication failure occurs, one of duplicated communication paths may be used as a backup path. A security level may be divided into, for example, private and public.

The control box 37-1 at the center of the star shape selectively determines a transmission destination of a packet to be transmitted next from among the four control boxes 37-2 to 37-5, and determines a communication path along which the packet is to be transmitted of the communication paths of two systems.

When determining the priority in communication for the on-vehicle system, the priority is generally determined in advance for each component, and thus information handled by, for example, an engine ECU is treated as information having high priority. However, actually, there are many cases where information having low priority is handled by the engine ECU.

Therefore, an ID indicating importance is given to each piece of information, the importance of information is identified on the basis of the ID, and a communication path is automatically selected. In other words, information having high importance is transmitted along the communication trunk line 37-5a of the duplicate communication trunk lines 37-5 of the backbone, and information having low importance is transmitted along the communication trunk line 37-5b thereof.

<Technique Using Wireless Communication in System on Vehicle>

Figure 38A:
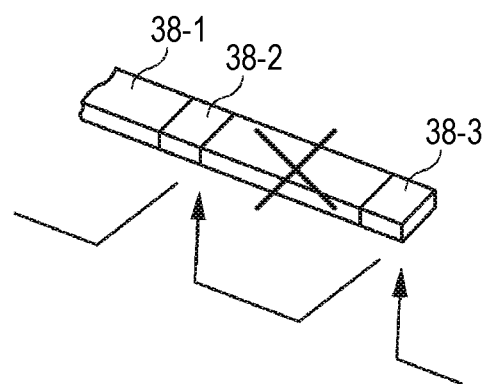
Figure 38B:
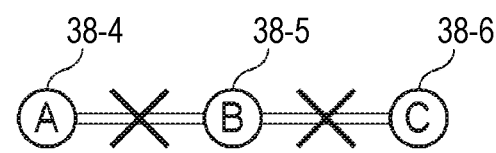
Figure 38C:
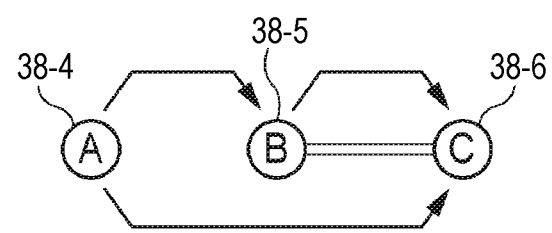

FIGS. 38A, 38B and 38C illustrate communication connection states between apparatuses in different situations, in which FIG. 38A is a perspective view, and FIGS. 38B and 38C are block diagrams.

For example, in a case where a communication line is included in a backbone trunk line 38-1 illustrated in FIG. 38A, wired communication can be performed between a plurality of control boxes 38-2 and 38-3 connected to the backbone trunk line 38-1. However, the backbone trunk line 38-1 may be damaged during vehicle crash or the like, and thus the communication line may be disconnected.

Therefore, in order to provide redundancy to a communication path, a short-range wireless communication function is installed in each of the control boxes 38-2 and 38-3. Consequently, in a configuration illustrated in FIG. 38A, even in a case where the communication line between the control boxes 38-2 and 38-3 is disconnected, a communication path between the plurality of control boxes 38-2 and 38-3 can be secured via a wireless communication line. In a location where disconnection does not occur, a communication path between the control boxes is secured via the communication line of the backbone trunk line 38-1.

As illustrated in FIG. 38B, even in a case where a communication line between control boxes 38-4 and 38-5 is disconnected, and a communication line between control boxes 38-5 and 38-6 is also disconnected, communication paths can be secured by using wireless communication. Therefore, as illustrated in FIG. 38C, communication can be performed between the control boxes 38-4 and 38-5, between the control boxes 38-5 and 38-6, and between control boxes 38-4 and 38-6. Consequently, reliability of a communication path can be secured.

<Technique Regarding Diameter Reduction of Backbone Trunk Line>

Figure 39:
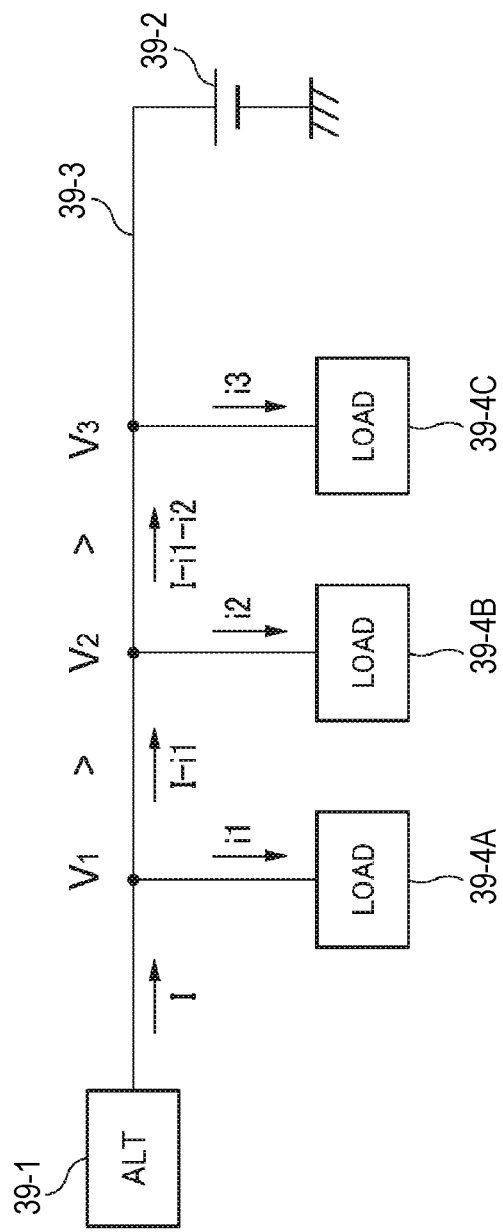
FIG. 39 is an electrical circuit diagram illustrating a configuration example of a power source system in an on-vehicle system.

FIG. 39 is an electrical circuit diagram illustrating a configuration example of a power source system in an on-vehicle system.

In the on-vehicle system illustrated in FIG. 39, an alternator (generator: ALT) 39-1 is connected to one end (for example, a front side in a vehicle body) of a backbone trunk line 39-3, and a main battery 39-2 is connected to the other end (for example, a rear side in the vehicle body) of the backbone trunk line 39-3.

Loads 39-4A, 39-4B and 39-4C are connected to respective locations of an intermediate portion of the backbone trunk line 39-3 via predetermined branch line sub-harnesses. In FIG. 39, voltages of the backbone trunk line 39-3 at the respective connection locations of the loads 39-4A, 39-4B and 39-4C are indicated by V1, V2 and V3.

Typically, a DC output voltage of the alternator 39-1 is higher than a voltage between terminals of the main battery 39-2. Therefore, as illustrated in FIG. 39, a relationship of "V1>V2>V3" is satisfied.

In the configuration illustrated in FIG. 39, a power source current flowing through each load 39-4A, 39-4B and 39-4C can flow from the alternator 39-1 toward a right side of the backbone trunk line 39-3, or can flow from the main battery 39-2 to a left side of the backbone trunk line 39-3.

Therefore, even in a case where power is supplied to a load requiring a large current from both of the alternator 39-1 and the main battery 39-2, it is possible to prevent concentration of the current on the same location on the backbone trunk line 39-3 since a current from the alternator 39-1 and a current from the main battery 39-2 pass through different locations. As a result, the maximum rated value of a current flowing through each portion of the backbone trunk line 39-3 is reduced, and thus it is possible to reduce a diameter of a bus bar or the like of a power source line of the backbone trunk line 39-3.

<Technique Regarding Arrangement Form of a Plurality of Loads>

Figure 40:
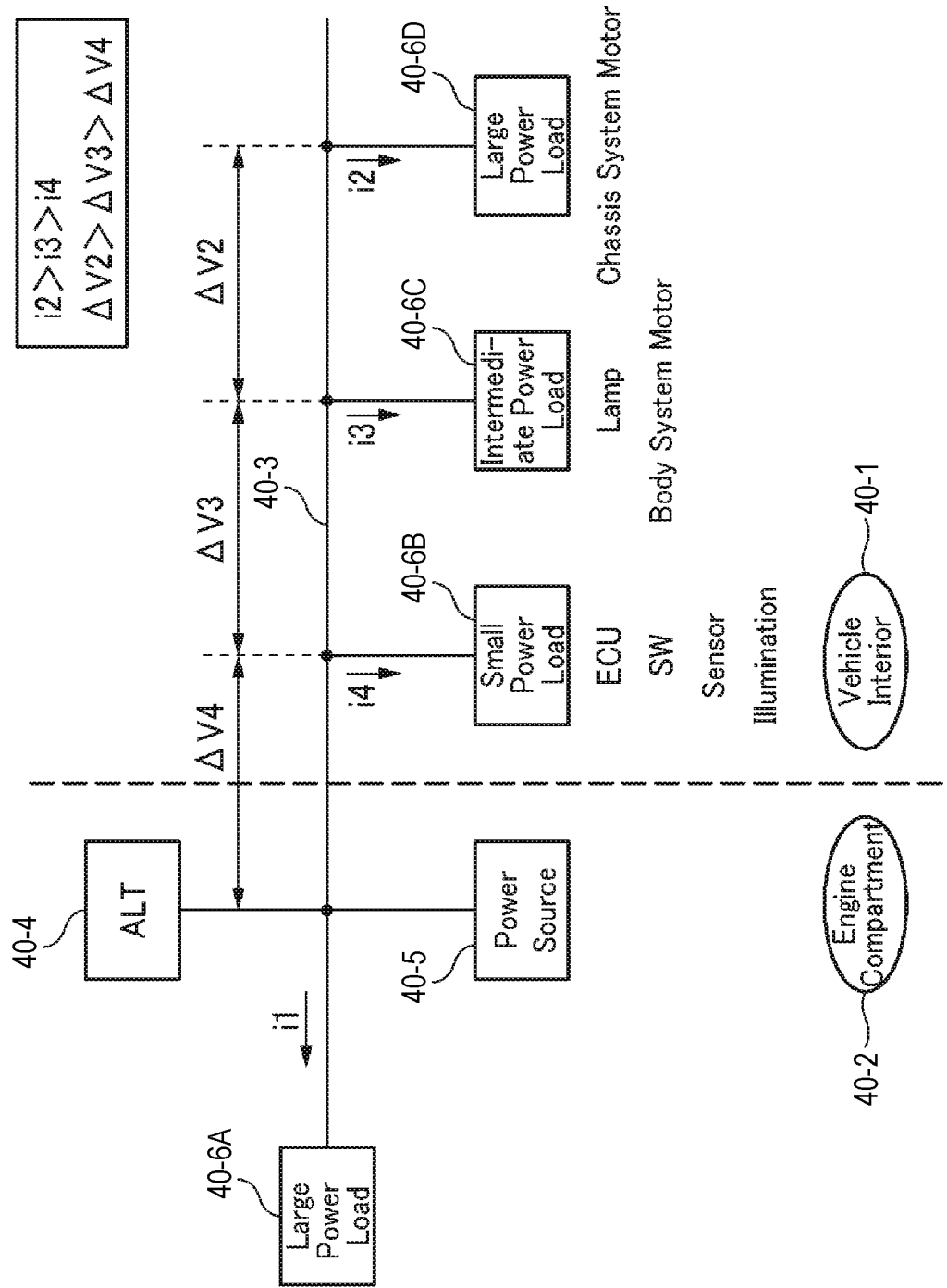
FIG. 40 is an electrical circuit diagram illustrating a configuration example of a power source system in an on-vehicle system.

FIG. 40 is an electrical circuit diagram illustrating a configuration example of a power source system in an on-vehicle system.

In the on-vehicle system illustrated in FIG. 40, a backbone trunk line 40-3 is linearly routed from an engine compartment (engine room) region 40-2 of a vehicle body to a vehicle interior region 40-1. The backbone trunk line 40-3 is connected to an alternator (ALT) 40-4 which is a main power source, and a power source 40-5 formed of a main battery.

Various kinds of loads 40-6A, 40-6B, 40-6C and 40-6D on a vehicle are connected to respective portions on the backbone trunk line 40-3 via predetermined branch line sub-harnesses.

In this example, the load 40-6A consumes large power. The load 40-6B consumes small power, such as an ECU, a switch, a sensor, or an illumination. The load 40-6C consumes intermediate power, such as a lamp, or an electric motor provided in a body system. The load 40-6D consumes large power, such as an electric motor provided in a chassis system.

As illustrated in FIG. 40, in this configuration, the small-power load 40-6B is connected to a position close to the power source 40-5, and the large-power load 40-6D is connected to a position far away from the power source 40-5. Each load is connected on the basis of this positional relationship, and thus it is possible to reduce a voltage drop at an end of the backbone trunk line 40-3.

<Technique Regarding Prevention of Illegal Apparatus Connection>

In a case where versatile connection ports for connection of various apparatuses, for example, connection ports based on a USB standard are present in the above-described control box CB or the like more than necessary, an illegal apparatus may be connected to an unoccupied port which is not used among the connection ports. For example, a third party may intrude into a vehicle when a user of the vehicle does not aware thereof, and connects an illegal apparatus to an unoccupied port.

Therefore, a function of preventing an intruder from connecting an illegal apparatus to an unoccupied port is provided. Specifically, an intrusion sensor is mounted on a vehicle, and an action is taken so that an illegally connected apparatus is not operated under the control of a microcomputer provided in the control box CB or the like when the intrusion is detected. In other words, the microcomputer performs control so that a power source and a communication line corresponding to an unoccupied port are automatically interrupted.

The microcomputer can identify whether a port is in use or is an unoccupied port, for example, by monitoring a conduction current for each port. Connection verification of each connection port is performed whenever an ignition switch of a vehicle is turned on, and thus it is possible to identify whether or not the port is in use.

<Technique Regarding Backup and Fuse of Power Source>

Figure 41:
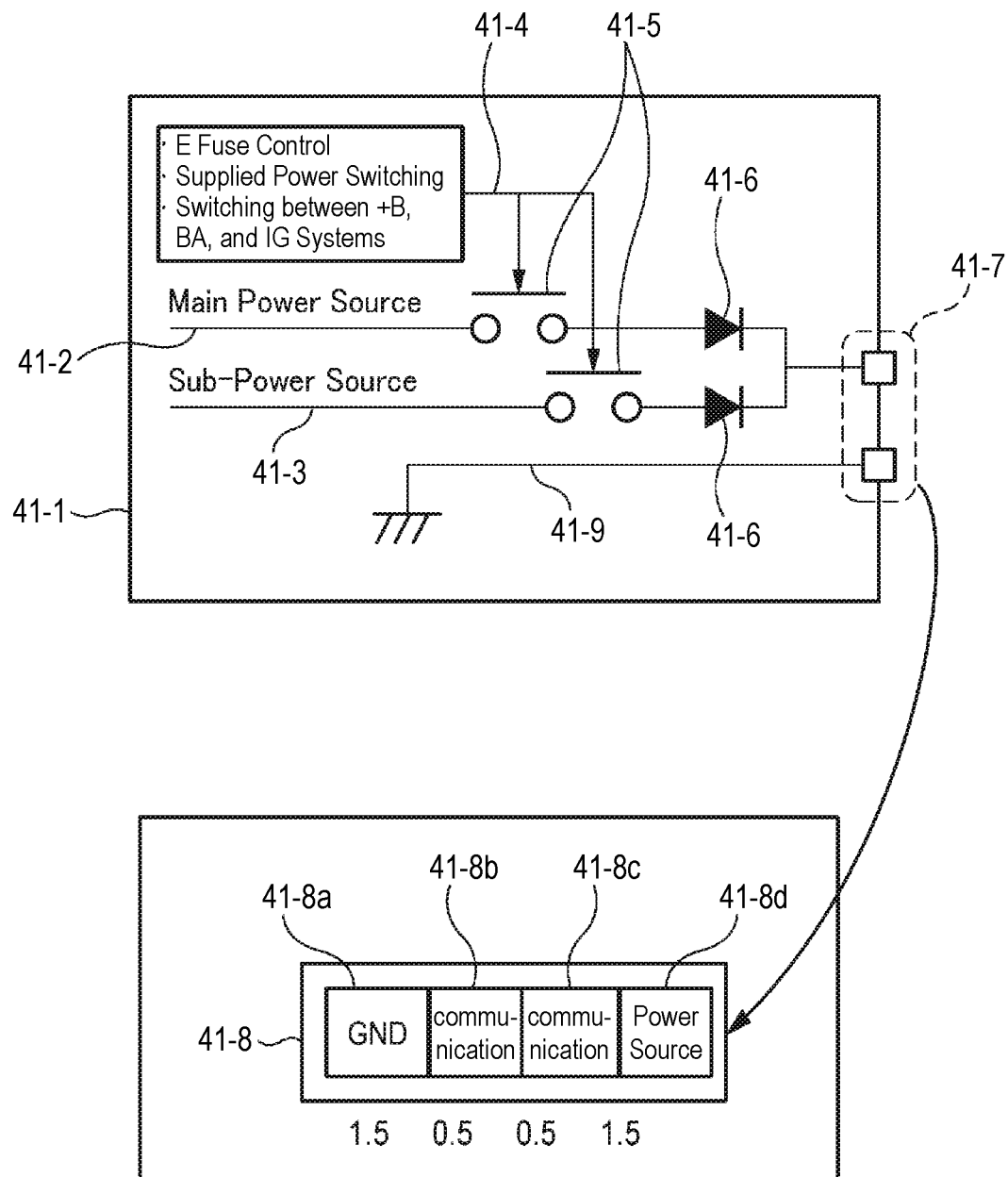
FIG. 41 is an electrical circuit diagram illustrating a configuration example of a backup power source circuit.

FIG. 41 is an electrical circuit diagram illustrating a configuration example of a backup power source circuit.

A backup power source circuit 41-1 illustrated in FIG. 41 is provided in the control box CB, and may be used to supply power to most kinds of accessories. As illustrated in FIG. 41, the circuit is provided with a main power source line 41-2, a sub-power source line 41-3, two switching elements 41-5, two diodes 41-6, a power source output portion 41-7, and an earth line 41-9. The power source output portion 41-7 is connected to a part of a connector 41-8 of the control box CB provided for connection of a predetermined branch line sub-harness.

The connector 41-8 is provided with four terminals 41-8a, 41-8b, 41-8c and 41-8d. The terminals 41-8a and 41-8d are respectively connected to an earth (GND) line and a power source line of the power source output portion 41-7. The terminals 41-8b and 41-8c are connected to two communication lines. The respective sizes of the terminals 41-8a, 41-8b, 41-8c and 41-8d are assumed to be 1.5, 0.5, 0.5, and 1.5.

DC power from a main battery or the like of a vehicle is supplied to the main power source line 41-2 of the backup power source circuit 41-1 via a backbone trunk line. DC power from a predetermined sub-battery or the like is supplied to the sub-power source line 41-3 via the backbone trunk line or the like. Power from a high-voltage battery pack used to drive a vehicle may be stepped down by a DC/DC converter so as to be supplied to at least one of the sub-power source line and the main power source line of the backbone trunk line as sub-power.

A control signal 41-4 for controlling turning-on and turning-off of the two switching elements 41-5 is supplied from a microcomputer (not illustrated) provided in the control box CB. The microcomputer appropriately controls the control signal 41-4, and can thus realize functions shown in the following (1), (2) and (3).

(1) Electronic fuse function: The magnitude of a load current is monitored, and a conduction path is automatically disconnected in a case where conduction of an excessive current of a predetermined level or higher is detected. The conduction path is connected again in a case where returning of a normal state is detected.

(2) Automatic switching function between main power source and sub-power source: For example, power is supplied to a load side only from the main power source line 41-2 side during normal times, and switching automatically occurs so that power is supplied to the load from the sub-power source line 41-3 side in a case where a failure or the like of the main power source line 41-2 is detected. In other words, the sub-power source line 41-3 is used as a power supply path for backup. In a case where a load having relatively large power consumption is connected, power is supplied to the same load from both of the main power source line 41-2 and the sub-power source line 41-3. This makes it possible to compensate for the shortage of power capacity on the power source side.

(3) Switching function between power source types (+B, +BA, IG, and the like): The microcomputer automatically switches between the types of power which is supplied to the power source output portion 41-7 from the backup power source circuit 41-1. The types of power include "+B", "ACC", "IG", "+BA", "IGP", "IGR", and the like.

"+B" indicates power of a system to which power is normally supplied from a battery. "ACC" indicates power of a system to which power is supplied in conjunction with turning-on and turning-off of an accessory (ACC) switch of a vehicle. "IG" indicates power of a system to which power is supplied in conjunction with turning-on and turning-off of an ignition (IG) switch of a vehicle. "+BA" indicates power of a system which is turned on when a user comes close to a vehicle, and to which power is supplied. "IGP" indicates power of a system which is turned on when ignition switch is brought into an ON state, and then an engine is in a full state, and to which power is supplied. "IGR" indicates a system which indicates a system supplying necessary power during emergency, and to which power is supplied when wheels rotate.

The microcomputer performs a process so as to control turning-on and turning-off of each of the two switching elements 41-5 depending on situations, and thus the various types of power can be supplied to a load side.

<Technique Regarding Power Source Circuit for Power Load>

Figure 42:
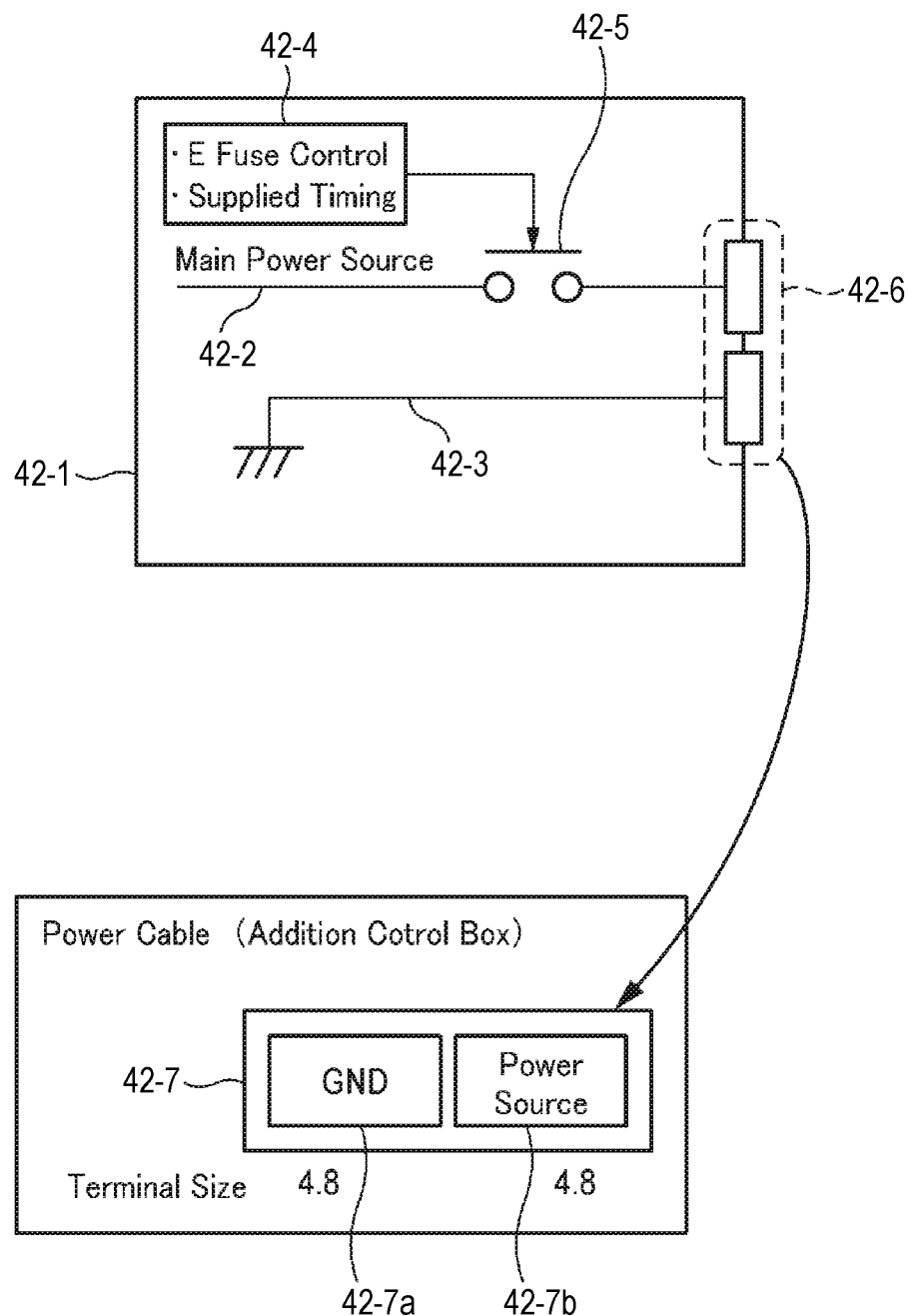
FIG. 42 is an electrical circuit diagram illustrating a configuration example of a power source circuit for power load.

FIG. 42 is an electrical circuit diagram illustrating a configuration example of a power source circuit for power load.

A power source circuit 42-1 for power load illustrated in FIG. 42 is provided in each control box CB, and may be used to supply power to, for example, a load requiring particularly large source power. As illustrated in FIG. 42, the circuit is provided with a main power source line 42-2, a switching element 42-5, a power source output portion 42-6, and an earth line 42-3. The power source output portion 42-6 is connected to a connector 42-7 of the control box CB provided for connection of a predetermined branch line sub-harness.

The connector 42-7 is provided with two terminals 42-7a and 42-7b. The terminals 42-7a and 42-7b are respectively connected to an earth (GND) line and a power source line of the power source output portion 42-6. The respective sizes of the terminals 42-7a and 42-7b are all assumed to be 4.8. For example, a blower motor of the vehicle is connected to the connector 42-7 via a predetermined power cable.

DC power from a main battery or the like of the vehicle is supplied to the main power source line 42-2 of the power source circuit 42-1 for power load via a backbone trunk line.

The earth line 42-3 is connected to an earth line of the backbone trunk line or a body ground of the vehicle.

A control signal 42-4 for controlling turning-on and turning-off of the switching element 42-5 is supplied from a microcomputer (not illustrated) provided in the control box CB. The microcomputer appropriately controls the control signal 42-4, and can thus realize the above-described "electronic fuse function". A timing for supplying power to a load can be appropriately controlled. For example, a control timing may be determined by reflecting a power residual capacity of the main battery, or timing control for power saving may be performed.

<Technique for Coping with a Plurality of Communication Protocols>

Figure 44:
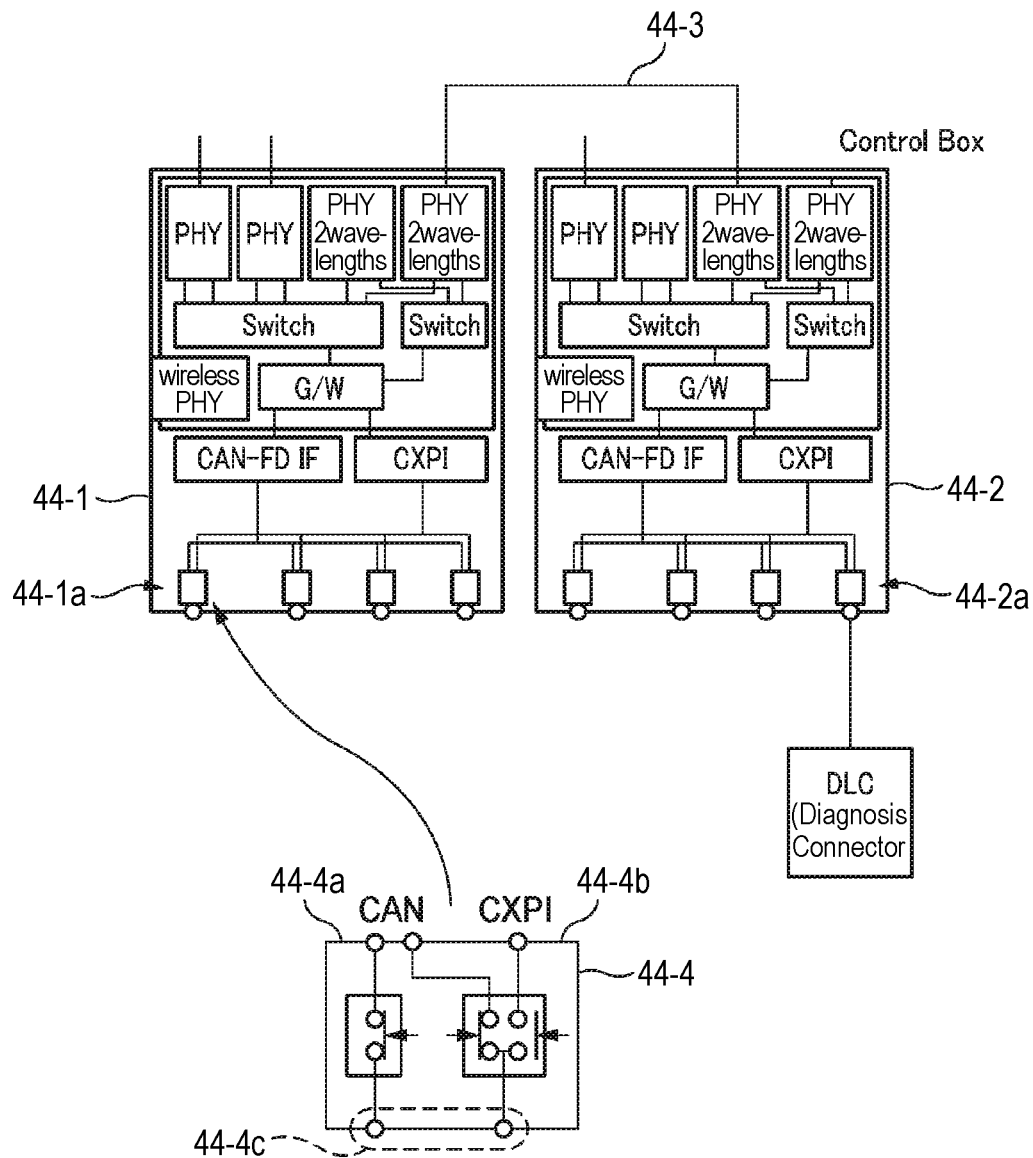
FIG. 44 is a block diagram illustrating a configuration example of a control box which can switch between a plurality of communication protocols.
Figure 44:
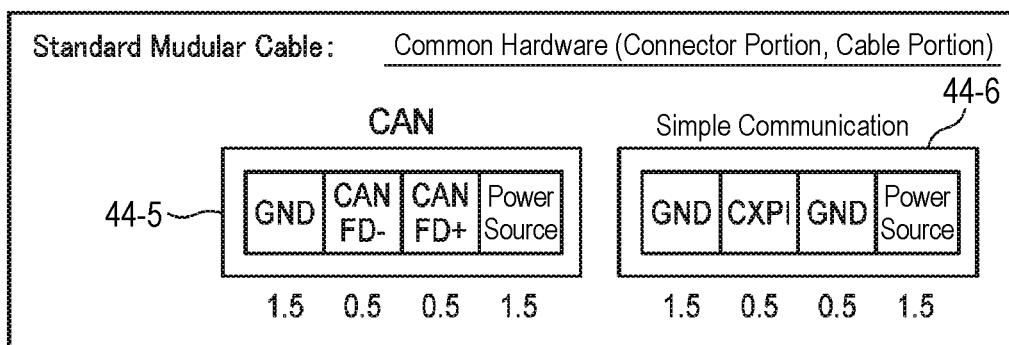

FIG. 44 is a block diagram illustrating a configuration example of a control box which can switch between a plurality of communication protocols.

In a communication system on a vehicle, for example, a plurality of kinds of communication interfaces suitable for a standard such as Controller Area Network (CAN) or Clock Extensible Peripheral Interface (CXPI) may be used. If a standard employed by a communication interface of a communication partner differs, a communication specification or a communication protocol differs, and thus communication cannot be performed between each other. Therefore, a communication system is required to be configured so that communication interfaces based on the same standard are connected to each other.

Thus, not only the communication interface but also different components are required to be prepared for respective communication standards with respect to a connector or a connection cable, and this leads to an increase in the number of components or an increase in manufacturing cost.

Therefore, control boxes 44-1 and 44-2 illustrated in FIG. 44 enable common use of a component and automatic switching between protocols in order to cope with protocols based on standards of both of CAN and CXPI.

The control box 44-1 illustrated in FIG. 44 has functions of four PHY circuits, two network switches (Switch), and a gateway (GW), controlled by a microcomputer. The gateway copes with communication protocols based on both of the CAN-FD standard and the CXPI standard.

A communication interface based on the CAN-FD standard and a communication interface based on the CXPI standard are built in the control box 44-1, and four independent connectors are provided in a connection portion 44-1*a* of the control box 44-1. One control box 44-1 further includes a wireless PHY circuit.

Each connector of the connection portion 44-1*a* has a switching circuit 44-4 built therein. A CAN connection portion 44-4*a* of the switching circuit 44-4 is connected to the communication interface based on the CAN-FD standard, and can handle a set of communication signals of "+side" and "−side" based on the CAN-FD standard. A CXPI connection portion 44-4*b* of the switching circuit 44-4 is connected to the communication interface based on the CXPI standard, and can handle a single communication signal based on the CXPI standard. Signal paths of the CAN connection portion 44-4*a* and the CXPI connection portion 44-4*b* of the switching circuit 44-4 are connected to two terminals of a common connection portion 44-4*c* via internal controllable switches. The switches are controlled by the internal gateway (GW).

Each of the control boxes 44-1 and 44-2 is provided with a common connector including four terminals including the two terminals of the common connection portion 44-4*c*, a power source line and an earth line.

A modular cable 44-5 illustrated in FIG. 44 includes four terminals for "GND", "CAN FD-", "CAN FD+", and "power source", and four electric wires in order to cope with a signal based on the CAN standard. A modular cable 44-6 includes four terminals for "GND", "CXPI", "GND", and "power source", and four electric wires in order to cope with a signal based on the CXPI standard. In other words, the two modular cables 44-5 and 44-6 have the same number of terminals and the same number of electric wires, and can thus be used as a common component.

The modular cable 44-5 or the modular cable 44-6 having the common configuration is connected to the common connector of the control box 44-1, and can thus cope with any communication based on the CAN-FD standard and the CXPI standard.

Actually, under the control of a microcomputer in the control box 44-1, communication based on the CAN-FD standard is selected in an initial state, and automatic switching to communication based on the CXPI standard occurs in a case where a communication apparatus based on the CXPI standard is connected to a partner side. Specifically, when the communication apparatus of the partner side is connected via the modular cable 44-5 or 44-6, the microcomputer performs signal scanning so as to recognize a request from the partner. In a case where communication cannot be established by using a protocol based on the CAN standard, communication is tried to be established through switching to a protocol based on the CXPI standard. At this time, the microcomputer changes a switch of the switching circuit 44-4 so as to switch signal paths in the switching circuit 44-4, and can thus change a form of a signal flowing through each terminal of the connector to the CXPI form (single signal line) from the CAN form (two signal lines).

<Technique Regarding Arrangement of Control Box and ECU>

Figure 43:
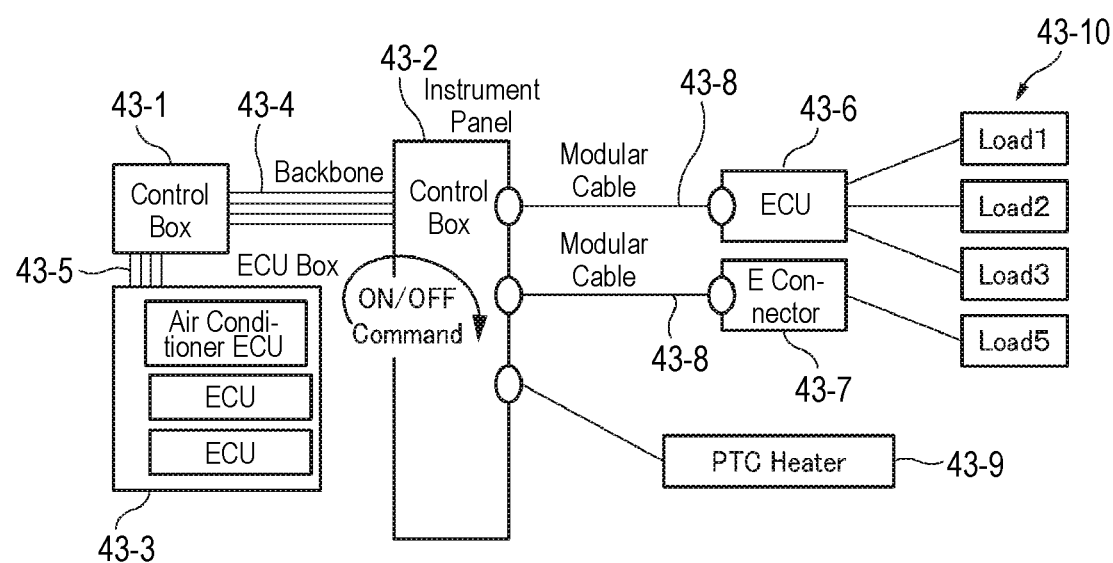
FIG. 43 is a block diagram illustrating a configuration example of an on-vehicle system.

FIG. 43 is a block diagram illustrating a configuration example of an on-vehicle system.

In the on-vehicle system illustrated in FIG. 43, two control boxes 43-1 and 43-2 are connected to each other via a backbone trunk line 43-4. An ECU box 43-3 is connected to the control box 43-1 via a backbone trunk line 43-5.

An electronic control unit (ECU) for controlling an air conditioner and a plurality of other ECUs are built in the ECU box 43-3. The control box 43-1 is provided in, for example, an instrument panel portion of a vehicle.

An ECU 43-6 and a connector 43-7 are connected to and under the control of the control box 43-2 via two modular cables 43-8 which are branch lines. A PTC heater 43-9 is also connected to and under the control of the control box 43-2 via another branch line. A plurality of loads 43-10 are connected to output terminals of the ECU 43-6. The connector 43-7 has an electronic circuit built therein, and has a function of communicating with the control box 43-2 and a function of controlling conduction of a load.

In the on-vehicle system illustrated in FIG. 43, in a case where an air conditioner as the load 43-10 is connected to and under the control of the control box 43-2, a microcomputer in the control box 43-2 may perform control of the air conditioner instead of an ECU for controlling the air conditioner in the ECU box 43-3. In this case, the ECU for controlling the air conditioner in the ECU box 43-3 may be omitted.

On the other hand, in the on-vehicle system illustrated in FIG. 35, the control box 35-2A is connected to the ECU box 35-3 via the communication line 35-6 based on the Ethernet (registered trademark) standard. For example, ten ECUs which are independent from each other can be built in the ECU box 35-3. Therefore, a plurality of ECUs can be disposed at a single location in a concentration manner. Various loads may be connected to and under the control of each ECU in the ECU box 35-3.

The ECU box 35-3 is provided with a communication interface based on the CAN-FD standard, a gateway (GW), and a PHY circuit. Therefore, each ECU in the ECU box 35-3 can communicate with various apparatuses on the vehicle via the control boxes 35-2A to 35-2E. Each ECU built in the ECU box 35-3 is attachable and detachable, and may be replaced as necessary. It is also possible to change the mounting position of each ECU.

<Technique Regarding Duplication of Communication System>

Figure 46A:
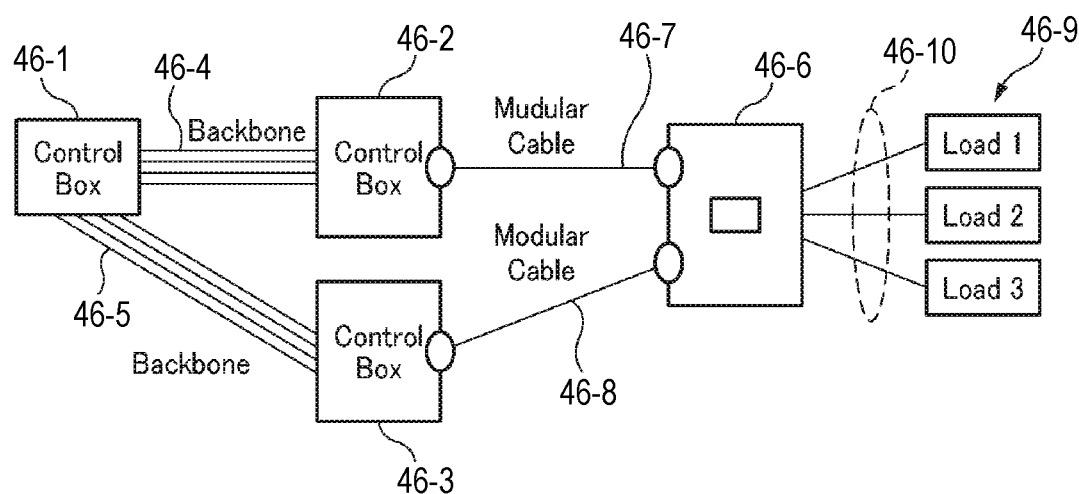
FIGS. 46A and 46B are block diagrams illustrating a configuration example of an on-vehicle system.
Figure 46B:
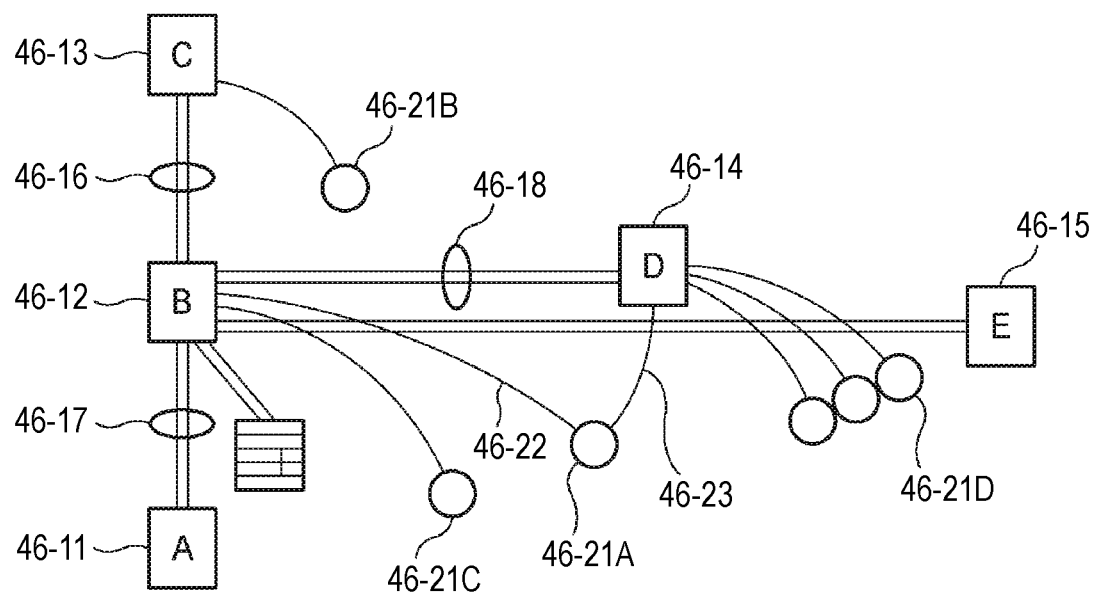

FIGS. 46A and 46B are block diagrams illustrating a configuration example of an on-vehicle system.

In a case where a failure occurs, or a communication line is disconnected due to vehicle crash, communication cannot be performed between apparatuses. However, for example, in a case where a technique such as automatic driving is installed in a vehicle, high reliability is required in a communication system, and thus consideration is required for a communication path not to be disconnected.

Therefore, in the on-vehicle system illustrated in FIGS. 46A and 46B, a power supply path and a communication path are configured to be duplicated for at least a location having high importance in order to increase reliability.

In a configuration illustrated in FIG. 46A, a control box 46-1 and a control box 46-2 are connected to each other via a backbone trunk line 46-4, and the control box 46-1 and a control box 46-3 are connected to each other via a backbone trunk line 46-5. Although not illustrated in FIG. 46, each of the backbone trunk lines 46-4 and 46-5 includes a power source line, an earth line, and a communication line, and each of the power source line and the communication line has line paths of two systems which are independent from each other.

A control unit 46-6 is connected to and under the control of the control box 46-2 via a module cable 46-7 which is a branch line. A control unit 46-6 is connected to and under the control of the control box 46-3 via a module cable 46-8 which is a branch line. A plurality of loads 46-9 are connected to and under the control of the control unit 46-6 via a branch line sub-harness 46-10.

Each of the module cables 46-7 and 46-8 includes power source lines of two systems, an earth line, and communication lines of two systems. The earth line may be formed of two systems.

For example, a communication path and a power supply path in a case where an instruction is given to the control unit 46-6 from the control box 46-1 via the backbone trunk line 46-4, the control box 46-2, and the module cable 46-7 are duplicated. A communication path and a power supply path in a case where an instruction is given to the control unit 46-6 from the control box 46-1 via the backbone trunk line 46-5, the control box 46-3, and the module cable 46-8 are duplicated.

Thus, for example, even in a case where a communication line of one system in one of the backbone trunk lines 46-4 and 46-5 or one of the module cables 46-7 and 46-8 is disconnected, a communication path can be secured by using a communication line of the other system which is not disconnected.

For example, even in a case where communication lines of two systems in the backbone trunk line 46-4 or the module cable 46-7 are simultaneously disconnected, switching to the communication path passing through the backbone trunk line 46-5, the control box 46-3, and the module cable 46-8 from the control box 46-1 occurs, and thus a communication path required to control the control unit 46-6 can be secured.

On the other hand, in the on-vehicle system illustrated in FIG. 46B, a central control box 46-12 is connected to a plurality of control boxes 46-11, 46-13, 46-14 and 46-15 via independent backbone trunk lines 46-17, 46-16 and 46-18. A control unit or a load is connected to and under the control of each control box via a branch line.

For example, a control unit 46-21A is connected to the central control box 46-12 via the branch line 46-22, and the control unit 46-21A is connected to the control box 46-14 via a branch line 46-23.

Therefore, in a case where the control box 46-12 gives an instruction to the control unit 46-21A, either one of a communication path passing through the branch line 46-22 and a communication path passing through the backbone trunk line 46-18, the control box 46-14, and the branch line 46-23 may be used. In other words, even if one of the plurality of paths is disconnected, a necessary communication path can be secured by using remaining normal communication lines.

<Technique Regarding Connection Form of Modularized Apparatus>

Figure 47:
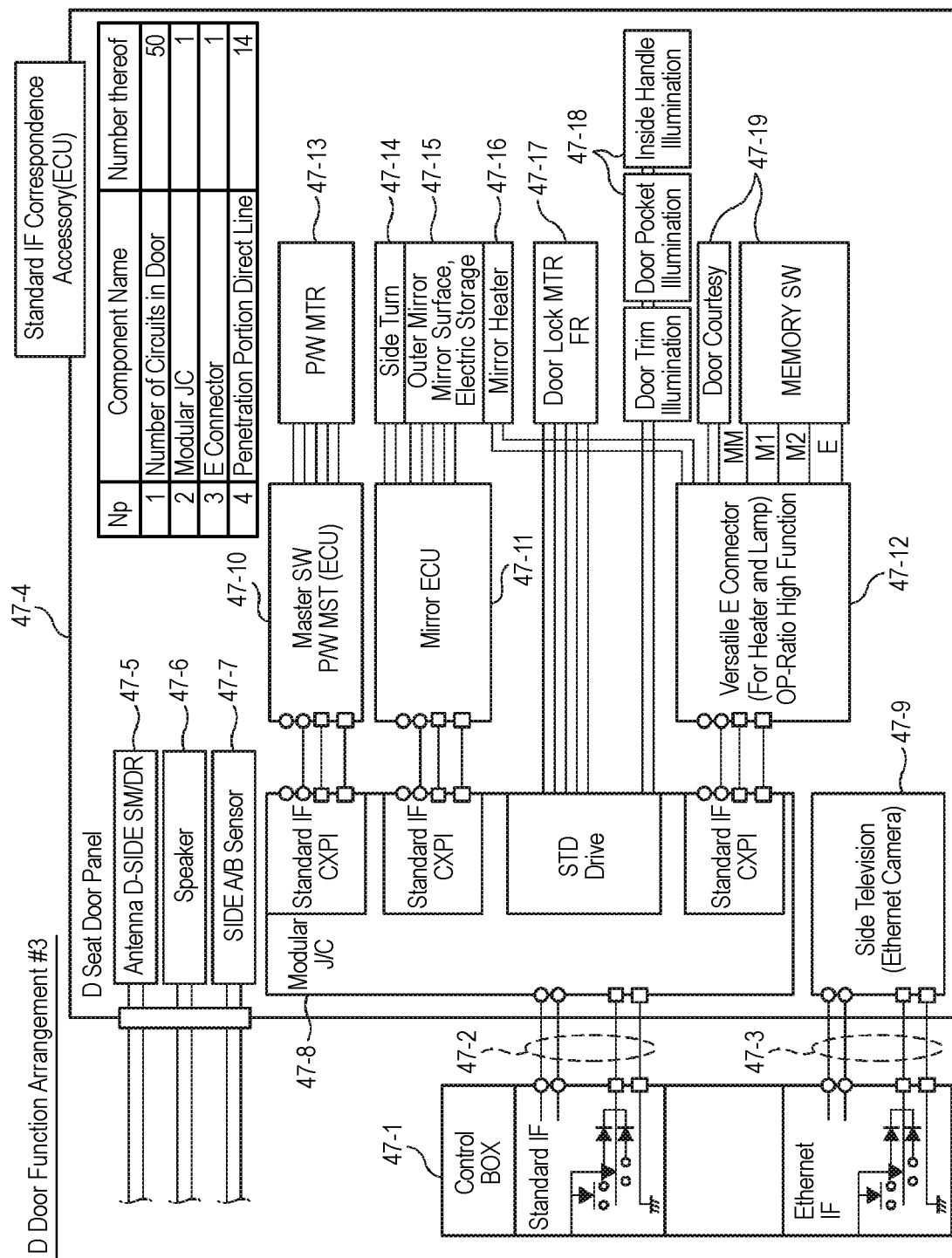
FIG. 47 is a block diagram illustrating a configuration example of a circuit module provided in a driver seat door panel.

FIG. 47 is a block diagram illustrating a configuration example of a circuit module provided in a driver seat door panel.

A circuit module 47-4 illustrated in FIG. 47 is disposed in a driver seat door panel, and is connected to a control box 47-1 provided on a vehicle body side via branch line sub-harnesses 47-2 and 47-3. The branch line sub-harnesses 47-2 and 47-3 are routed so as to penetrate through a partition wall at a location where the vehicle body is connected to the driver seat door.

A communication line of the branch line sub-harness 47-2 is connected to a standard communication interface (CXPI or the like), and a communication line of the branch line sub-harness 47-3 is connected to a communication interface based on Ethernet (registered trademark).

The circuit module 47-4 is provided with not only a modular connection connector 47-8 but also a plurality of electronic control units (ECUs) 47-10 and 47-11 and a side television 47-9 as accessories having standard interfaces. An antenna 47-5, a speaker 47-6, a sensor 47-7, a versatile communication connector 47-12, and the like are also provided.

The modular connection connector 47-8 has three standard communication interfaces based on the CXPI standard and a standard (STD) drive circuit built therein. Each standard communication interface in the modular connection connector 47-8 has a function of allowing a received signal to just pass therethrough and sending the signal to an output side.

The electronic control units 47-10 and 47-11 and the versatile communication connector 47-12 are respectively connected to the standard communication interfaces of the modular connection connector 47-8. The versatile communication connector 47-12 has an electronic circuit built therein, and can perform communication, control on a load, and inputting of a signal by using the electronic circuit. Output terminals of the standard drive circuit of the modular connection connector 47-8 are connected to a door lock motor 47-17, and various illumination apparatuses 47-18 in the door.

The electronic control unit 47-10 includes a microcomputer performing a process required to control a power window, and an output terminal thereof is connected to an electric motor (P/W MTR) of the power window.

The electronic control unit 47-11 includes a microcomputer having a function of controlling an outer mirror provided in the door. Output terminals of the electronic control unit 47-11 are connected to constituent elements 47-14 and 47-15 of the mirror. Output terminals of the versatile communication connector 47-12 are connected to a mirror heater 47-16, and a memory switch 47-19 and the like.

Figure 48:
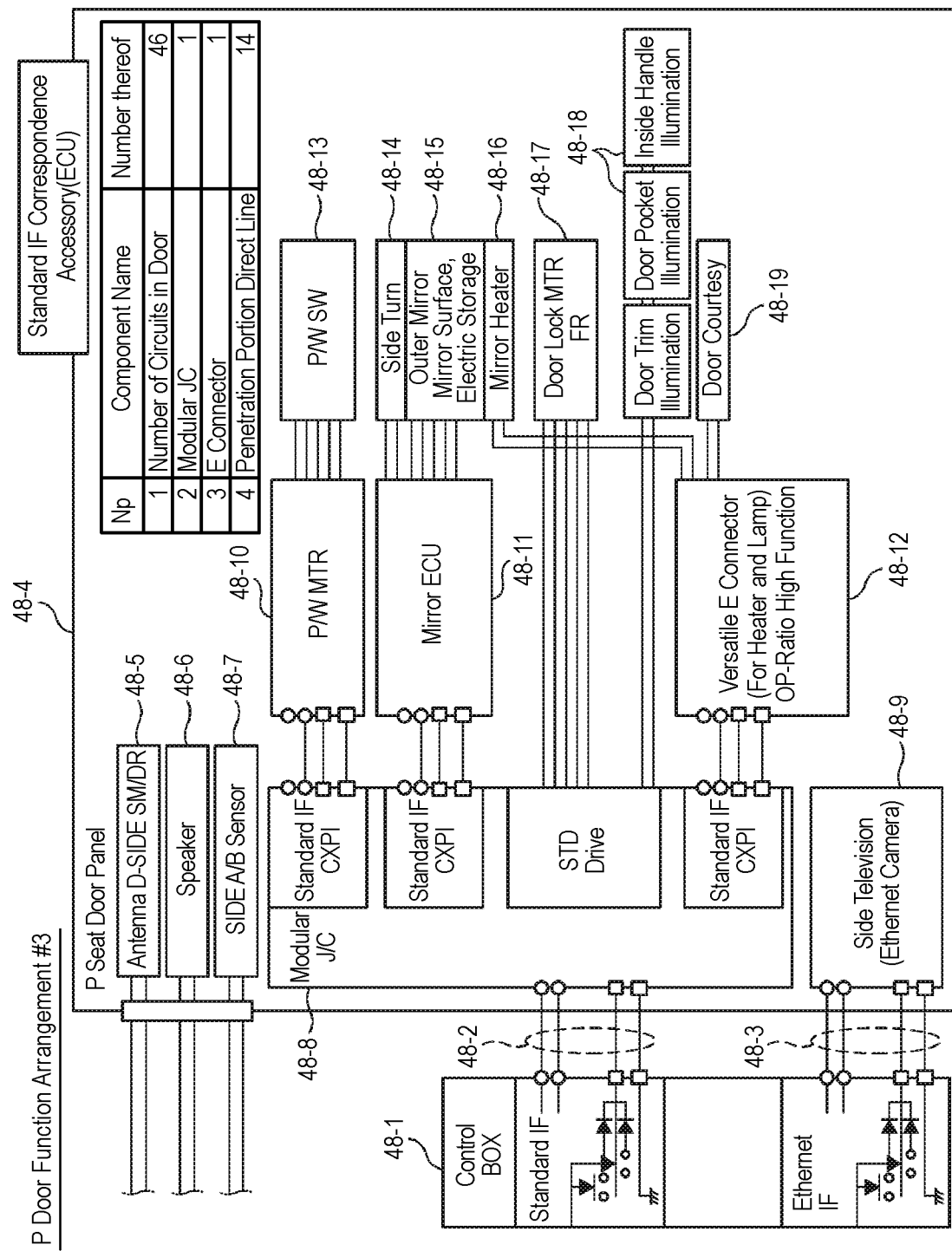
FIG. 48 is a block diagram illustrating a configuration example of a circuit module provided in a passenger seat door panel.

FIG. 48 is a block diagram illustrating a configuration example of a circuit module provided in a passenger seat door panel.

A circuit module 48-4 illustrated in FIG. 48 is disposed in a passenger seat door panel, and is connected to a control box 48-1 provided on a vehicle body side via branch line sub-harnesses 48-2 and 48-3. The branch line sub-harnesses 48-2 and 48-3 are routed so as to penetrate through a partition wall at a location where the vehicle body is connected to the passenger seat door.

A communication line of the branch line sub-harness 48-2 is connected to a standard communication interface (CXPI or the like), and a communication line of the branch line sub-harness 48-3 is connected to a communication interface based on Ethernet (registered trademark).

The circuit module 48-4 is provided with not only a modular connection connector 48-8 but also a plurality of electronic control units (ECUs) 48-10 and 48-11 and a side television 48-9 as accessories having standard interfaces. An antenna 48-5, a speaker 48-6, a sensor 48-7, a versatile communication connector 48-12, and the like are also provided.

The modular connection connector 48-8 has three standard communication interfaces based on the CXPI standard and a standard (STD) drive circuit built therein. The electronic control units 48-10 and 48-11 and the versatile communication connector 48-12 are respectively connected to the standard communication interfaces of the modular connection connector 48-8. The versatile communication connector 48-12 has an electronic circuit built therein, and can perform communication, control on a load, and inputting of a signal by using the electronic circuit. Output terminals of the standard drive circuit of the modular connection connector 48-8 are connected to a door lock motor 48-17, and various illumination apparatuses 48-18 in the door.

The electronic control unit 48-10 includes a microcomputer performing a process required to control a power window, and an output terminal thereof is connected to an electric motor (P/W MTR) of the power window.

The electronic control unit 48-11 includes a microcomputer having a function of controlling an outer mirror provided in the door. Output terminals of the electronic control unit 48-11 are connected to constituent elements 48-14 and 48-15 of the mirror. Output terminals of the versatile communication connector 48-12 are connected to a mirror heater 48-16, and a lamp 48-19.

Figure 49:
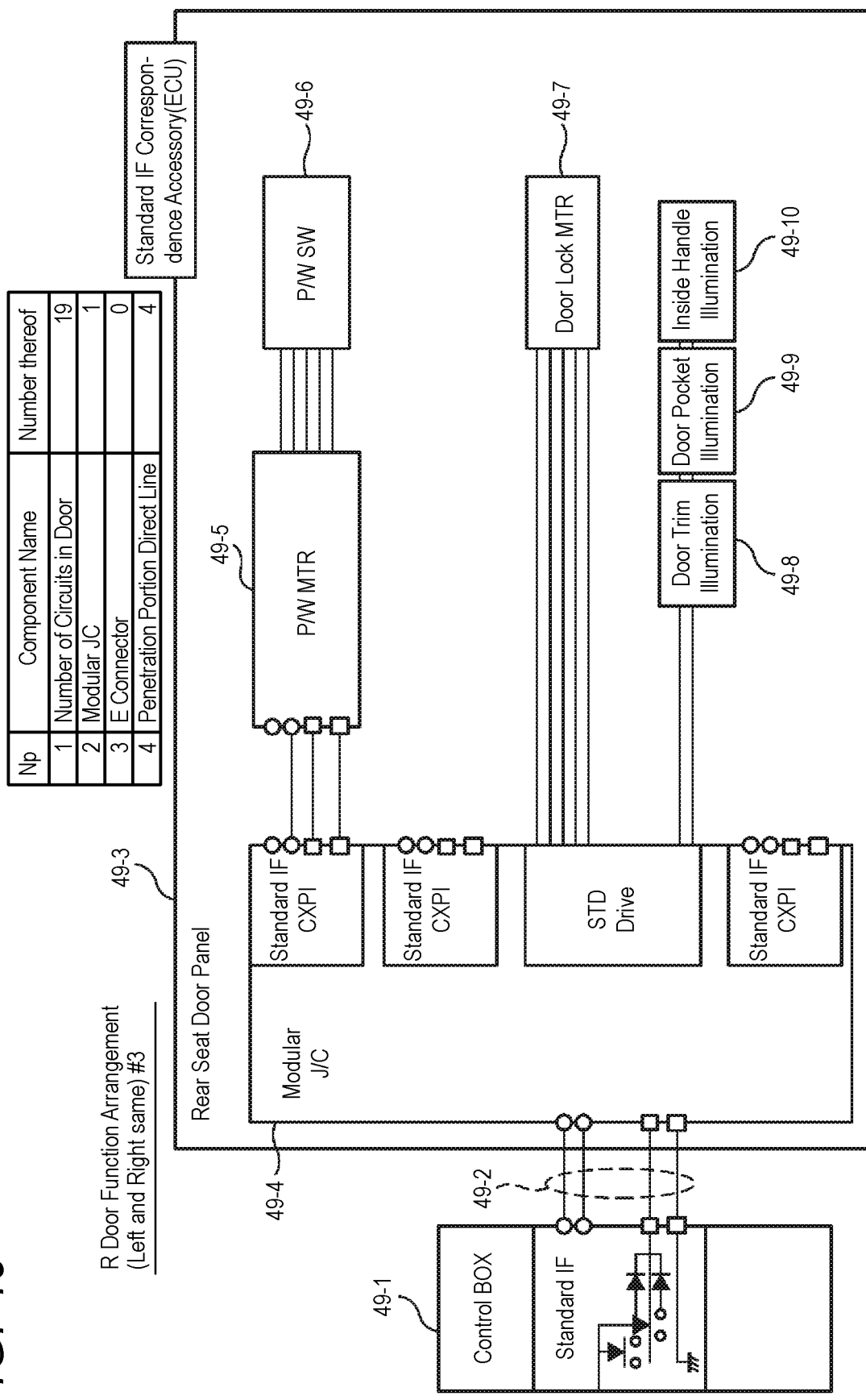
FIG. 49 is a block diagram illustrating a configuration example of a circuit module provided in a rear seat door panel.

FIG. 49 is a block diagram illustrating a configuration example of a circuit module provided in a rear seat door panel. The left and right rear seat door panels have the same configuration.

A circuit module 49-3 illustrated in FIG. 49 is disposed in a rear seat door panel (each of the left and right door panels), and is connected to a control box 49-1 provided on a vehicle body side via a branch line sub-harness 49-2. The branch line sub-harness 49-2 is routed so as to penetrate through a partition wall at a location where the vehicle body is connected to the rear seat door. A communication line of the branch line sub-harness 49-2 is connected to a standard communication interface (CXPI or the like).

The circuit module 49-3 is provided with not only a modular connection connector 49-4 but also an electronic control unit (ECU) 49-5 and the like as accessories having standard interfaces. The modular connection connector 49-4 has three standard communication interfaces based on the CXPI standard and a standard (STD) drive circuit built therein. The electronic control unit 49-5 is connected to the standard communication interfaces of the modular connection connector 49-4.

Output terminals of the standard drive circuit of the modular connection connector 49-4 are connected to a door lock motor 49-7, and various illumination apparatuses 49-8, 49-9 and 49-10 in the door.

The electronic control unit 49-5 includes a microcomputer performing a process required to control a power window, and an output terminal thereof is connected to an electric motor (P/W MTR) 49-6 of the power window.

Figure 50:
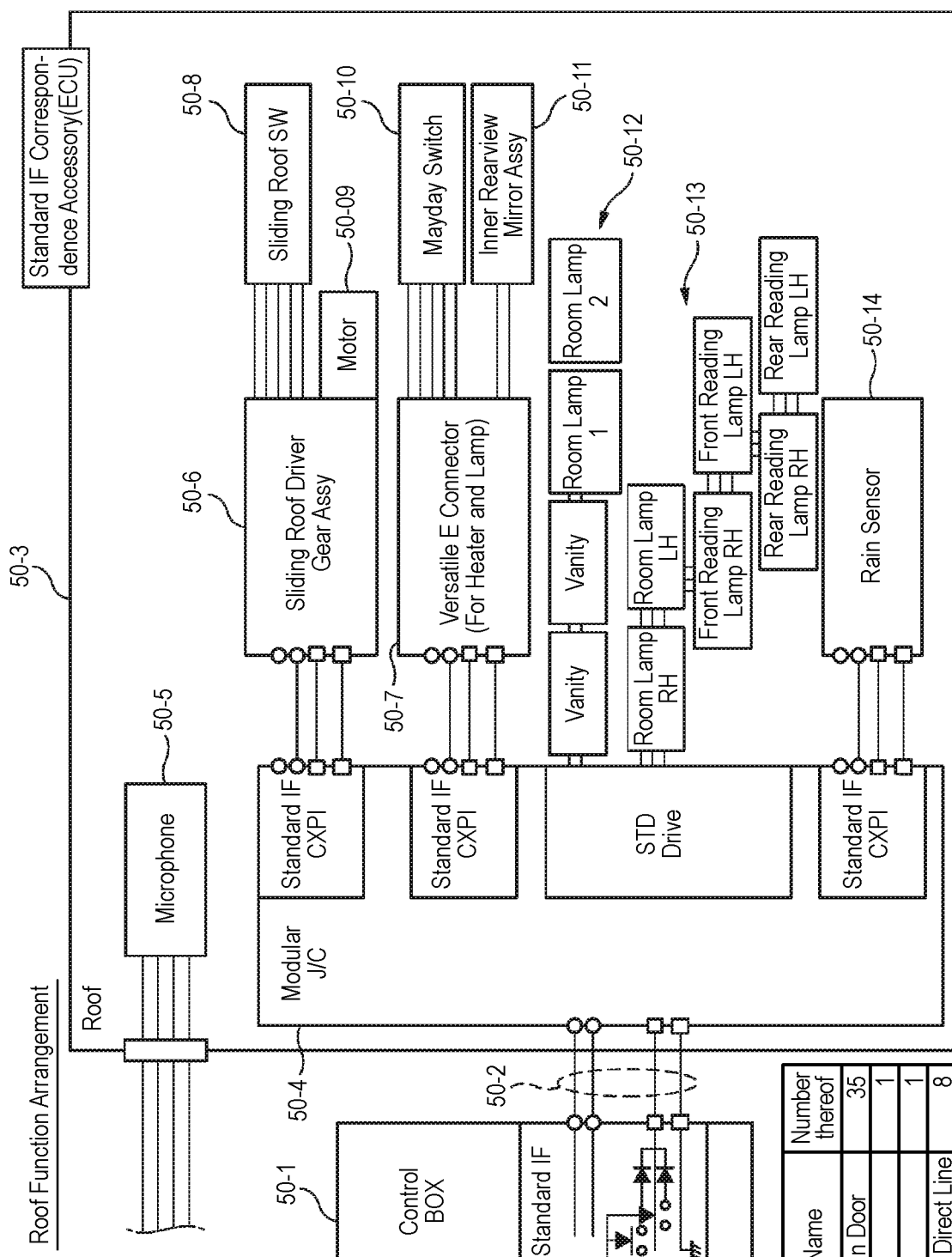
FIG. 50 is a block diagram illustrating a configuration example of a circuit module provided in a vehicle's roof.

FIG. 50 is a block diagram illustrating a configuration example of a circuit module provided in a vehicle's roof.

A circuit module 50-3 illustrated in FIG. 50 is disposed in a roof portion of a vehicle body, and is connected to a control box 50-1 provided on a vehicle interior side via a branch line sub-harness 50-2. The branch line sub-harness 50-2 is routed so as to penetrate through a partition wall at a location where the vehicle body is connected to the roof. A communication line of the branch line sub-harness 50-2 is connected to a standard communication interface (CXPI or the like).

The circuit module 50-3 is provided with not only a modular connection connector 50-4 but also an electronic control unit (ECU) 50-6, a rain sensor 50-14 and the like as accessories having standard interfaces. A microphone 50-5, a versatile communication connector 50-7, and the like are also provided.

The modular connection connector 50-4 has three standard communication interfaces based on the CXPI standard and a standard (STD) drive circuit built therein. Each standard communication interface in the modular connection connector 50-4 has a function of allowing a received signal to just pass therethrough and sending the signal to an output side.

The electronic control unit 50-6, the rain sensor 50-14, and the versatile communication connector 50-7 are respectively connected to the standard communication interfaces of the modular connection connector 50-4. The versatile communication connector 50-7 has an electronic circuit built therein, and can perform communication, control on a load, and inputting of a signal by using the electronic circuit. Output terminals of the standard drive circuit of the modular connection connector 50-4 are connected to various lamp loads 50-12 and 50-13.

The electronic control unit 50-6 includes a microcomputer performing a process required for drive control such as closing and opening of a sliding roof, and output terminals thereof are connected to a sliding roof switch 50-8 and a drive electric motor 50-9. Output terminals of the versatile communication connector 50-7 are connected to a Mayday switch 50-10 and an inner rearview mirror 50-11.

Figure 51:
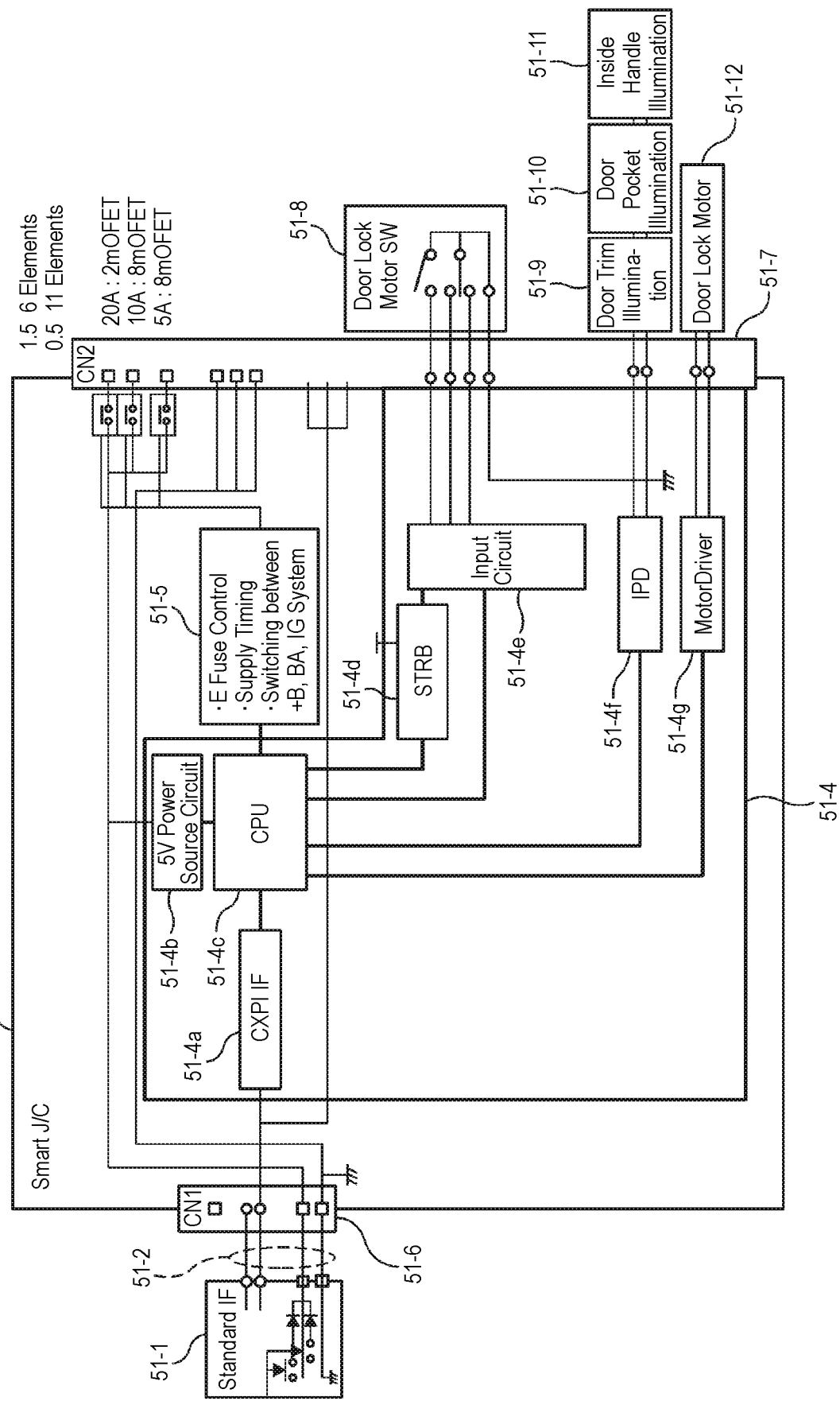
FIG. 51 is a block diagram illustrating a configuration example of a smart connection connector.

FIG. 51 is a block diagram illustrating a configuration example of a smart connection connector. A smart connection connector 51-3 illustrated in FIG. 51 is an element providing a joint function which can be used at various locations on a vehicle in a versatile manner, and may be connected to a desired control box via a branch line sub-harness 51-2 and a standard interface 51-1.

As illustrated in FIG. 51, an output side connector 51-7 of the smart connection connector 51-3 may be connected to a door lock motor switch 51-8, various illumination apparatuses 51-9, 51-10 and 51-11, a door lock motor 51-12, and the like.

A control circuit 51-4 is provided in the smart connection connector 51-3. The control circuit 51-4 includes a standard communication interface 51-4a, a power source circuit 51-4b, a microcomputer (CPU) 51-4c, a signal processing circuit (STRB) 51-4d, an input circuit 51-4e, an intelligent power device (IPD) 51-4f, and a motor driver 51-4g.

The output side connector 51-7 of the smart connection connector 51-3 is provided with terminals for outputting various types of source power, a communication terminal, a terminal for a signal to be input to the input circuit 51-4e, a terminal for connection of a load driven by the IPD 51-4f, and a terminal for connection of an electric motor.

Source power output from the output side connector 51-7 is used to operate an electronic fuse or to switch between the types of power (+B, +BA, IG, and the like) through processing in the microcomputer 51-4c. In order to perform this control, switching elements are connected between respective terminals of the output side connector 51-7 and an input side power source line. Turning-on and turning-off of the switching elements are controlled by the microcomputer 51-4c.

<Technique for Adding Function by Adding New Unit>

In the present embodiment, control of a system side is assumed in a case where a function is added by connecting a new unit to a common interface of an on-vehicle system. For example, in the system illustrated in FIG. 2, a case is assumed in which a new accessory AE is connected to the connector of the connection portion Cnx of each control box CB via the branch line sub-harness LS. However, the newly connected unit cannot be said to be a legal unit, and thus it is necessary to perform special control in order to ensure the security of the entire system.

Although not illustrated, specific examples of procedures performed in this case are as follows.

Step S50: In a dealer or the like of a vehicle, a worker or the like connects a corresponding new unit (accessory) to the connection portion Cnx of the control box CB via the branch line sub-harness LS.

Step S51: In the dealer or the like of the vehicle, the worker or the like connects a diagnosis tool (for example, "TaSCAN") dedicated to a vehicle, provided by a vehicle manufacturer or the like to a system on the vehicle, and executes a command for scanning in order to diagnose the connected unit.

Step S52: The microcomputer of the control box CB starts a scanning process in response to the command from the diagnosis tool. First, power is supplied to a first standard interface which is initially connected to the connection portion Cnx, and the microcomputer automatically identifies whether or not the CAN standard communication can be performed with respect to communication using the standard interface.

Step S53: In a case where the CAN standard communication is not established in step S52, the microcomputer switches a communication specification to CXPI from CAN, and identifies whether or not the CXPI standard communication can be performed.

Step S54: In a case where neither of the CAN standard communication and the CXPI standard communication is established in steps S52 and S53, the microcomputer stops the supply of power to the standard interface.

Step S55: In a case where the CAN or CXPI standard communication is established in steps S52 and S53, communication is performed among the diagnosis tool, the microcomputer of the control box CB, and the accessory (the new unit or the like) which is a connection destination, and the diagnosis tool performs a predetermined process so as to perform an authentication process on the accessory. The content of the authentication process is standardized in advance.

Step S56: In a case where the authentication is successful in step S55, the microcomputer of the control box CB registers conditions of supplying source power to the accessory based on the standard interface in a storage device of the microcomputer. For example, it is automatically identified that the kind of power to be supplied is any one of "+B, +BA, IG, and IGP" on the basis of the kind of the accessory proved through the authentication, or ID information, and the identification result is registered.

Step S57: The processes in steps S52 to S56 are sequentially performed on second and subsequent standard interfaces repeatedly.

Step S58: After the scanning process on all of the standard interfaces is completed, the diagnosis tool or the microcomputer of the control box CB displays a message or the like so that a user (or a worker) can confirm addition of a function with respect to the added new unit. This display is performed by using, for example, a display portion of the meter unit on the vehicle.

Step S59: The microcomputer of the control box CB stores, in the storage device thereof, information for transfer to the function confirmed by the user in step S58 to an environment in which the function can be actually used.

Therefore, for example, even if an illegal apparatus which is not allowed by a vehicle manufacturer or the like is tried to be connected to the on-vehicle system by a user or a third party, the illegal apparatus cannot perform communication with the legal on-vehicle system, and cannot be supplied with power via a communication connector either, and thus the illegal apparatus cannot operate at all.

<Technique Regarding Connection Form of Communication System in On-Vehicle System>

Figure 52A:
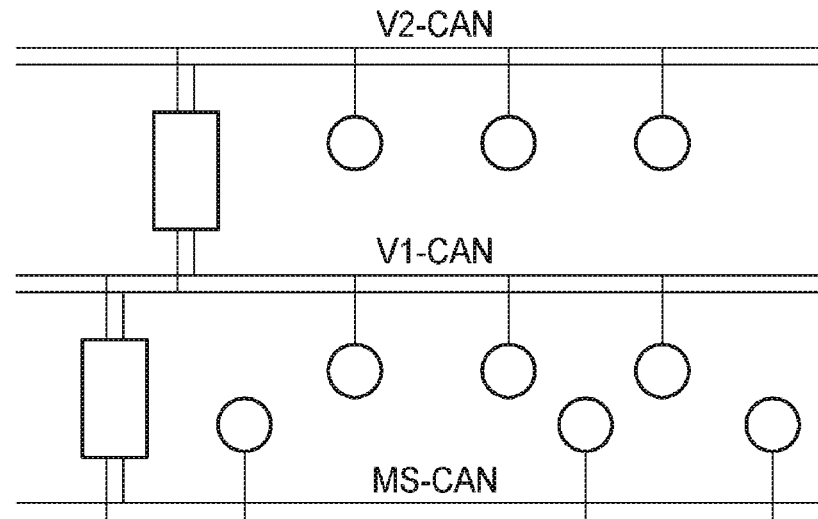
FIGS. 52A and 52B are block diagrams respectively illustrating configuration examples of communication systems in different on-vehicle systems.
Figure 52B:
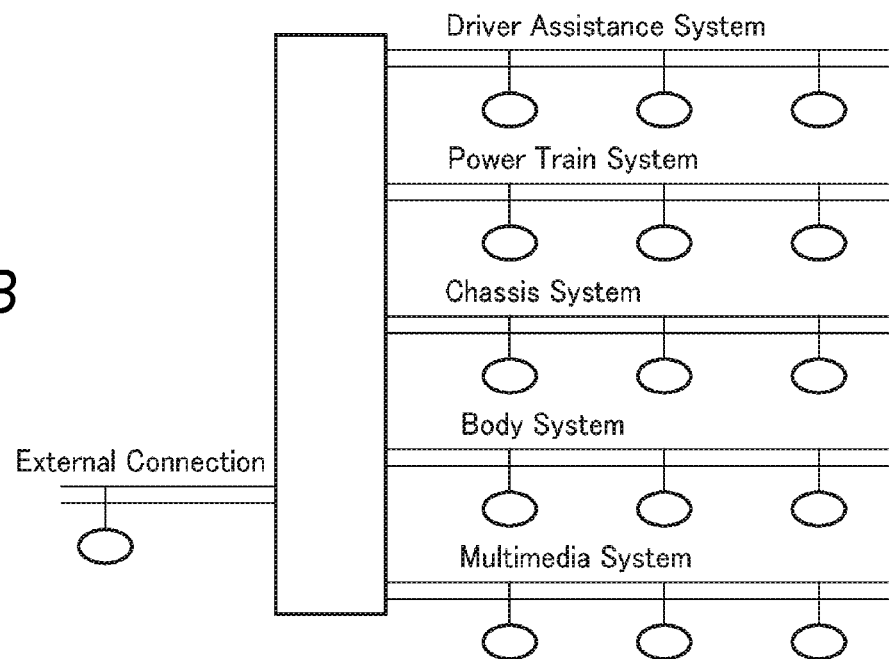
Figure 53:
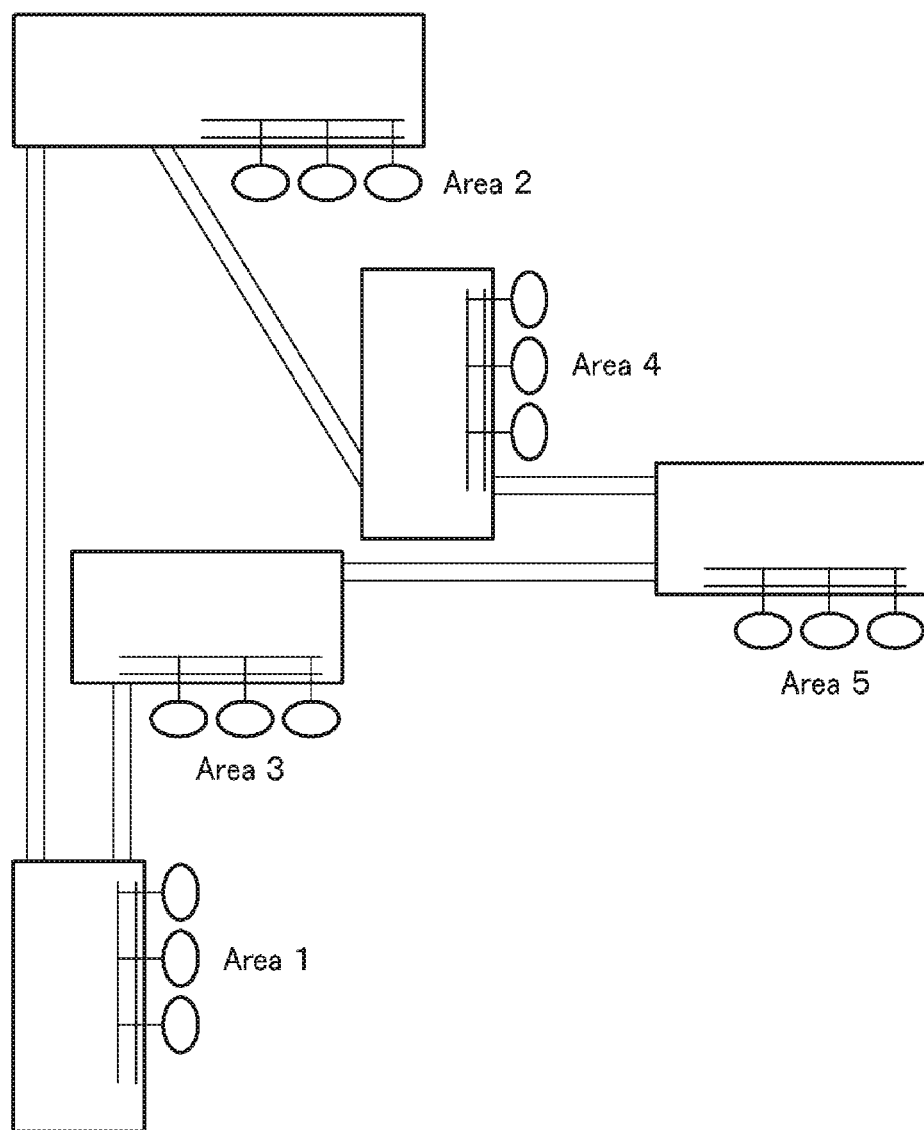
FIG. 53 is a block diagram illustrating a configuration example of a communication system in an on-vehicle system.

FIG. 52A, FIG. 52B and FIG. 53 are block diagrams respectively illustrating configuration examples of communication systems in different on-vehicle systems.

An on-vehicle system illustrated in FIG. 52A includes communication networks V2-CAN, V1-CAN, and MS-CAN of three systems, which are connected to each other via a gateway. The communication network V2-CAN is allocated to apparatuses of an engine compartment (engine room), the communication network V1-CAN is allocated to apparatuses (including a meter unit) of an engine system, and the communication network MS-CAN is allocated to apparatuses (doors, power seats, and the like) of a body system.

The communication network MS-CAN is disposed in the entire vehicle as a domain, and each of the communication networks V1-CAN and V2-CAN is divided for area on a vehicle body. Various accessories are connected to and under the control of each of the communication networks MS-CAN, V1-CAN and V2-CAN.

In an on-vehicle system illustrated in FIG. 52B, a plurality of communication networks respectively in charge of a plurality of domains which are respectively allocated to a driving assistance system, a power train system, a chassis system, a body system, and a multimedia system are connected to each other. Each communication network employs a communication interface based on the CAN standard. These sets of communication networks are routed to extend in parallel to each other in the entire region of the vehicle.

In an on-vehicle system illustrated in FIG. 53, a domain is divided for each area such as an "area 1", an "area 2", an "area 3", an "area 4", and an "area 5", and a communication network is formed in each area. An optical communication network is used for a trunk line connecting the respective areas to each other in order to enable high-speed communication.

By using the optical communication network, high-speed communication of, for example, about 1 Gbps can be performed between the areas. A communication capacity of the optical communication network is distributed to a plurality of systems in the communication network of each area, so as to be allocated to communication of various accessories. The priority of communication is determined on the basis of specific ID information allocated to each of apparatuses such as accessories in advance.

<Technique Regarding Internal Configuration of Control Box>

Figure 45:
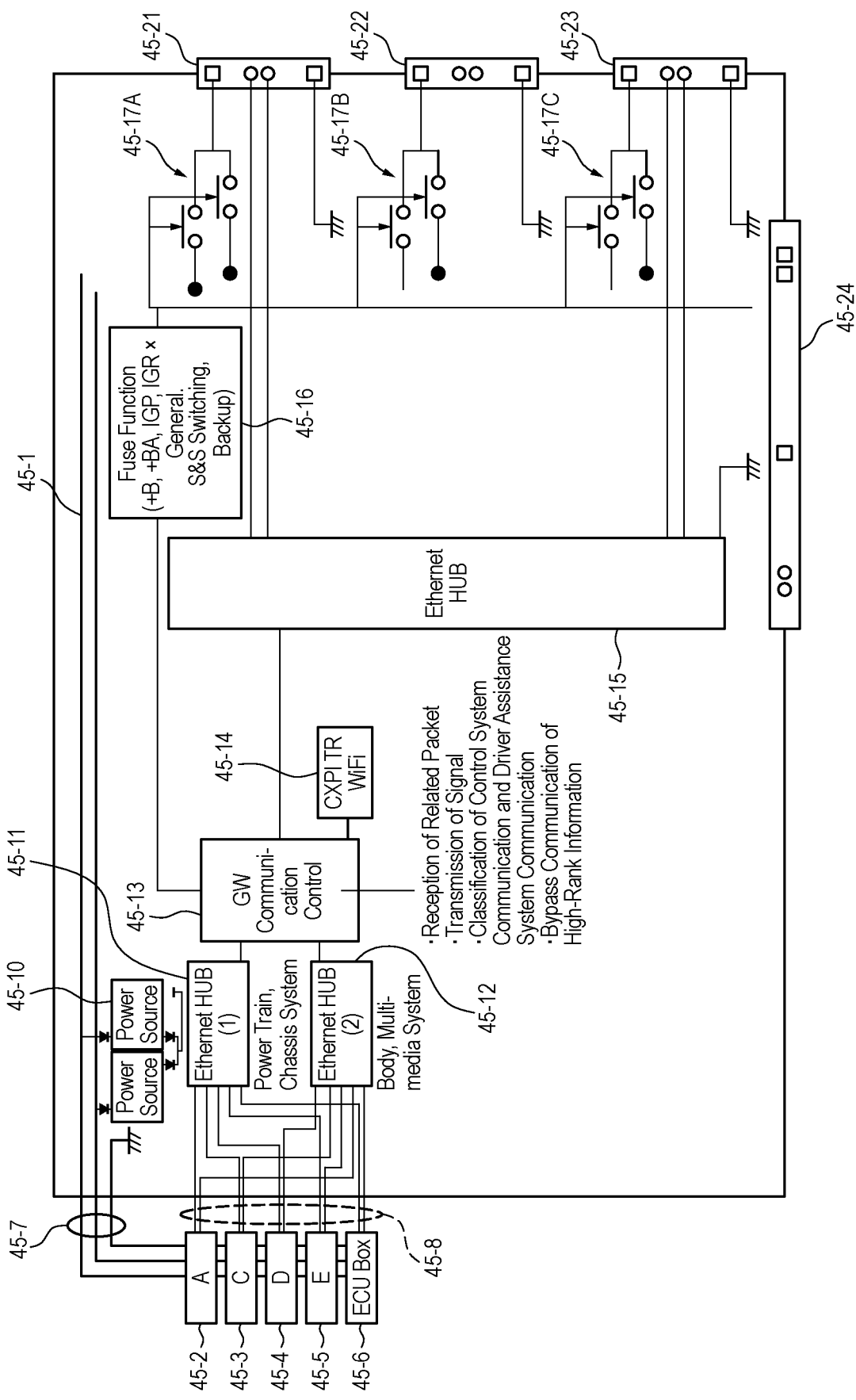
FIG. 45 is a block diagram illustrating a configuration example of a control box.

FIG. 45 is a block diagram illustrating a configuration example of a control box.

An on-vehicle system illustrated in FIG. 45 includes five control boxes 45-1, 45-2, 45-3, 45-4 and 45-5 connected to each other via backbone trunk lines 45-7 and 45-8, and an ECU box 45-6.

As illustrated in FIG. 45, the backbone trunk line 45-7 includes power source lines of two systems and an earth line. The backbone trunk line 45-8 includes communication lines of two systems.

The control box 45-1 is provided with power source portions 45-10 of two systems, two sets of network (Ethernet: registered trademark) hubs 45-11 and 45-12, a communication control unit 45-13 of a gateway (GW), a WiFi communication module 45-14, a network (Ethernet: registered trademark) hub 45-15, a power control unit 45-16, switching circuits 45-17A, 45-17B and 45-17C, and connectors 45-21, 45-22, 45-23 and 45-24.

Of the communication lines of two systems included in the backbone trunk line 45-8, one communication line is connected to the network hub 45-11, and the other communication line is connected to the network hub 45-12. The communication system of the network hub 45-11 side is allocated for use in a power train system and a chassis system of a vehicle, and the communication system of the network hub 45-12 side is allocated for use in a body system and a multimedia system of the vehicle.

The communication control unit 45-13 of the gateway (GW) is a functional unit realized under the control of a microcomputer (not illustrated) provided in the control box 45-1, and has the following functions.

(1) Interconnection between a plurality of networks based on different standards such as protocols
(2) Reception of related packet
(3) Transmission of signal
(4) Classification of communication of a control system and communication of a driving assistance system
(5) Bypass communication of high-rank information The WiFi communication module 45-14 is used for wirelessly connecting the control box 45-1 to other apparatuses mounted on the vehicle or an apparatus carried by a user.

The network hub 45-15 has a function of dividing one communication path from the communication control unit 45-13 for connection to any one of communication paths of the connectors 45-21, 45-22 and 45-23.

The power control unit 45-16 is a functional portion realized under the control of the microcomputer (not illustrated) provided in the control box 45-1, and has source power control functions as described below.

(1) Electronic fuse function of blocking path when overcurrent flows;
(2) Function of controlling the kinds of power such as "+B, +BA, IGP, and IGR";
(3) Function of backing up power source of an important system by properly using power source lines of two systems when abnormality occurs in power source; and
(4) Stop & start (S & S) switching function.

Each of the switching circuits 45-17A, 45-17B and 45-17C includes two controllable switching elements for respectively connecting the power source lines of two systems to power source lines of the connectors 45-21, 45-22 and 45-23. The switching elements are separately controlled to be turned on and off according to control signals output from the microcomputer which realizes each function of the power control unit 45-16.

Each of the connectors 45-21, 45-22 and 45-23 includes four terminals such as a power source line terminal, an earth line terminal, and two communication line terminals Various kinds of accessories can be connected to and under the control of the connectors 45-21, 45-22 and 45-23 via predetermined branch line sub-harnesses.

As mentioned above, according to the vehicular circuit body of the present invention, it is possible to easily add a new electric wire by simplifying a structure for electrical connection between various electric components and a power source on a vehicle and between the electric components, particularly, a configuration of a trunk line portion.

Aspects of the vehicular circuit body in accordance with the embodiments of the invention disclosed in the above are briefly summarized and respectively listed in [1] to [7] as follows:

[1] A vehicular circuit body provided in a vehicle includes:
a trunk line (backbone trunk line 21, 22, 23) that extends in at least a front-and-rear direction of the vehicle; and
a plurality of control boxes (backbone control boxes 31, 32, 33) that are provided in the trunk line.

Each of the plurality of control boxes is able to connect with a branch line (branch line sub-harness LS) that is directly or indirectly connected to an accessory, and The trunk line includes a power source line (L1, L2) having a predetermined current capacity and a communication line (L4, L5) having a predetermined communication capacity.

[2] In the vehicular circuit body according to [1], the trunk line includes power source lines (L1, L2) of two systems.

[3] In the vehicular circuit body according to [1], the branch line includes a power source line and a communication line, each of the plurality of control boxes includes a branch line connection portion (switch circuit CBb, bridge circuit Cbc, connection portion Cnx) to which the branch line is connected, and a branch line control unit (microcomputer Cba) that distributes power from the trunk line to the branch line by controlling the branch line connection portion according to a control program, and the control program can be externally changed according to the accessory connected to the branch line.

[4] In the vehicular circuit body according to [1], the communication line (BB_LC) of the trunk line is routed so that the plurality of control boxes are connected in a ring form.

[5] In the vehicular circuit body according to [1], the branch line includes a power source line and a communication line, each of the plurality of control boxes includes a plurality of branch line connection portions (Cnx) to and from which the communication line of the branch line is attachable and detachable, and each of the plurality of branch line connection portions is provided with a lock function portion (a cover member (cover with key Kc1) and key part (Kk), (cover with key Kc2) and key part (Kk), (seal for sealing Ks) or steps S12-S14) that is physically or electrically brought into a lock state in a case where the branch line is not connected thereto.

[6] In the vehicular circuit body according to [1], the branch line includes a power source line and a communication line, the vehicle is divided into a plurality of regions (AR1, AR2, AR3), at least two control boxes are disposed in the regions which are different from each other, each of which includes a gateway (GW) conversing communication methods for the communication line of the branch line and the communication line of the trunk line, and a plurality of the gateways are able to communicate with each other via the communication line (BB_LC) of the trunk line.

[7] In the vehicular circuit body according to [1], the branch line includes at least one of a power source line and a communication line, the communication line of the trunk line has a transmission path for an optical signal (optical fiber), and the communication line of the branch line has a transmission path for an electric signal (metal communication line).

While the present invention is described in detail by referring to the specific embodiments, it is to be understood to a person with ordinary skill in the art that various changes or modifications may be made without deviating from the spirit and scope of the present invention.

The present application is based on Japanese Patent Application No. 2016-125287 filed on Jun. 24, 2016, Japanese Patent Application No. 2016-125896 filed on Jun. 24, 2016, and Japanese Patent Application No. 2016-131165 filed on Jun. 30, 2016, the contents of which are incorporated herein by reference.

According to the invention, effects is that, in a vehicular circuit body, structures for electric connections between various electric components and power sources on a vehicle and between the electric components, specifically configurations on trunk line portions are simplified, and additional cables are easy to be added. The invention having the effects is useful on the vehicular circuit body routed in the vehicle.

REFERENCE SIGNS LIST 21, 22, AND 23 BACKBONE TRUNK LINE PORTION
31, 32, AND 33 BACKBONE CONTROL BOX
AE ACCESSORY
ALT ALTERNATOR
MB MAIN BATTERY
BB_LM BACKBONE TRUNK LINE
CB CONTROL BOX
LS BRANCH LINE SUB-HARNESS
Cnx CONNECTION PORTION
L1, L2, AND L2B POWER SOURCE LINE
L3 EARTH LINE
L4, L5, AND Lx COMMUNICATION LINE
DT DIAGNOSIS TOOL
CBa MICROCOMPUTER
CBb SWITCH CIRCUIT
CBc BRIDGE CIRCUIT
BB_LC COMMUNICATION TRUNK LINE
AR1, AR2, AND AR3 AREA
CBd CIRCUIT BOARD
Kc1 AND Kc2 COVER WITH KEY
Kk UNLOCK KEY
Ks SEAL FOR SEALING
GW GATEWAY
CB01 POWER SOURCE CIRCUIT
CB02 GATEWAY CONTROL CIRCUIT
CB03, CB04, CB05, AND CB06 PHY CIRCUIT
CB07 AND CB08 NETWORK SWITCH
CB09 AND CB10 TRANSCEIVER
CB11 SWITCHING CIRCUIT
CP1 TO CP8 COMMUNICATION PORT CONNECTOR
LPP1 AND LPP2 COMMUNICATION LINE
FBC1 AND FBC2 OPTICAL FIBER CABLE
FB11 AND FB12 OPTICAL FIBER

What is claimed is:

1. A vehicular circuit body provided in a vehicle, the vehicle extends in a leftward-and-rightward direction and in a front-and-rear direction, and the vehicle includes a center portion with respect to the leftward-and-rightward direction, the center portion of the vehicle extends in the front-and-rear direction, the vehicular circuit body comprising: a first trunk line portion that extends in the leftward-and-rightward direction of the vehicle; a second trunk line portion that extends along the center portion of the vehicle in the front-and-rear direction of the vehicle; and a plurality of control boxes that are provided in each of the trunk line portions, wherein each of the plurality of control boxes is able to connect with a branch line that is directly or indirectly connected to an accessory, wherein each of the trunk line portions includes a power source line having a predetermined current capacity and a communication line having a predetermined communication capacity, and wherein a first one of the control boxes is provided in a central portion of the first trunk line portion with respect to the leftward-and-right direction, and the second trunk line portion is connected to and extends away from the first control box such that the first trunk portion and the second trunk line portion are formed in a T shape, wherein the second trunk line portion includes a bend, a first portion that extends in an upward-and-downward direction of the vehicle from the bend to the first one of the control boxes, and a second portion that extends away from the bend in the front-and-rear direction of the vehicle; wherein the branch line includes a power source line and a communication line, wherein each of the plurality of control boxes includes a branch line connection portion to which the branch line is connected, and a branch line control unit that distributes power from a respective one of the trunk line portions to the branch line by controlling the branch line connection portion according to a control program, and the control program can be externally changed according to the accessory connected to the branch line.

2. The vehicular circuit body according to claim 1, wherein each of the trunk line portions includes power source lines of two systems.

3. The vehicular circuit body according to claim 1, wherein the communication line of each of the trunk line portions is routed so that the plurality of control boxes are connected in a ring form.

4. The vehicular circuit body according to claim 1, wherein each of the plurality of control boxes includes a plurality of branch line connection portions to and from which the communication line of the branch line is attachable and detachable, and wherein each of the plurality of branch line connection portions is provided with a lock function portion that is physically or electrically brought into a lock state in a case where the branch line is not connected thereto.

5. The vehicular circuit body according to claim 1, wherein the vehicle is divided into a plurality of regions, wherein at least two control boxes are disposed in the regions which are different from each other, each of which includes a gateway conversing communication methods for the communication line of the branch line and the communication line of each of the trunk line portions, and wherein a plurality of the gateways are able to communicate with each other via the communication line of each of the trunk line portions.

6. The vehicular circuit body according to claim 1, wherein the communication line of each of the trunk line portions has a transmission path for an optical signal, and wherein the communication line of the branch line has a transmission path for an electric signal.

\* \* \* \* \*